(12) United States Patent
Kinsey, II et al.

(10) Patent No.: US 11,694,132 B2
(45) Date of Patent: *Jul. 4, 2023

(54) METHODS AND SYSTEMS FOR ELECTRONIC FORM IDENTIFICATION AND POPULATION

(71) Applicant: IMPEL IT! INC., Palo Alto, CA (US)

(72) Inventors: Edward Phillip Kinsey, II, Palo Alto, CA (US); Grant Stephen Kinsey, Palo Alto, CA (US)

(73) Assignee: IMPEL IT! INC., Palo Alto, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 17/036,064

(22) Filed: Sep. 29, 2020

(65) Prior Publication Data

US 2021/0224723 A1 Jul. 22, 2021

Related U.S. Application Data

(63) Continuation of application No. 16/515,619, filed on Jul. 18, 2019, now Pat. No. 10,824,975, which is a
(Continued)

(51) Int. Cl.
*G06Q 10/0631* (2023.01)
*G06Q 10/1093* (2023.01)
(Continued)

(52) U.S. Cl.
CPC . *G06Q 10/063116* (2013.01); *G06Q 10/1095* (2013.01); *G06Q 30/0282* (2013.01); *G06Q 30/0627* (2013.01); *G06Q 30/0631* (2013.01)

(58) Field of Classification Search
None
See application file for complete search history.

(56) References Cited

U.S. PATENT DOCUMENTS 5,948,040 A 9/1999 DeLorme et al.
6,026,375 A 2/2000 Hall et al.
(Continued)

OTHER PUBLICATIONS

K. Siau, "Health care informatics," in IEEE Transactions on Information Technology in Biomedicine, vol. 7, No. 1, pp. 1-7, Mar. 2003, doi: 10.1109/TITB.2002.805449. (Year: 2003).*
(Continued)

*Primary Examiner* — Mehmet Yesildag
(74) *Attorney, Agent, or Firm* — Goodwin Procter LLP

(57) ABSTRACT

Computer-implemented systems and methods for the sale of consumer services. Predictions are made based on the behaviors, preferences, assets, identifying characteristics, and other attributes associated with customers and merchants. In one implementation, a prediction is made as to whether a customer is likely to request a service and whether a merchant is likely to be selected by the customer to provide the service. In another implementation, the calendars of a merchant and customer are automatically updated to account for the customer's late arrival to an appointment at the merchants location. In yet another implementation, a customer purchases an appointment for a service from another customer that has the appointment scheduled with a merchant providing the service.

16 Claims, 8 Drawing Sheets

Related U.S. Application Data continuation of application No. 14/081,692, filed on Nov. 15, 2013, now Pat. No. 10,402,760.

(60) Provisional application No. 61/726,644, filed on Nov. 15, 2012.

(51) Int. Cl.
  G06Q 30/0601 (2023.01)
  G06Q 30/0282 (2023.01)

(56) References Cited

U.S. PATENT DOCUMENTS

| | | |
|---|---|---|
| 6,766,012 B1 | 7/2004 | Crossley |
| 6,831,563 B1 | 12/2004 | Contractor |
| 6,850,643 B1 | 2/2005 | Smith, II et al. |
| 7,096,193 B1 | 8/2006 | Beaudoin et al. |
| 7,103,562 B2 | 9/2006 | Kosiba et al. |
| 7,188,073 B1 | 3/2007 | Tam et al. |
| 7,337,123 B2 | 2/2008 | Dvorak et al. |
| 7,580,862 B1 | 8/2009 | Montelo et al. |
| 7,680,922 B2 | 3/2010 | Rabinovitch et al. |
| 7,869,941 B2 | 1/2011 | Coughlin et al. |
| 8,015,049 B1* | 9/2011 | Tam .............. G06Q 10/063116 |
| | | 705/7.18 |
| 8,103,524 B1 | 1/2012 | Rogers et al. |
| 8,185,426 B1 | 5/2012 | Khoubyari |
| 8,209,229 B1 | 6/2012 | Weiss et al. |
| 8,244,566 B1 | 8/2012 | Coley et al. |
| 8,271,295 B1 | 9/2012 | Miller et al. |
| 8,311,863 B1 | 11/2012 | Kemp |
| 8,515,821 B2 | 8/2013 | Center et al. |
| 8,606,517 B1 | 12/2013 | Ehrlacher et al. |
| 8,688,540 B1 | 4/2014 | Patel et al. |
| 8,719,058 B2 | 5/2014 | Bonner et al. |
| 8,849,689 B1 | 9/2014 | Jagannathan et al. |
| 9,043,219 B2 | 5/2015 | Piersol |
| 2002/0039352 A1 | 4/2002 | El-Fekih et al. |
| 2002/0116202 A1 | 8/2002 | Bantz et al. |
| 2002/0128934 A1 | 9/2002 | Shaer |
| 2002/0138327 A1 | 9/2002 | Mello et al. |
| 2002/0186144 A1 | 12/2002 | Meunier |
| 2003/0005124 A1 | 1/2003 | Hollinger et al. |
| 2003/0055723 A1 | 3/2003 | English |
| 2003/0078788 A1 | 4/2003 | Sussman et al. |
| 2003/0084142 A1 | 5/2003 | Casati et al. |
| 2004/0059596 A1 | 3/2004 | Vaidyanathan et al. |
| 2004/0064585 A1* | 4/2004 | Doss .............. G06Q 10/063116 |
| | | 709/246 |
| 2004/0111430 A1 | 6/2004 | Hertling et al. |
| 2004/0128242 A1 | 7/2004 | Morita et al. |
| 2004/0193448 A1 | 9/2004 | Woodbridge et al. |
| 2005/0102159 A1 | 5/2005 | Mondshine |
| 2005/0171818 A1* | 8/2005 | McLaughlin ...... G06Q 10/1095 |
| | | 705/7.19 |
| 2006/0047551 A1 | 3/2006 | Cotten et al. |
| 2006/0111957 A1 | 5/2006 | Carmi et al. |
| 2006/0143064 A1 | 6/2006 | Mock et al. |
| 2006/0212359 A1 | 9/2006 | Hudgeon |
| 2006/0242269 A1 | 10/2006 | Gross |
| 2006/0294108 A1 | 12/2006 | Adelson et al. |
| 2007/0015518 A1 | 1/2007 | Winter et al. |
| 2007/0061208 A1 | 3/2007 | Goldman et al. |
| 2007/0192130 A1 | 8/2007 | Sandhu |
| 2007/0195944 A1 | 8/2007 | Korenblit et al. |
| 2007/0239376 A1 | 10/2007 | Reiner |
| 2007/0244741 A1 | 10/2007 | Blume et al. |
| 2008/0005055 A1 | 1/2008 | Horvitz |
| 2008/0040281 A1 | 2/2008 | Chakraborty et al. |
| 2008/0077454 A1 | 3/2008 | Shepherd et al. |
| 2008/0086455 A1 | 4/2008 | Meisels et al. |
| 2008/0091478 A1 | 4/2008 | Messa |
| 2008/0103814 A1* | 5/2008 | Fabius .................. G16H 20/10 |
| | | 705/2 |
| 2008/0167937 A1 | 7/2008 | Coughlin et al. |
| 2008/0171559 A1 | 7/2008 | Frank et al. |
| 2008/0177609 A1 | 7/2008 | Grieb et al. |
| 2008/0195312 A1 | 8/2008 | Aaron et al. |
| 2008/0201174 A1 | 8/2008 | Ramasubramanian et al. |
| 2008/0300918 A1 | 12/2008 | Tenenbaum et al. |
| 2008/0300995 A1 | 12/2008 | Smejkalova |
| 2009/0055208 A1 | 2/2009 | Kaiser |
| 2009/0064190 A1 | 3/2009 | Pereira et al. |
| 2009/0138285 A1 | 5/2009 | Denberg |
| 2009/0138458 A1 | 5/2009 | Wanker |
| 2009/0164236 A1 | 6/2009 | Gounares et al. |
| 2009/0254423 A1 | 10/2009 | Ellison et al. |
| 2009/0312052 A1 | 12/2009 | Barbosa et al. |
| 2010/0015993 A1 | 1/2010 | Dingier et al. |
| 2010/0017482 A1 | 1/2010 | Piccinini et al. |
| 2010/0030578 A1 | 2/2010 | Siddique et al. |
| 2010/0070295 A1* | 3/2010 | Kharraz Tavakol ... G16H 40/20 |
| | | 705/2 |
| 2010/0094678 A1 | 4/2010 | Gupta et al. |
| 2010/0106404 A1 | 4/2010 | Kim |
| 2010/0106517 A1 | 4/2010 | Kociubinski et al. |
| 2010/0121710 A1 | 5/2010 | Chipman et al. |
| 2010/0179854 A1 | 7/2010 | Shafer et al. |
| 2010/0191552 A1 | 7/2010 | Behrens et al. |
| 2010/0198646 A1 | 8/2010 | Mikan et al. |
| 2010/0228564 A1 | 9/2010 | Kharraz Tavakol et al. |
| 2010/0230328 A1 | 9/2010 | Bonnell et al. |
| 2010/0259549 A1 | 10/2010 | Brown et al. |
| 2010/0293029 A1 | 11/2010 | Olliphant |
| 2011/0010219 A1 | 1/2011 | Stearns et al. |
| 2011/0022438 A1 | 1/2011 | Lian |
| 2011/0047008 A1 | 2/2011 | Rule |
| 2011/0054978 A1 | 3/2011 | Mohil |
| 2011/0066493 A1 | 3/2011 | Faith et al. |
| 2011/0125552 A1 | 5/2011 | Stein |
| 2011/0131113 A1 | 6/2011 | Compton et al. |
| 2011/0138051 A1 | 6/2011 | Dawson et al. |
| 2011/0161097 A1 | 6/2011 | Fox et al. |
| 2011/0173062 A1 | 7/2011 | Chen et al. |
| 2011/0178885 A1 | 7/2011 | Xiong |
| 2011/0191122 A1* | 8/2011 | Kharraz Tavakol ... G06Q 10/10 |
| | | 705/2 |
| 2011/0246247 A1 | 10/2011 | McCullough et al. |
| 2011/0289433 A1 | 11/2011 | Whalin et al. |
| 2011/0314115 A1 | 12/2011 | Nagaraj |
| 2012/0065989 A1 | 3/2012 | Massoumi et al. |
| 2012/0109679 A1 | 5/2012 | Massoumi et al. |
| 2012/0109683 A1 | 5/2012 | Ebadollahi et al. |
| 2012/0123790 A1 | 5/2012 | Kenyon |
| 2012/0143774 A1 | 6/2012 | Curbera et al. |
| 2012/0166322 A1 | 6/2012 | Simon |
| 2012/0173280 A1* | 7/2012 | Gustafson .......... G06Q 30/0631 |
| | | 705/2 |
| 2012/0179481 A1 | 7/2012 | Patel et al. |
| 2012/0185317 A1 | 7/2012 | Wong |
| 2012/0212337 A1 | 8/2012 | Montyne et al. |
| 2012/0226440 A1 | 9/2012 | Nagda |
| 2012/0226642 A1 | 9/2012 | Kim et al. |
| 2012/0253868 A1* | 10/2012 | Ach ....................... G06Q 10/06 |
| | | 705/7.12 |
| 2012/0278091 A1* | 11/2012 | Yaseen .................. G06Q 30/02 |
| | | 705/1.1 |
| 2012/0278140 A1 | 11/2012 | Mercuri et al. |
| 2012/0330721 A1 | 12/2012 | Volpe et al. |
| 2013/0013350 A1 | 1/2013 | McCullough et al. |
| 2013/0018907 A1 | 1/2013 | Kuhn et al. |
| 2013/0054280 A1 | 2/2013 | Moshfeghi |
| 2013/0096813 A1 | 4/2013 | Geffner et al. |
| 2013/0103420 A1* | 4/2013 | Massoumi ............. G16H 10/60 |
| | | 705/3 |
| 2013/0129218 A1 | 5/2013 | Barrett et al. |
| 2013/0144800 A1 | 6/2013 | Fallows |
| 2013/0179203 A1 | 7/2013 | Mullen et al. |
| 2013/0246125 A1 | 9/2013 | DiGioacchino et al. |
| 2013/0317874 A1 | 11/2013 | Kozloski et al. |
| 2014/0005944 A1 | 1/2014 | Mani et al. |

(56) References Cited

U.S. PATENT DOCUMENTS

| | | |
|---|---|---|
| 2014/0039986 A1 | 2/2014 | Handley |
| 2014/0136443 A1 | 5/2014 | Kinsey, II et al. |
| 2014/0229213 A1 | 8/2014 | Matthews et al. |

OTHER PUBLICATIONS

Appointment-plus, "All-in-One Online Scheduling Software," Appointment-Plus Features, retrieved from the internet on Nov. 14, 2013 at: http://www.appointment-plus.com/product/how_it_works.php (4 pages).
Appointment-plus, Overview of "Best Online Appointment & Scheduleing Software System," retrieved from the internet on Nov. 14, 2013 at: http://www.appointment-plus.com (3 pages).
Appointy.com, "Appointment Scheduling Software," What is Appointy?, retrieved from the internet on Nov. 14, 2013 at: http://www.appointy.com (2 pages).
BookFresh, LLC, "Online Scheduling and Appointment Booking Software That's a Breeze," retrieved from the internet on Nov. 14, 2013 at: http://www.bookfresh.com (3 pages).
BookFresh, LLC, "Tour and Features: Appointment Software for Your Business," retrieved from the internet on Nov. 14, 2013 at: http://www.bookfresh/features/ (7 pages).
Burleson Consulting, "The Hierarchical Database Model Oracle Tips by Burleson Consulting," Jan. 6, 2010, retrieved from Wayback Machine, http://web.archive.org/web/20100106063425/http://www.dba-oracle.com/t_object_hierarchical_database.html.
Genbook, Inc., "Offer Online Appointments," retrieved from the internet on Nov. 14, 2013 at: http://www.genbook.com/features/ (2 pages).
Genbook, Inc., "Online Scheduling Software," retrieved from the internet on Nov. 14, 2013 at: http://www.genbook.com/features/online-scheduling-software.html (2 pages).
International Search Report and Written Opinion for International Patent Application No. PCT/US2013/70331 dated Jul. 8, 2014, (13 pages).
Setster, Inc., Overview, Features & Benefits: Online Scheduling Solutions (3 pages).
Simplify This, LLC, "Online Booking and Billing," retrieved from the internet on Nov. 14, 2013 at: http://www.simplifythis.com (1 page).
Simplify This, LLC, "Useful Features for Efficient Businesses," retrieved from the internet on Nov. 14, 2013 at: http://www.simplifythis.com/easybookfeatures.htm (2 pages).
StyleSeat, Inc., "The Beauty & Wellness Professional Plateform," retrieved from the internet on Nov. 14, 2013 at: https://www.styleseat.com/howitworks/pros (2 pages).
StyleSeat, Inc., "Your Beauty & Wellness Connection," retrieved from the internet on Nov. 14, 2013 at: https://www.styleseat.com/howitworks/clients (2 pages).
Wikipedia.org, "Machine Learning," "https://web.archive.org/web/20120523100049/http://en.wikipedia.org/wiki/Machine_learning," May 2012, (9 pages).
Xtime, Inc., "Dealer Solutions: How to Wow Your Customers," retrieved from the internet on Nov. 14, 2013 at: http://www.xtime.com/dealer-solutions (3 pages).
Xtime, Inc., "Xtime for Consumers: Getting the Exceptional Experience," retrieved from the internet on Nov. 14, 2013 at: http://www.xtime.com/solutions/consumer-solutions/ (3 pages).

* cited by examiner

METHODS AND SYSTEMS FOR ELECTRONIC FORM IDENTIFICATION AND POPULATION

CROSS-REFERENCE TO RELATED APPLICATION

This application is a continuation of U.S. patent application Ser. No. 16/515,619, filed on Jul. 18, 2019, which is a continuation of U.S. patent application Ser. No. 14/081,692, filed on Nov. 15, 2013, which claims priority to and the benefit of U.S. Provisional patent Application No. 61/726,644, entitled "Methods, Process and System for the Sale of Locally Delivered Consumer Services," filed on Nov. 15, 2012, the entireties of which are incorporated by reference herein.

BACKGROUND

The present disclosure relates generally to systems and methods for facilitating a commercial transaction between a customer and a merchant and, more particularly, to systems and methods for intelligent and dynamic scheduling, monitoring, and modification of customer appointments with merchants offering locally-provided services.

In the technology- and Internet-oriented landscape of today's world, scheduling an appointment for a service should be as easy as ordering a consumer product online. However, common life and business obstacles that affect scheduled services frequently arise. Some examples may include late arrivals caused by a consumer's lack of familiarity with the location of a service provider, no-shows resulting from absent-minded consumers, or delays in providing services arising from overbooking. Existing approaches do little to address these problems, resulting in lost revenue, wasted time, and other inefficiencies. Accordingly, there is a need for automation and innovation in the way that consumers purchase and consume locally-delivered consumer services.

BRIEF SUMMARY

In one aspect, a computer-implemented method comprises: predicting that a customer of a plurality of customers is likely to request a service wherein the prediction is based on historical data comprising attributes of different customers that have previously requested the service; predicting that one or more merchants of a plurality of merchants has a respective probability of being selected by the customer to provide the service that meets a threshold, wherein the predicting is based on historical data comprising attributes of different merchants that have previously provided the service; selecting one of the predicted merchants based on one or more criteria; scheduling an appointment for the service on a calendar of the customer and on a calendar of the selected merchant; and providing notification of the appointment to a customer device of the customer and a merchant device of the selected merchant.

In one implementation, scheduling the appointment comprises: sending information to the customer device to cause the customer device to notify the customer of the appointment; and after sending the information to the customer device, receiving from the customer device an indication of acceptance of the appointment.

In one implementation, scheduling the appointment comprises sending information to the merchant device to cause the merchant device to notify the merchant of the appointment; and after sending the information to the merchant device, receiving from the merchant device an indication of acceptance of the appointment.

In one implementation, the notification is one or more of: audio, visual, and haptic.

In one implementation, predicting that the customer of the plurality of customers is likely to request the service comprises: training a classifier to predict whether a given customer would request the service using the historical data comprising the attributes of different customers that have requested the service; and providing attributes of the customer as input to the classifier and obtaining a prediction as output of the classifier.

In one implementation, predicting that a merchant of the plurality of merchants is likely to be selected by the customer comprises: training a classifier to predict whether a given merchant would be selected to provide the service using the historical data comprising the attributes of different merchants that have previously provided the service; and providing attributes of the merchant as input to the classifier and obtaining a prediction as output of the classifier.

In one implementation, attributes of a particular customer comprises a plurality of the following: an identification attribute, a preference attribute, an asset attribute, and a task attribute.

In one implementation, a particular identification attribute is one of: name, gender, driver's license number, social security number, no-show performance, and home address; a particular preference attribute is one of: level of feedback expected from merchants, type of service, whether to automatically schedule appointments for services, whether to allow another user to purchase an appointment, physical exercise preference, whether to follow scheduled maintenance, a preference of merchant for a given service, and merchant location preference; a particular asset attribute is one of: primary care doctor, spouse/partner, home address, and vehicle identification number; and a particular task attribute is one of: car repair, car maintenance, doctor visit, exercise class, training, haircut, and spa appointment.

In one implementation, attributes of a particular merchant comprises a plurality of the following: an identification attribute, a preference attribute, a resource attribute, and a task attribute.

In one implementation, a particular identification attribute is one of: business name, service sector, business address, gender, business license, on-time performance, operating hours, type of personal care provider, type of automotive service provider, type of building maintenance provider, type of training provider, type of transportation services provider, and type of healthcare provider; a particular preference attribute is one of: resource utilization, accept weekend appointments, automatic appointment triage, accept emergency requests, accept insurance, and type of insurance accepted; a particular resource attribute is one of: employee name, employee specialty, and current location; and a particular task attribute is one of: car repair, car maintenance, doctor visit, exercise class, haircut, and spa appointment.

In one implementation, a service is one of: car repair, car maintenance, doctor visit, exercise class, training, haircut, and spa appointment.

In one implementation, a particular criterion is: a distance between a current location of the customer device and the merchant, a customer approval rating of the merchant, a preference of the customer, customer feedback regarding the merchant, or a specialty of the merchant.

In one implementation, the customer device is one of: a smart phone, a smart watch, smart glasses, a portable computer, and a tablet computer.

In one implementation, the method comprises predicting that one or more forms of a plurality of forms are likely to be required for the service, wherein the predicting is based on historical data comprising attributes of different merchants that have previously provided the service and attributes of different users that have previously requested the service; and providing access to the predicted forms to the customer.

In another aspect, a system comprises one or more computers programmed to perform operations comprising: predicting that a customer of a plurality of customers is likely to request a service wherein the prediction is based on historical data comprising attributes of different customers that have previously requested the service; predicting that one or more merchants of a plurality of merchants has a respective probability of being selected by the customer to provide the service that meets a threshold, wherein the predicting is based on historical data comprising attributes of different merchants that have previously provided the service; selecting one of the predicted merchants based on one or more criteria; scheduling an appointment for the service on a calendar of the customer and on a calendar of the selected merchant; and providing notification of the appointment to a customer device of the customer and a merchant device of the selected merchant.

In one implementation, scheduling the appointment comprises: sending information to the customer device to cause the customer device to notify the customer of the appointment; and after sending the information to the customer device, receiving from the customer device an indication of acceptance of the appointment.

In one implementation, scheduling the appointment comprises: sending information to the merchant device to cause the merchant device to notify the merchant of the appointment; and after sending the information to the merchant device, receiving from the merchant device an indication of acceptance of the appointment.

In one implementation, the notification is one or more of: audio, visual, and haptic.

In one implementation, predicting that the customer of the plurality of customers is likely to request the service comprises: training a classifier to predict whether a given customer would request the service using the historical data comprising the attributes of different customers that have requested the service; and providing attributes of the customer as input to the classifier and obtaining a prediction as output of the classifier.

In one implementation, predicting that a merchant of the plurality of merchants is likely to be selected by the customer comprises: training a classifier to predict whether a given merchant would be selected to provide the service using the historical data comprising the attributes of different merchants that have previously provided the service; and providing attributes of the merchant as input to the classifier and obtaining a prediction as output of the classifier.

In one implementation, attributes of a particular customer comprises a plurality of the following: an identification attribute, a preference attribute, an asset attribute, and a task attribute.

In one implementation, a particular identification attribute is one of: name, gender, driver's license number, social security number, no-show performance, and home address; a particular preference attribute is one of: level of feedback expected from merchants, type of service, whether to automatically schedule appointments for services, whether to allow another user to purchase an appointment, physical exercise preference, whether to follow scheduled maintenance, a preference of merchant for a given service, and merchant location preference; a particular asset attribute is one of: primary care doctor, spouse/partner, home address, and vehicle identification number; and a particular task attribute is one of: car repair, car maintenance, doctor visit, exercise class, training, haircut, and spa appointment.

In one implementation, attributes of a particular merchant comprises a plurality of the following: an identification attribute, a preference attribute, a resource attribute, and a task attribute.

In one implementation, a particular identification attribute is one of: business name, service sector, business address, gender, business license, on-time performance, operating hours, type of personal care provider, type of automotive service provider, type of building maintenance provider, type of training provider, type of transportation services provider, and type of healthcare provider; a particular preference attribute is one of: resource utilization, accept weekend appointments, automatic appointment triage, accept emergency requests, accept insurance, and type of insurance accepted; a particular resource attribute is one of: employee name, employee specialty, and current location; and a particular task attribute is one of: car repair, car maintenance, doctor visit, exercise class, haircut, and spa appointment.

In one implementation, a service is one of: car repair, car maintenance, doctor visit, exercise class, training, haircut, and spa appointment.

In one implementation, a particular criterion is: a distance between a current location of the customer device and the merchant, a customer approval rating of the merchant, a preference of the customer, customer feedback regarding the merchant, or a specialty of the merchant.

In one implementation, the customer device is one of: a smart phone, a smart watch, smart glasses, a portable computer, and a tablet computer.

In one implementation, the operations further comprise: predicting that one or more forms of a plurality of forms are likely to be required for the service, wherein the predicting is based on historical data comprising attributes of different merchants that have previously provided the service and attributes of different users that have previously requested the service; and providing access to the predicted forms to the customer.

In another aspect, an article of manufacture comprises a non-transitory machine-readable medium storing instructions that, when executed, configure one or more computers to perform operations comprising: predicting that a customer of a plurality of customers is likely to request a service wherein the prediction is based on historical data comprising attributes of different customers that have previously requested the service; predicting that one or more merchants of a plurality of merchants has a respective probability of being selected by the customer to provide the service that meets a threshold, wherein the predicting is based on historical data comprising attributes of different merchants that have previously provided the service; selecting one of the predicted merchants based on one or more criteria; scheduling an appointment for the service on a calendar of the customer and on a calendar of the selected merchant; and providing notification of the appointment to a customer device of the customer and a merchant device of the selected merchant.

In one implementation, scheduling the appointment comprises: sending information to the customer device to cause the customer device to notify the customer of the appointment; and after sending the information to the customer device, receiving from the customer device an indication of acceptance of the appointment.

In one implementation, scheduling the appointment comprises: sending information to the merchant device to cause the merchant device to notify the merchant of the appointment; and after sending the information to the merchant device, receiving from the merchant device an indication of acceptance of the appointment.

In one implementation, the notification is one or more of: audio, visual, and haptic.

In one implementation, predicting that the customer of the plurality of customers is likely to request the service comprises: training a classifier to predict whether a given customer would request the service using the historical data comprising the attributes of different customers that have requested the service; and providing attributes of the customer as input to the classifier and obtaining a prediction as output of the classifier.

In one implementation, predicting that a merchant of the plurality of merchants is likely to be selected by the customer comprises: training a classifier to predict whether a given merchant would be selected to provide the service using the historical data comprising the attributes of different merchants that have previously provided the service; and providing attributes of the merchant as input to the classifier and obtaining a prediction as output of the classifier.

In one implementation, attributes of a particular customer comprises a plurality of the following: an identification attribute, a preference attribute, an asset attribute, and a task attribute.

In one implementation, a particular identification attribute is one of: name, gender, driver's license number, social security number, no-show performance, and home address; a particular preference attribute is one of: level of feedback expected from merchants, type of service, whether to automatically schedule appointments for services, whether to allow another user to purchase an appointment, physical exercise preference, whether to follow scheduled maintenance, a preference of merchant for a given service, and merchant location preference; a particular asset attribute is one of: primary care doctor, spouse/partner, home address, and vehicle identification number; and a particular task attribute is one of: car repair, car maintenance, doctor visit, exercise class, training, haircut, and spa appointment.

In one implementation, attributes of a particular merchant comprises a plurality of the following: an identification attribute, a preference attribute, a resource attribute, and a task attribute.

In one implementation, a particular identification attribute is one of: business name, service sector, business address, gender, business license, on-time performance, operating hours, type of personal care provider, type of automotive service provider, type of building maintenance provider, type of training provider, type of transportation services provider, and type of healthcare provider; a particular preference attribute is one of: resource utilization, accept weekend appointments, automatic appointment triage, accept emergency requests, accept insurance, and type of insurance accepted; a particular resource attribute is one of: employee name, employee specialty, and current location; and a particular task attribute is one of: car repair, car maintenance, doctor visit, exercise class, haircut, and spa appointment.

In one implementation, a service is one of: car repair, car maintenance, doctor visit, exercise class, training, haircut, and spa appointment.

In one implementation, a particular criterion is: a distance between a current location of the customer device and the merchant, a customer approval rating of the merchant, a preference of the customer, customer feedback regarding the merchant, or a specialty of the merchant.

In one implementation, the customer device is one of: a smart phone, a smart watch, smart glasses, a portable computer, and a tablet computer.

In one implementation, the operations further comprise: predicting that one or more forms of a plurality of forms are likely to be required for the service, wherein the predicting is based on historical data comprising attributes of different merchants that have previously provided the service and attributes of different users that have previously requested the service; and providing access to the predicted forms to the customer.

In one aspect, a computer-implemented method comprises: identifying an appointment for a service scheduled on a calendar of a customer and scheduled on a calendar of a merchant; monitoring a location of a customer device of the customer during a period of time before the appointment; estimating an arrival time of the customer at a location of the merchant based on a current time, a current location of the customer device, and the location of the merchant; determining that the customer will be late for the appointment based on the estimated arrival time; and based on the determining, changing the appointment on the calendar of the merchant and on the calendar of the customer to accommodate the customer's estimated time of arrival at the location of the merchant.

In one implementation, changing the appointment comprises: providing notification of the appointment change to the customer device and to a merchant device of the merchant; and receiving acceptance of the appointment change from the customer device and from the merchant device.

In one implementation, after changing the appointment on the calendar of the merchant and on the calendar of the customer to accommodate the customer's estimated time of arrival at the location of the merchant, the method further comprises: providing notification of the appointment change to the customer device or a merchant device of the merchant.

In one implementation, changing the appointment comprises: providing notification that the customer will be late to a merchant device of the merchant; receiving a change to the appointment from the merchant device; providing notification of the appointment change to the customer device; and receiving acceptance of the appointment change from the customer device.

In one implementation, changing the appointment comprises: providing notification to the customer device of the possibility of exchanging appointments with another customer of the merchant; and receiving acceptance of the appointment exchange from the customer device.

In one implementation, providing notification to the customer device of the other customer of the possibility of exchanging appointments with the customer; and receiving acceptance of the appointment exchange from the customer device of the other customer.

In one implementation, the method comprises charging an account of the customer for the appointment change or crediting an account of the other customer for the appointment change.

In one implementation, crediting the account of the other customer comprises providing a discount for a service.

In one implementation, after determining that the customer will be late, the method further comprises: providing a notification to the customer device or a merchant device of the merchant that the customer will be late for the appointment.

In one implementation, the notification provides an option for canceling the appointment or rescheduling the appointment, and the method further comprises: receiving from the customer device a request to cancel or reschedule the appointment.

In one implementation, the method comprises debiting an account of the customer in response to receiving the request to cancel or reschedule the appointment.

In one implementation, the method comprises estimating the arrival time of the customer at the location of the merchant is further based on one or more of: driving conditions and weather.

In one implementation, the customer device is one of: a smart phone, a smart watch, smart glasses, a portable computer, and a tablet computer.

In another aspect, a system comprises one or more computers programmed to perform operations comprising: identifying an appointment for a service scheduled on a calendar of a customer and scheduled on a calendar of a merchant; monitoring a location of a customer device of the customer during a period of time before the appointment; estimating an arrival time of the customer at a location of the merchant based on a current time, a current location of the customer device, and the location of the merchant; determining that the customer will be late for the appointment based on the estimated arrival time; and based on the determining, changing the appointment on the calendar of the merchant and on the calendar of the customer to accommodate the customer's estimated time of arrival at the location of the merchant.

In one implementation, changing the appointment comprises: providing notification of the appointment change to the customer device and to a merchant device of the merchant; and receiving acceptance of the appointment change from the customer device and from the merchant device.

In one implementation, after changing the appointment on the calendar of the merchant and on the calendar of the customer to accommodate the customer's estimated time of arrival at the location of the merchant, the operations further comprise: providing notification of the appointment change to the customer device or a merchant device of the merchant.

In one implementation, changing the appointment comprises: providing notification that the customer will be late to a merchant device of the merchant; receiving a change to the appointment from the merchant device; providing notification of the appointment change to the customer device; and receiving acceptance of the appointment change from the customer device.

In one implementation, changing the appointment comprises: providing notification to the customer device of the possibility of exchanging appointments with another customer of the merchant; and receiving acceptance of the appointment exchange from the customer device.

In one implementation, the operations further comprise: providing notification to the customer device of the other customer of the possibility of exchanging appointments with the customer; and receiving acceptance of the appointment exchange from the customer device of the other customer.

In one implementation, the operations further comprise: charging an account of the customer for the appointment change or crediting an account of the other customer for the appointment change.

In one implementation, crediting the account of the other customer comprises providing a discount for a service.

In one implementation, after determining that the customer will be late, the operations further comprise: providing a notification to the customer device or a merchant device of the merchant that the customer will be late for the appointment.

In one implementation, the notification provides an option for canceling the appointment or rescheduling the appointment, and wherein the operations further comprise: receiving from the customer device a request to cancel or reschedule the appointment.

In one implementation, the operations further comprise debiting an account of the customer in response to receiving the request to cancel or reschedule the appointment.

In one implementation, estimating the arrival time of the customer at the location of the merchant is further based on one or more of: driving conditions and weather.

In one implementation, the customer device is one of: a smart phone, a smart watch, smart glasses, a portable computer, and a tablet computer.

In another aspect, an article of manufacture comprises a non-transitory machine-readable medium storing instructions that, when executed, configure one or more computers to perform operations comprising: identifying an appointment for a service scheduled on a calendar of a customer and scheduled on a calendar of a merchant; monitoring a location of a customer device of the customer during a period of time before the appointment; estimating an arrival time of the customer at a location of the merchant based on a current time, a current location of the customer device, and the location of the merchant; determining that the customer will be late for the appointment based on the estimated arrival time; and based on the determining, changing the appointment on the calendar of the merchant and on the calendar of the customer to accommodate the customer's estimated time of arrival at the location of the merchant.

In one implementation, changing the appointment comprises: providing notification of the appointment change to the customer device and to a merchant device of the merchant; and receiving acceptance of the appointment change from the customer device and from the merchant device.

In one implementation, after changing the appointment on the calendar of the merchant and on the calendar of the customer to accommodate the customer's estimated time of arrival at the location of the merchant, the operations further comprise: providing notification of the appointment change to the customer device or a merchant device of the merchant.

In one implementation, changing the appointment comprises: providing notification that the customer will be late to a merchant device of the merchant; receiving a change to the appointment from the merchant device; providing notification of the appointment change to the customer device; and receiving acceptance of the appointment change from the customer device.

In one implementation, changing the appointment comprises: providing notification to the customer device of the possibility of exchanging appointments with another customer of the merchant; and receiving acceptance of the appointment exchange from the customer device.

In one implementation, the operations further comprise: providing notification to the customer device of the other customer of the possibility of exchanging appointments with the customer; and receiving acceptance of the appointment exchange from the customer device of the other customer.

In one implementation, the operations further comprise: charging an account of the customer for the appointment change or crediting an account of the other customer for the appointment change.

In one implementation, crediting the account of the other customer comprises providing a discount for a service.

In one implementation, after determining that the customer will be late, the operations further comprise: providing a notification to the customer device or a merchant device of the merchant that the customer will be late for the appointment.

In one implementation, the notification provides an option for canceling the appointment or rescheduling the appointment, and wherein the operations further comprise: receiving from the customer device a request to cancel or reschedule the appointment.

In one implementation, the operations further comprise debiting an account of the customer in response to receiving the request to cancel or reschedule the appointment.

In one implementation, estimating the arrival time of the customer at the location of the merchant is further based on one or more of: driving conditions and weather.

In one implementation, the customer device is one of: a smart phone, a smart watch, smart glasses, a portable computer, and a tablet computer.

In one aspect, a computer-implemented method comprises: receiving a request from a customer device of a first customer to purchase an appointment for a service; identifying one or more second customers that each have a respective appointment for the service on a respective calendar of the second customer wherein the appointment is scheduled on a respective calendar of a respective merchant; identifying one or more of the appointments based on, at least, one or more criteria; receiving from the customer device of the first customer selection of one of the identified appointments; providing an offer to sell the selected appointment to a customer device of the second customer that has the appointment scheduled on their respective calendar; receiving acceptance of the offer to sell the selected appointment from the customer device of the second customer that has the appointment scheduled on their respective calendar; removing the selected appointment from the respective calendar of the second customer and adding the selected appointment to the calendar of the first customer; and updating the appointment scheduled on the respective calendar of one of the respective merchants to reflect that the appointment is with the first user.

In one implementation, a particular criterion is a distance between a location of the first customer and a location of the merchant that has the respective appointment scheduled on their respective calendar, a customer approval rating of the merchant, a preferred time or time range for the appointment, a preference of the first customer, customer feedback regarding the merchant, a specialty of the merchant, or a prediction that the first customer would likely select the merchant to provide the service.

In one implementation, the prediction that the first customer would likely select the merchant to provide the service is obtained by predicting based on historical data comprising attributes of different merchants and attributes of the first customer.

In one implementation, the method comprises: training a classifier to predict whether a given merchant would be selected to provide the service using the historical data; and providing attributes of the merchant and the attributes of the first customer as input to the classifier and obtaining the prediction as output of the classifier.

In one implementation, a particular criterion is whether the merchant that has the respective appointment scheduled on their respective calendar would have access to information from one or more prior appointments for the service for the first customer.

In one implementation, the method comprises debiting an account of the first customer.

In one implementation, the method comprises crediting an account of the second customer that has the appointment scheduled on their respective calendar.

In one implementation, the method comprises providing information regarding the identified appointments to the customer device of the first customer.

In one implementation, the customer device of the first customer is one of: a smart phone, a smart watch, smart glasses, a portable computer, and a tablet computer.

In another aspect, a system comprises one or more computers programmed to perform operations comprising: receiving a request from a customer device of a first customer to purchase an appointment for a service; identifying one or more second customers that each have a respective appointment for the service on a respective calendar of the second customer wherein the appointment is scheduled on a respective calendar of a respective merchant; identifying one or more of the appointments based on, at least, one or more criteria; receiving from the customer device of the first customer selection of one of the identified appointments; providing an offer to sell the selected appointment to a customer device of the second customer that has the appointment scheduled on their respective calendar; receiving acceptance of the offer to sell the selected appointment from the customer device of the second customer that has the appointment scheduled on their respective calendar; removing the selected appointment from the respective calendar of the second customer and adding the selected appointment to the calendar of the first customer; and updating the appointment scheduled on the respective calendar of one of the respective merchants to reflect that the appointment is with the first user.

In one implementation, a particular criterion is: a distance between a location of the first customer and a location of the merchant that has the respective appointment scheduled on their respective calendar, a customer approval rating of the merchant, a preferred time or time range for the appointment, a preference of the first customer, customer feedback regarding the merchant, a specialty of the merchant, or a prediction that the first customer would likely select the merchant to provide the service.

In one implementation, the prediction that the first customer would likely select the merchant to provide the service is obtained by predicting based on historical data comprising attributes of different merchants and attributes of the first customer.

In one implementation, the operations further comprise: training a classifier to predict whether a given merchant would be selected to provide the service using the historical data; and providing attributes of the merchant and the attributes of the first customer as input to the classifier and obtaining the prediction as output of the classifier.

In one implementation, a particular criterion is whether the merchant that has the respective appointment scheduled on their respective calendar would have access to information from one or more prior appointments for the service for the first customer.

In one implementation, the operations further comprise debiting an account of the first customer.

In one implementation, the operations further comprise crediting an account of the second customer that has the appointment scheduled on their respective calendar.

In one implementation, the operations further comprise providing information regarding the identified appointments to the customer device of the first customer.

In one implementation, the customer device of the first customer is one of: a smart phone, a smart watch, smart glasses, a portable computer, and a tablet computer.

In another aspect, an article of manufacture comprises a non-transitory machine-readable medium storing instructions that, when executed, configure one or more computers to perform operations comprising: receiving a request from a customer device of a first customer to purchase an appointment for a service; identifying one or more second customers that each have a respective appointment for the service on a respective calendar of the second customer wherein the appointment is scheduled on a respective calendar of a respective merchant; identifying one or more of the appointments based on, at least, one or more criteria; receiving from the customer device of the first customer selection of one of the identified appointments; providing an offer to sell the selected appointment to a customer device of the second customer that has the appointment scheduled on their respective calendar; receiving acceptance of the offer to sell the selected appointment from the customer device of the second customer that has the appointment scheduled on their respective calendar; removing the selected appointment from the respective calendar of the second customer and adding the selected appointment to the calendar of the first customer; and updating the appointment scheduled on the respective calendar of one of the respective merchants to reflect that the appointment is with the first user.

In one implementation, a particular criterion is: a distance between a location of the first customer and a location of the merchant that has the respective appointment scheduled on their respective calendar, a customer approval rating of the merchant, a preferred time or time range for the appointment, a preference of the first customer, customer feedback regarding the merchant, a specialty of the merchant, or a prediction that the first customer would likely select the merchant to provide the service.

In one implementation, the prediction that the first customer would likely select the merchant to provide the service is obtained by predicting based on historical data comprising attributes of different merchants and attributes of the first customer.

In one implementation, the operations further comprise: training a classifier to predict whether a given merchant would be selected to provide the service using the historical data; and providing attributes of the merchant and the attributes of the first customer as input to the classifier and obtaining the prediction as output of the classifier.

In one implementation, a particular criterion is whether the merchant that has the respective appointment scheduled on their respective calendar would have access to information from one or more prior appointments for the service for the first customer.

In one implementation, the operations further comprise debiting an account of the first customer.

In one implementation, the operations further comprise crediting an account of the second customer that has the appointment scheduled on their respective calendar.

In one implementation, the operations further comprise providing information regarding the identified appointments to the customer device of the first customer.

In one implementation, the customer device of the first customer is one of: a smart phone, a smart watch, smart glasses, a portable computer, and a tablet computer.

In one aspect, a computer-implemented method comprises: obtaining an adverse report against a merchant by a customer regarding an issue with a previously scheduled appointment for a service that was scheduled on a calendar of the customer and on a calendar of the merchant; predicting that a solution of a plurality of different solutions has a respective probability of resolving the issue that meets a threshold, wherein the predicting is based on historical data comprising attributes of different customers that were satisfied by the solution for the issue given the service and attributes of the merchant; providing the adverse report and the predicted solution to a merchant device of the merchant; and within a pre-determined period of time, if a proposed resolution is not received from the merchant device, publishing the adverse report; otherwise, if a proposed resolution is received from the merchant device, storing the adverse report in a non-publishable state.

In one implementation, publishing the adverse report comprises: enabling the customer to modify the adverse report before the adverse report is published; receiving a modification to the adverse report from a customer device of the customer; and including the modification in the published adverse report.

In one implementation, the method further comprises, after storing the adverse report in the non-publishable state, publishing the adverse report.

In one implementation, the method further comprises enabling the customer to cancel publication of the adverse report.

In one implementation, after receiving the proposed resolution, the method further comprises: enabling the customer to provide negotiation feedback regarding the proposed resolution; receiving the negotiation feedback from a customer device of the customer; assigning a feedback rating to the negotiation feedback; and publishing the assigned feedback rating.

In one implementation, enabling the customer to provide negotiation feedback comprises generating a plurality of questions about services provided by the merchant and providing the customer device with at least one of the questions.

In one implementation, the method further comprises: monitoring published adverse reports against a particular merchant; and assigning a rating to the particular merchant based on, at least, the published adverse reports.

In one implementation, assigning the rating to the particular merchant is further based on, at least, proposed resolutions received from the merchant device.

In one implementation, predicting that the solution will resolve the issue comprises: training a classifier to predict whether a given solution will resolve the issue using historical data comprising attributes of different customers that were satisfied by the solution, the service, and attributes of the merchant; and providing attributes of the customer as input to the classifier and obtaining a prediction as output of the classifier.

In another aspect, a system comprises one or more computers programmed to perform operations comprising: obtaining an adverse report against a merchant by a customer regarding an issue with a previously scheduled appointment for a service that was scheduled on a calendar of the customer and on a calendar of the merchant; predicting that a solution of a plurality of different solutions has a respective probability of resolving the issue that meets a threshold, wherein the predicting is based on historical data comprising attributes of different customers that were satisfied by the solution for the issue given the service and attributes of the merchant; providing the adverse report and the predicted solution to a merchant device of the merchant; and within a pre-determined period of time, if a proposed resolution is not received from the merchant device, publishing the adverse report; otherwise, if a proposed resolution is received from the merchant device, storing the adverse report in a non-publishable state.

In one implementation, publishing the adverse report comprises: enabling the customer to modify the adverse report before the adverse report is published; receiving a modification to the adverse report from a customer device of the customer; and including the modification in the published adverse report.

In one implementation, the operations further comprise, after storing the adverse report in the non-publishable state, publishing the adverse report.

In one implementation, the operations further comprise enabling the customer to cancel publication of the adverse report.

In one implementation, after receiving the proposed resolution, the operations further comprise: enabling the customer to provide negotiation feedback regarding the proposed resolution; receiving the negotiation feedback from a customer device of the customer; assigning a feedback rating to the negotiation feedback; and publishing the assigned feedback rating.

In one implementation, enabling the customer to provide negotiation feedback comprises generating a plurality of questions about services provided by the merchant and providing the customer device with at least one of the questions.

In one implementation, the operations further comprise: monitoring published adverse reports against a particular merchant; and assigning a rating to the particular merchant based on, at least, the published adverse reports.

In one implementation, assigning the rating to the particular merchant is further based on, at least, proposed resolutions received from the merchant device.

In one implementation, predicting that the solution will resolve the issue comprises: training a classifier to predict whether a given solution will resolve the issue using historical data comprising attributes of different customers that were satisfied by the solution, the service, and attributes of the merchant; and providing attributes of the customer as input to the classifier and obtaining a prediction as output of the classifier.

In another aspect, an article of manufacture comprises a non-transitory machine-readable medium storing instructions that, when executed, configure one or more computers to perform operations comprising: obtaining an adverse report against a merchant by a customer regarding an issue with a previously scheduled appointment for a service that was scheduled on a calendar of the customer and on a calendar of the merchant; predicting that a solution of a plurality of different solutions has a respective probability of resolving the issue that meets a threshold, wherein the predicting is based on historical data comprising attributes of different customers that were satisfied by the solution for the issue given the service and attributes of the merchant; providing the adverse report and the predicted solution to a merchant device of the merchant; and within a pre-determined period of time, if a proposed resolution is not received from the merchant device, publishing the adverse report; otherwise, if a proposed resolution is received from the merchant device, storing the adverse report in a non-publishable state.

In one implementation, publishing the adverse report comprises: enabling the customer to modify the adverse report before the adverse report is published; receiving a modification to the adverse report from a customer device of the customer; and including the modification in the published adverse report.

In one implementation, the operations further comprise, after storing the adverse report in the non-publishable state, publishing the adverse report.

In one implementation, the operations further comprise enabling the customer to cancel publication of the adverse report.

In one implementation, after receiving the proposed resolution, the operations further comprise: enabling the customer to provide negotiation feedback regarding the proposed resolution; receiving the negotiation feedback from a customer device of the customer; assigning a feedback rating to the negotiation feedback; and publishing the assigned feedback rating.

In one implementation, enabling the customer to provide negotiation feedback comprises generating a plurality of questions about services provided by the merchant and providing the customer device with at least one of the questions.

In one implementation, the operations further comprise: monitoring published adverse reports against a particular merchant; and assigning a rating to the particular merchant based on, at least, the published adverse reports.

In one implementation, assigning the rating to the particular merchant is further based on, at least, proposed resolutions received from the merchant device.

In one implementation, predicting that the solution will resolve the issue comprises: training a classifier to predict whether a given solution will resolve the issue using historical data comprising attributes of different customers that were satisfied by the solution, the service, and attributes of the merchant; and providing attributes of the customer as input to the classifier and obtaining a prediction as output of the classifier.

In one aspect, a computer-implemented method comprises: determining, for each of a plurality of different merchants, a respective on-time performance of the merchant wherein the on-time performance of the merchant is a measure of appointment schedule adherence of the merchant; receiving a request for a service for a customer; selecting a merchant from a plurality of the merchants to provide the service wherein the on-time performance of the selected merchant meets a threshold level of timeliness, and wherein the threshold level of timeliness is based on, at least, the service; scheduling an appointment for the service on a calendar of the selected merchant on a calendar of the customer; and monitoring the merchant calendar and the customer calendar for changes to the appointment.

In one implementation, the request for the service is received from a customer device of the customer or from a device of a third party.

In one implementation, the customer device is one of: a smart phone, a smart watch, smart glasses, a portable computer, and a tablet computer.

In one implementation, scheduling the appointment comprises: providing historical data regarding on-time performance of the customer to a merchant device of the selected merchant; and enabling the selected merchant to opt out of providing the service to the customer.

In one implementation, scheduling the appointment comprises: providing historical data regarding on-time performance of the selected merchant to a customer device of the customer; and enabling the customer to opt out of receiving the service from the selected merchant.

In one implementation, selecting the merchant comprises: predicting that a particular merchant has a respective probability of being selected by the customer to provide the service that meets a threshold, wherein the predicting is based on historical data comprising attributes of different merchants that have previously provided the service and attributes of the customer; and selecting the particular merchant to provide the service.

In one implementation, selecting the merchant comprises: determining that the particular merchant has a higher probability than all of the other merchants; and receiving selection of the particular merchant from a customer device of the customer.

In one implementation, monitoring the merchant calendar and the customer calendar comprises monitoring a geographical location of a customer device of the customer to determine if the customer will be late for the appointment based on an estimated arrival time of the customer at a location of the merchant.

In one implementation, the method further comprises providing notification to at least one of the customer device and a merchant device of the merchant if the customer will be late for the appointment.

In one implementation, the method comprises receiving a change to the appointment from the merchant device; providing notification of the appointment change to the customer device; and receiving acceptance of the appointment change from the customer device.

In another aspect, a system comprises one or more computers programmed to perform operations comprising: determining, for each of a plurality of different merchants, a respective on-time performance of the merchant wherein the on-time performance of the merchant is a measure of appointment schedule adherence of the merchant; receiving a request for a service for a customer; selecting a merchant from a plurality of the merchants to provide the service wherein the on-time performance of the selected merchant meets a threshold level of timeliness, and wherein the threshold level of timeliness is based on, at least, the service; scheduling an appointment for the service on a calendar of the selected merchant on a calendar of the customer; and monitoring the merchant calendar and the customer calendar for changes to the appointment.

In one implementation, the request for the service is received from a customer device of the customer or from a device of a third party.

In one implementation, the customer device is one of: a smart phone, a smart watch, smart glasses, a portable computer, and a tablet computer.

In one implementation, scheduling the appointment comprises: providing historical data regarding on-time performance of the customer to a merchant device of the selected merchant; and enabling the selected merchant to opt out of providing the service to the customer.

In one implementation, scheduling the appointment comprises: providing historical data regarding on-time performance of the selected merchant to a customer device of the customer; and enabling the customer to opt out of receiving the service from the selected merchant.

In one implementation, selecting the merchant comprises: predicting that a particular merchant has a respective probability of being selected by the customer to provide the service that meets a threshold, wherein the predicting is based on historical data comprising attributes of different merchants that have previously provided the service and attributes of the customer; and selecting the particular merchant to provide the service.

In one implementation, selecting the merchant comprises: determining that the particular merchant has a higher probability than all of the other merchants; and receiving selection of the particular merchant from a customer device of the customer.

In one implementation, monitoring the merchant calendar and the customer calendar comprises monitoring a geographical location of a customer device of the customer to determine if the customer will be late for the appointment based on an estimated arrival time of the customer at a location of the merchant.

In one implementation, the operations further comprise providing notification to at least one of the customer device and a merchant device of the merchant if the customer will be late for the appointment.

In one implementation, the operations further comprise: receiving a change to the appointment from the merchant device; providing notification of the appointment change to the customer device; and receiving acceptance of the appointment change from the customer device.

In another aspect, an article of manufacture comprises a non-transitory machine-readable medium storing instructions that, when executed, configure one or more computers to perform operations comprising: determining, for each of a plurality of different merchants, a respective on-time performance of the merchant wherein the on-time performance of the merchant is a measure of appointment schedule adherence of the merchant; receiving a request for a service for a customer; selecting a merchant from a plurality of the merchants to provide the service wherein the on-time performance of the selected merchant meets a threshold level of timeliness, and wherein the threshold level of timeliness is based on, at least, the service; scheduling an appointment for the service on a calendar of the selected merchant on a calendar of the customer; and monitoring the merchant calendar and the customer calendar for changes to the appointment.

In one implementation, the request for the service is received from a customer device of the customer or from a device of a third party.

In one implementation, the customer device is one of: a smart phone, a smart watch, smart glasses, a portable computer, and a tablet computer.

In one implementation, scheduling the appointment comprises: providing historical data regarding on-time performance of the customer to a merchant device of the selected merchant; and enabling the selected merchant to opt out of providing the service to the customer.

In one implementation, scheduling the appointment comprises: providing historical data regarding on-time performance of the selected merchant to a customer device of the customer; and enabling the customer to opt out of receiving the service from the selected merchant.

In one implementation, selecting the merchant comprises: predicting that a particular merchant has a respective probability of being selected by the customer to provide the service that meets a threshold, wherein the predicting is based on historical data comprising attributes of different merchants that have previously provided the service and attributes of the customer; and selecting the particular merchant to provide the service.

In one implementation, selecting the merchant comprises: determining that the particular merchant has a higher probability than all of the other merchants; and receiving selection of the particular merchant from a customer device of the customer.

In one implementation, monitoring the merchant calendar and the customer calendar comprises monitoring a geographical location of a customer device of the customer to determine if the customer will be late for the appointment based on an estimated arrival time of the customer at a location of the merchant.

In one implementation, the operations further comprise providing notification to at least one of the customer device and a merchant device of the merchant if the customer will be late for the appointment.

In one implementation, the operations further comprise: receiving a change to the appointment from the merchant device; providing notification of the appointment change to the customer device; and receiving acceptance of the appointment change from the customer device.

In one aspect, a computer-implemented method comprises: obtaining a plurality of attributes for a particular customer and identification of a service; predicting that each of a plurality of merchants has a respective probability of being selected by the customer to provide the service that meets a threshold, wherein the predicting is based on historical data comprising attributes of different merchants that have previously provided the service to customers that have attributes similar to those of the particular customer; and obtaining, for each of the merchants, cost information based on amounts paid by respective customers for receiving the service from the merchant; and providing the respective information to the particular customer.

In one implementation, obtaining the cost information comprises combining the cost information such that identifying information of the merchant and the respective customers is removed.

In one implementation, obtaining the cost information comprises automatically collecting billing documentation from the merchant, the billing documentation comprising the amounts paid by the respective customers.

In one implementation, the method further comprises providing the respective information to one or more merchants of the plurality of merchants.

In one implementation, predicting that a merchant of the plurality of merchants is likely to be selected by the customer comprises: training a classifier to predict whether a given merchant would be selected to provide the service using the historical data comprising the attributes of different merchants that have previously provided the service; and providing attributes of the merchant as input to the classifier and obtaining a prediction as output of the classifier.

In one implementation, the attributes of the merchant comprise a plurality of the following: an identification attribute, a preference attribute, a resource attribute, and a task attribute.

In one implementation, a particular identification attribute is one of: business name, service sector, business address, gender, business license, on time performance, operating hours, type of personal care provider, type of automotive service provider, type of building maintenance provider, type of training provider, type of transportation services provider, and type of healthcare provider; a particular preference attribute is one of: resource utilization, accept weekend appointments, automatic appointment triage, accept emergency requests, accept insurance, and type of insurance accepted; a particular resource attribute is one of: employee name, employee specialty, and current location; and a particular task attribute is one of: car repair, car maintenance, doctor visit, exercise class, haircut, and spa appointment.

In one implementation, the attributes of the customer comprise a plurality of the following: an identification attribute, a preference attribute, an asset attribute, and a task attribute.

In one implementation, a particular identification attribute is one of: name, gender, driver's license number, social security number, no-show performance, and home address; a particular preference attribute is one of: level of feedback expected from merchants, type of service, whether to automatically schedule appointments for services, whether to allow another user to purchase an appointment, physical exercise preference, whether to follow scheduled maintenance, a preference of merchant for a given service, and merchant location preference; wherein a particular asset attribute is one of: primary care doctor, spouse/partner, home address, and vehicle identification number; and wherein a particular task attribute is one of: car repair, car maintenance, doctor visit, exercise class, training, haircut, and spa appointment.

In one implementation, the service is one of: car repair, car maintenance, doctor visit, exercise class, training, haircut, and spa appointment.

In another aspect, a system comprises one or more computers programmed to perform operations comprising: obtaining a plurality of attributes for a particular customer and identification of a service; predicting that each of a plurality of merchants has a respective probability of being selected by the customer to provide the service that meets a threshold, wherein the predicting is based on historical data comprising attributes of different merchants that have previously provided the service to customers that have attributes similar to those of the particular customer; and obtaining, for each of the merchants, cost information based on amounts paid by respective customers for receiving the service from the merchant; and providing the respective information to the particular customer.

In one implementation, obtaining the cost information comprises combining the cost information such that identifying information of the merchant and the respective customers is removed.

In one implementation, obtaining the cost information comprises automatically collecting billing documentation from the merchant, the billing documentation comprising the amounts paid by the respective customers.

In one implementation, the operations further comprise providing the respective information to one or more merchants of the plurality of merchants.

In one implementation, predicting that a merchant of the plurality of merchants is likely to be selected by the customer comprises: training a classifier to predict whether a given merchant would be selected to provide the service using the historical data comprising the attributes of different merchants that have previously provided the service; and providing attributes of the merchant as input to the classifier and obtaining a prediction as output of the classifier.

In one implementation, the attributes of the merchant comprise a plurality of the following: an identification attribute, a preference attribute, a resource attribute, and a task attribute.

In one implementation, a particular identification attribute is one of: business name, service sector, business address, gender, business license, on time performance, operating hours, type of personal care provider, type of automotive service provider, type of building maintenance provider, type of training provider, type of transportation services provider, and type of healthcare provider; a particular preference attribute is one of: resource utilization, accept weekend appointments, automatic appointment triage, accept emergency requests, accept insurance, and type of insurance accepted; a particular resource attribute is one of: employee name, employee specialty, and current location; and a particular task attribute is one of: car repair, car maintenance, doctor visit, exercise class, haircut, and spa appointment.

In one implementation, the attributes of the customer comprise a plurality of the following: an identification attribute, a preference attribute, an asset attribute, and a task attribute.

In one implementation, a particular identification attribute is one of: name, gender, driver's license number, social security number, no-show performance, and home address; a particular preference attribute is one of: level of feedback expected from merchants, type of service, whether to automatically schedule appointments for services, whether to allow another user to purchase an appointment, physical exercise preference, whether to follow scheduled maintenance, a preference of merchant for a given service, and merchant location preference; a particular asset attribute is one of: primary care doctor, spouse/partner, home address, and vehicle identification number; and a particular task attribute is one of: car repair, car maintenance, doctor visit, exercise class, training, haircut, and spa appointment.

In one implementation, the service is one of: car repair, car maintenance, doctor visit, exercise class, training, haircut, and spa appointment.

In another aspect, an article of manufacture comprises a non-transitory machine-readable medium storing instructions that, when executed, configure one or more computers to perform operations comprising: obtaining a plurality of attributes for a particular customer and identification of a service; predicting that each of a plurality of merchants has a respective probability of being selected by the customer to provide the service that meets a threshold, wherein the predicting is based on historical data comprising attributes of different merchants that have previously provided the service to customers that have attributes similar to those of the particular customer; and obtaining, for each of the merchants, cost information based on amounts paid by respective customers for receiving the service from the merchant; and providing the respective information to the particular customer.

In one implementation, obtaining the cost information comprises combining the cost information such that identifying information of the merchant and the respective customers is removed.

In one implementation, obtaining the cost information comprises automatically collecting billing documentation from the merchant, the billing documentation comprising the amounts paid by the respective customers.

In one implementation, the operations further comprise providing the respective information to one or more merchants of the plurality of merchants.

In one implementation, predicting that a merchant of the plurality of merchants is likely to be selected by the customer comprises: training a classifier to predict whether a given merchant would be selected to provide the service using the historical data comprising the attributes of different merchants that have previously provided the service; and providing attributes of the merchant as input to the classifier and obtaining a prediction as output of the classifier.

In one implementation, the attributes of the merchant comprise a plurality of the following: an identification attribute, a preference attribute, a resource attribute, and a task attribute.

In one implementation, a particular identification attribute is one of: business name, service sector, business address, gender, business license, on time performance, operating hours, type of personal care provider, type of automotive service provider, type of building maintenance provider, type of training provider, type of transportation services provider, and type of healthcare provider; a particular preference attribute is one of: resource utilization, accept weekend appointments, automatic appointment triage, accept emergency requests, accept insurance, and type of insurance accepted; a particular resource attribute is one of: employee name, employee specialty, and current location; and a particular task attribute is one of: car repair, car maintenance, doctor visit, exercise class, haircut, and spa appointment.

In one implementation, the attributes of the customer comprise a plurality of the following: an identification attribute, a preference attribute, an asset attribute, and a task attribute.

In one implementation, a particular identification attribute is one of: name, gender, driver's license number, social security number, no-show performance, and home address; a particular preference attribute is one of: level of feedback expected from merchants, type of service, whether to automatically schedule appointments for services, whether to allow another user to purchase an appointment, physical exercise preference, whether to follow scheduled maintenance, a preference of merchant for a given service, and merchant location preference; a particular asset attribute is one of: primary care doctor, spouse/partner, home address, and vehicle identification number; and a particular task attribute is one of: car repair, car maintenance, doctor visit, exercise class, training, haircut, and spa appointment.

In one implementation, the service is one of: car repair, car maintenance, doctor visit, exercise class, training, haircut, and spa appointment.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
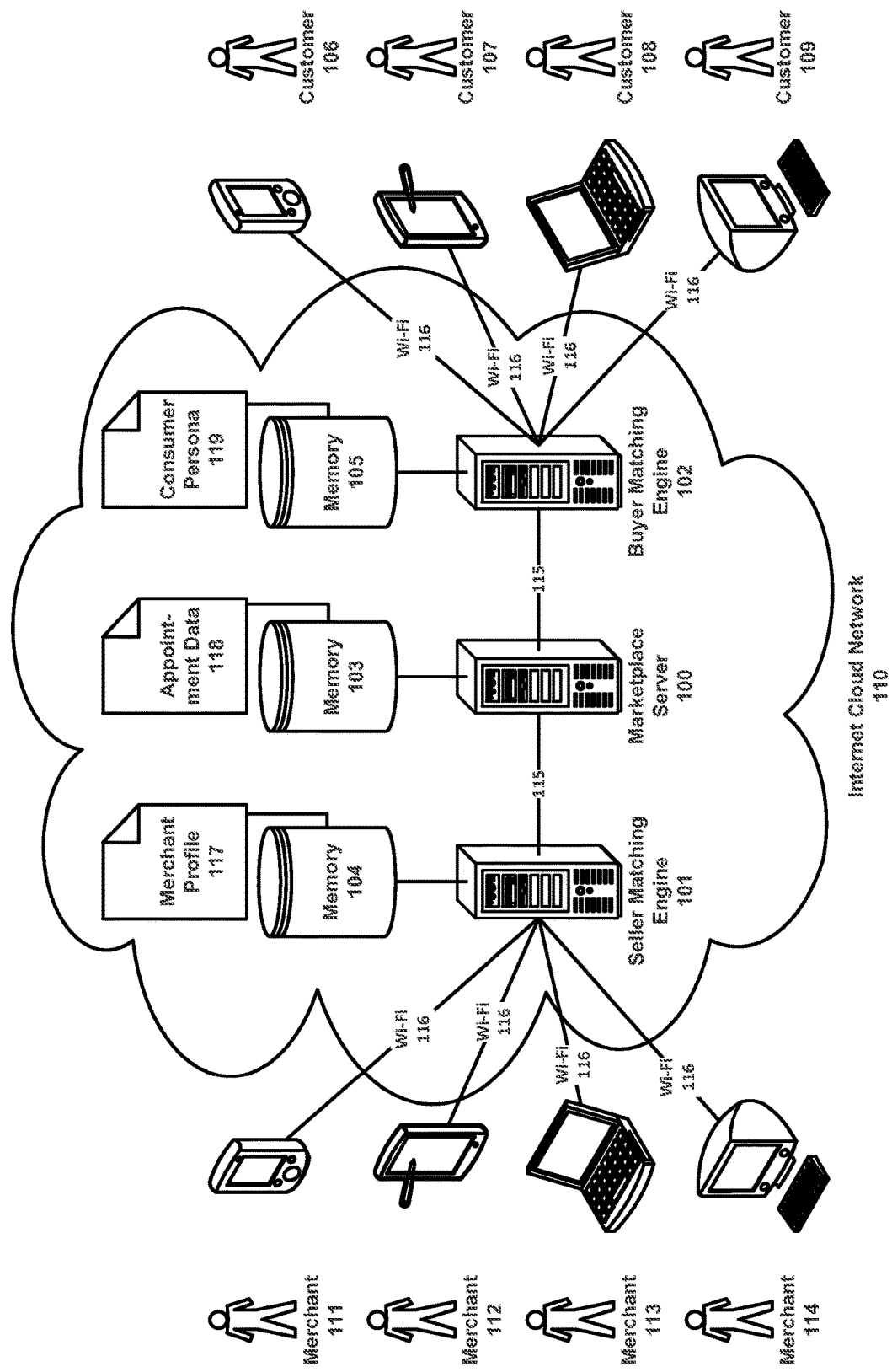
FIG. 1 is a diagram illustrating an example marketplace matching system.

Described herein in various implementations are systems and accompanying methods for matching consumers and service providers, including an online, real-time, marketplace to match and connect consumers with merchants and professionals to buy and sell consumer services; a matching system and method for an online marketplace for the sourcing, marketing, sale and delivery of consumer services using buyer and seller preferences and histories; an Internet cloud-based hardware server(s) that is connected with a secure Buyer Matching Engine and a secure Seller Matching Engine and that offers a secure marketplace environment for the sourcing and marketing, sale and acquisition, delivery and acceptance, payment, feedback, and electronic digital archiving of consumer services; and an Internet marketplace with tightly integrated marketplace services for the purchase and sale of consumer services that is based on an Internet application where individual consumer's calendars are maintained to manage their daily life activities for the maintenance of their personal health and services, the health of their family, the maintenance of their assets, and so forth. The same application can also be used by merchants and service professionals to maintain complete operating schedules for all productive assets used to generate their service income.

As used herein, a "merchant" is a person, organization, or entity that operates in the business of selling services and/or goods. A "merchant" can include a service provider that accepts scheduled appointments with customers, including, but not limited to, an automotive mechanic, a medical professional, a lawyer, a photographer, a massage therapist, a dentist, a hairdresser, and the like. A "customer," or "consumer," is a person, organization, or entity that purchases services and/or goods provided by a merchant, and can include, for example, a person or company that schedules a service appointment with a merchant in order to receive the service at a predefined time. "Services" are provided by a merchant and offer a benefit to a customer. By way of example, "services" can include automotive maintenance and repair, health and beauty services, training, photography, legal services, and so on.

The Matching Process

Matching is the process by which the needs of the consumer are aligned with the capabilities of the merchant. The closer the alignment of the particulars of what the consumer desires, the more successful the match will be. As used in conjunction with the techniques described herein, "matching" refers to the needs of the consumer being aligned with the capabilities of the merchant or professional. In one implementation, there are three types of matches that can be made when consumers are aligning with merchants.

A manual match occurs where the consumer sees what is being offered (e.g., on a webpage or in a newspaper) and makes a decision to accept and therefore to confirm the transaction. In this case the confirmation of a service appointment under the arrangements offered, which can include, but not necessarily be limited to, time, cost, services included, and location, is made. In this particular process, a consumer has not provided the merchant with the details of what they are seeking. The consumer has merely encountered an offer, found the details acceptable, and taken action to accept the offer or to follow-through and make an appointment for the service.

An option match occurs when the consumer provides information, e.g., through preferences, and a so-called matching engine determines that the preferences align with the merchant or professional closely enough for the match to be suggested to the consumer. This particular type of match does not require that every preference is lined up but that a threshold number of preferences match in some manner. An example of an option match relates to a consumer who has defined very specific preferences, such as a specific price, time, feedback rating, etc. and the merchant's ongoing data (i.e., the merchant's past and present data, including, e.g., past, present and future scheduled appointments, prices for services, on-time performance, feedback ratings, and so on) either match or substantially match (e.g., meet a matching threshold of 50% or greater, 60% or greater, 70% or greater, 80% or greater, 90% or greater, and so on). In addition, there are a number of options in which some, but not all, of the preferences are matched. The options are presented to the consumer for their conscious, real-time decision and the consumer is required to take action to follow-through.

An automatic match can occur when every preference (or substantially all of the preferences) of the consumer, as well as all or substantially all related ongoing data (i.e., the consumer's past and present data, including, e.g., past, present and future scheduled appointments, service price preferences, on-time performance, merchant rating preferences, and so on), is aligned with the offering of the merchant or professional: the match is automatically made, an appointment commitment is completed, and neither the consumer nor the merchant or professional make conscious, real-time acceptance actions, which, instead, are made by proxy on their behalf by the system. A simple or direct example of an automatic match involves a transaction between a consumer and a merchant that the consumer has used in the past. Another example would involve a consumer who is seeking a haircut appointment at 12:00 p.m. on Friday from a barber with a feedback rating of 4 or greater on a scale of 5, at a cost not to exceed $25 and at a business location that is within a two block radius of the consumer's place of work. If everything lines up, a match can be made and the service appointment can be automatically scheduled.

Thus, the present disclosure describes methods and either automatic or notification processes that effectively handle all three types of matches. In addition, when the three types of matches are combined with the consumer's ability to set preferences in their personal profile, or where the merchant is able to set preferences in their business profile, there are unlimited variations of the three types of matches and each consumer and merchant can engage in transactions and confirmations that meet their specific needs in an automated environment.

In some implementations, the matching process is facilitated or automatically performed using machine learning, pattern recognition, data mining, statistical correlation, and other suitable known techniques. In one example, the merchant and consumer attributes can be viewed as vectors in a multi-dimensional space (i.e., a consumer attribute vector and a merchant attribute vector), and the similarity between relevant attributes (e.g., a "match" between a merchant's rating and a consumer's desired rating) can be determined based on a cosine angle between vectors. As another example, a decision tree can be used as a predictive model which maps observations about merchant and consumer attributes to determine whether particular attributes signify a particular conclusion (e.g., whether a consumer is likely to choose a particular merchant based on the merchant's location). In another example, sets of data including merchant attributes and consumer attributes are correlating to determine a statistical relationship, or dependence. Using this technique, the system may, e.g., predict how likely a consumer is to select a merchant to provide a service based on the price the merchant charges for the service.

With some machine learning techniques, a classifier (e.g., a suitable algorithm that categorizes new observations) can be trained over time using various historical data, such as customer attributes, merchant attributes, service purchases by customers, services offered by merchants, service prices charged by merchants and costs incurred by customers, service completion times, customer and merchant timeliness, ratings, issue resolutions, and other data related to a customer, merchant, service, or the like that can be input to a classifier and allow the present system to make predictions about customer or merchant behaviors, merchant and service recommendations, and so forth, as further described herein. For example, if the training data for a classifier include two attributes (car make and geographic location of a customer), and the classifier output is a prediction whether the customer would choose to get service from Joe's Garage, the training data could include (1) Make: BMW, Location: San Francisco, Choose Service: No; (2) Make: Mercedes, Location: San Jose, Choose Service: Yes; (3) Make: Honda, Location: Menlo Park, Choose Service: Yes; etc. A customer's car make and location can then be input to the trained classifier to obtain as output a prediction of whether the service will be chosen.

Attributes are characteristics, properties, or preferences associated with a merchant or consumer. Consumer identification attributes specify identifying information about a consumer, such as name, gender, driver's license number, social security number, no-show performance, and home address. Consumer preference attributes represent a consumer's choices with respect to various system settings, services, or other items. For example, consumer preference attributes can include: level of feedback expected from merchants, type of service, whether to automatically schedule appointments for services, whether to allow another user to purchase an appointment, physical exercise preference, whether to follow scheduled maintenance, a preference of merchant for a given service, and merchant location preference. Consumer asset attributes are characteristics relating to assets of the consumer, for example, the consumer's primary care doctor, spouse/partner, home address, and vehicle identification number. Consumer task attributes are properties associated with tasks or services the consumer can request or purchase, such as car repair, car maintenance, doctor visits, exercise classes, training, haircuts, and spa appointments.

Merchant identification attributes specify identifying information about a merchant, such as business name, service sector, business address, gender, business license, on time performance, operating hours, type of personal care provider, type of automotive service provider, type of building maintenance provider, type of training provider, type of transportation services provider, and type of healthcare provider. Merchant preference attributes represent a merchant's choices with respect to various system settings, services, or other items. For example, merchant preference attributes can include: resource utilization, accept weekend appointments, automatic appointment triage, accept emergency requests, accept insurance, and type of insurance accepted. Merchant resource attributes are characteristics relating to the resources of the merchant, for example, employee names, employee specialties, and current location. Merchant task attributes are properties associated with tasks or services the merchant can provide, such as car repair, car maintenance, doctor visits, exercise classes, training, haircuts, and spa appointments.

Further, as a precursor to making a match between a consumer need and an available merchant service offering, the system can predict whether the consumer is likely to even seek a particular service. For instance, if the system is provided data relating to vehicle maintenance records of Honda Accord automobiles, it can "learn" that owners of this vehicle have the oil changed approximately every 8,000 miles. Accordingly, the system can predict that an Accord owner that had an oil change 7,900 miles ago will seek to make a maintenance appointment in the near future, and it will automatically schedule the appointment with a merchant.

Implementations of the system can use appropriate hardware or software; for example, it can execute on a system capable of running an operating system such as the Microsoft Windows® operating systems, the Apple OS X® operating systems, the Apple iOS® platform, the Google Android™ platform, the Linux® operating system and other variants of UNIX® operating systems, and the like.

Some or all of the described functionality can be implemented in software and/or hardware on a customer or merchant's device. A customer or merchant device can include, but is not limited to, a smart phone, smart watch, smart glasses, tablet computer, portable computer, television, gaming device, music player, mobile telephone, laptop, palmtop, smart or dumb terminal, network computer, personal digital assistant, wireless device, information appliance, workstation, minicomputer, mainframe computer, or other computing device, that is operated as a general purpose computer or a special purpose hardware device that can execute the functionality described herein. The software, for example, can be implemented on a general purpose computing device in the form of a computer including a processing unit, a system memory, and a system bus that couples various system components including the system memory to the processing unit.

Additionally or alternatively, some or all of the functionality can be performed remotely, in the cloud, or via software-as-a-service. For example, matching functions can be performed on one or more remote servers or other devices, as described above, that communicate with the customer and merchant devices. The remote functionality can execute on server class computers that have sufficient memory, data storage, and processing power and that run a server class operating system (e.g., Oracle® Solaris®, GNU/Linux®, and the Microsoft® Windows® family of operating systems).

The systems can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/ or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, a customer and/or merchant device includes a web browser, native application, or both, that facilitates execution of the functionality described herein. A web browser allows the device to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the device manually requests a web page from the server. Alternatively, the device automatically makes requests with the web browser. Examples of commercially available web browser software include Microsoft® Internet Explorer®, Mozilla® Firefox®, and Apple® Safari®.

In some implementations, the customer and/or merchant devices include client software. The client software provides functionality to the device that provides for the implementation and execution of the features described herein. The client software can be implemented in various forms, for example, it can be in the form of a native application, web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a plug-in to the web browser or to another framework or operating system. Other suitable client software architecture, including but not limited to widget frameworks and applet technology can also be employed with the client software.

A communications network can connect the devices with one or more servers and/or with each other. The communication can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are possible. The network can carry TCP/IP protocol communications, and HTTP/HTTPS requests made by a web browser, and the connection between the clients and servers can be communicated over such TCP/IP networks. Other communication protocols are possible.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

In some cases, relational or other structured databases can provide such functionality, for example, as a database management system which stores data for processing. Examples of databases include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

Also, the instructions and/or data used in the practice of the systems and methods herein can utilize compression or encryption technique or algorithm. An encryption module can be used to encrypt data, and files or other data can be decrypted using a suitable decryption module.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

In one implementation, illustrated in FIG. 1, the central component of the system is the Marketplace Server 100, which can operate in a secure Internet cloud environment 110. The Marketplace Server 100, which can be directly coordinated with Memory 103 and Appointment Data 118, maintains all merchant scheduling and all individual consumer scheduling, and stores all newly created, pending, and past appointment actions, e.g., history, which is also referred to as learned or ongoing data. The Marketplace Server 100 can implement the primary technology by which automated appointment requests from individual Customers 106-109 are matched with the Merchants 111-114 and by which appointment confirmations are coordinated and confirmed through the Merchants' 111-114 and the Customers' 106-109 calendars automatically and without human intervention. Although FIG. 1, depicts three separate hardware devices, the Seller Matching Engine 101, the Marketplace Server 100, and the Buyer Matching Engine 102 can be implemented on a single hardware device or multiple hardware devices. In this latter configuration, functions and separations can be maintained as though the devices are separate.

In FIG. 1, Customer 106 depicts a customer who uses the system's user interface through their smart phone, e.g., an Apple® iPhone® mobile digital device, Customer 107 depicts a customer who accesses the system's user interface through their tablet computing device, e.g., an Apple® iPad® mobile digital device, Customer 108 depicts a customer who uses the system's user interface through their portable laptop computer, e.g., an Apple® MacBook Pro® computer, and Customer 109 depicts a customer who uses the system's user interface through their desktop computer, e.g., an Apple® Mac Pro® computer.

Merchant 111 depicts a merchant who uses the system's user interface through their smart phone, e.g., an Apple® iPhone® mobile digital device, Merchant 112 depicts a merchant who uses the system's user interface through their tablet computing device, e.g., an Apple® iPad® mobile digital device, Merchant 113 depicts a merchant who uses the system's user interface through their portable laptop computer, e.g., an Apple® MacBook Pro® computer, and Merchant 114 depicts a merchant who uses the system's user interface through their desktop computer, e.g., an Apple® Mac Pro® computer.

In some implementations, the system can utilize a customized user interface between the consumer and merchants and professionals. Advantageously, the system can be structured for only one user identity log-in to reach the entire system instead of a separate log-in for each merchant or professional.

The Customers 106-109 and Merchants 111-114 connect to the system through the Internet and wireless connections (e.g., Wi-Fi connections 116) or dedicated Internet lines. Should a particular territory or connection for a merchant or customer not have Wi-Fi or other wide band Internet available, modem connections will also be a method in which to access the network.

The Buyer Matching Engine

Still referring to the implementation depicted in FIG. 1, a structurally important element of the system is the Buyer Matching Engine 102, which is directly and securely connected to the Marketplace Server 100. The Buyer Matching Engine 102 operates as a filter between the individual Consumer 106-109 and the Marketplace Server 100. The Buyer Matching Engine 102 can be adapted to filter service need requests from the Consumers 106-109 based on the individual details and data, preferences, history information, and other attributes that the Consumers 106-109 enter and/or that is collected in the operations of the system. Transactions, preferences, and information regarding the customers are maintained in the Memory 105, which is directly connected to the Buyer Matching Engine 102. The collection of preferences and customer attributes within the Memory 105 is a separately identified memory component known as the Consumer Persona 119.

The various consumer attributes included in the Consumer Persona 119 can include, but are not necessarily limited to: identification attributes such as base personal contact information, professional contact information, healthcare information, personal care information, and payment information; asset attributes such as automotive information, e.g., the identity and the details of automobiles owned, building maintenance information, e.g., details of all physical plant elements of buildings owned or the identity of the elements of the landscape for maintenance purposes, and other asset information regarding an individual; and preference attributes such as preferences for "Ad Tag" words, settings and unique details for consumers, transaction history, relationships with existing merchants, e.g., how long they have been using a particular merchant, network services preferences, and so on.

For individuals/consumers, some examples of the various types of attributes that the system stores can include, for the purpose of illustration and not limitation, medical records, medical histories, prescription information, medical insurance information, preferred service providers, car insurance information (for electronic interchange when needed and where updates are automatically made when they occur), property insurance information, personal information, e.g., billing address, mailing address, shipping address, business address, spouse, children, listing of all doctors (for medical emergencies where a universal barcode can be used by an emergency crew or paramedic, in the condition of the unconsciousness of the individual, to identify all details of the medical condition and where a photo of the individual will help them ensure that the mobile device is being carried by the person who is in need of medical care), and identification of all relevant details regarding all cars and motorcycles owned (which can be cross referenced to the auto insurance policy information).

The system can provide the individual consumer, or customer, in addition to other things, with the following: a task list of needed services, such as automated direct receipt of car maintenance needs (e.g., based on the car's microchip noting that something is not functioning, or the need for scheduled maintenance based on the car's mileage in relation to the manufacturer's service schedule) and placing the need on a list for the individual/consumer to either decide to authorize the system's automatic sourcing and scheduling of the work (based on the consumer's preferences in their persona) or to place the work in a "hold" status; based on a consumer's persona preferences for attention to health and personal care services, automatic scheduling of doctor examinations or preferred personal care needs, such as a monthly massage or an annual check-up examination; a task generation function that allows a consumer to add a desired service need, select the preference that is desired, e.g., the best price, the most convenient time, a time that conveniently fits into a schedule gap, a preference for a particular merchant or professional. Advantageously, the system automatically schedules the needed or desired service without intervention from the individual.

The system can also maintain all information and data regarding an individual's service needs, service preferences, and histories to provide for, for example, automatic scheduling of maintenance services (e.g., physical asset maintenance requirements, such as home heating and air conditioning systems and equipment), direct automated contact with service providers when conditions occur which warrant attention, such as a recall on a car to address a defect, a need to visit a physician when a drug manufacturer cautions a physician about a prescription, automated required forms updates prior to the time of a service appointment (e.g., update of prescription information or the completion of standard medical information forms before seeing a new doctor), automatic transmission of asset details, such as a car, prior to the appointment with the service provider so that the provider has the information in their electronic files and does not have to spend the time collecting and entering this information at the time of the service, and industry standardization of required forms so that all small-to-mediumsized business (SMB) merchants and professionals are assured that they are collecting what is needed or prescribed by law.

The system can also be adapted to track, monitor, and notify of medical conditions using the multitude of devices that exist to track such things as blood pressure. Should the data indicate an adverse trend and depending on the individual's preference settings, it can automatically notify the person's appropriate doctor. This information can be tracked in the Consumer Persona 119 and be available for electronic release and form completion for a doctor visit.

The Seller Matching Engine

Similarly, the Seller Matching Engine 101 operates as a filtration between the Merchant 111-114 and the Marketplace Server 100. More particularly, the Seller Matching Engine 101 filters the service appointment activity and transactions from the Marketplace Server 100 based on the a merchant's individual details and data, preferences, and history information. All transactions, preferences, and information regarding the Merchants 111-114 can be maintained in the Memory 104 that is directly attached to the Seller Matching Engine 101. The collection of preferences and customer details within the Memory 104 is a separately identified memory component known as the Merchant Profile 117.

The various attributes in the Merchant Profile 117 can include, but are not necessarily limited to, merchant identification attributes such as primary business information, business locations, the services offered, the price list for the services; resource attributes such as the personnel and equipment that the business uses for the delivery of the services they offer, the delivery layout for their locations, the standard forms that the business uses, customer list, and all customer details that are relevant to service to these customers; and preference attributes such as payment preferences, settings and unique details, transaction history, relationships with existing customers/consumers, e.g., how long they have been a customer, and their network services preferences.

For merchants and professionals providing services, the Merchant Profile 117 element of the system stores information relating to the various types of merchant attributes, including but not limited to: standard form templates for disclosure to customers, insurance information (e.g., for business and workers compensation), geographical locations, resources used for services (e.g., personnel, machines, equipment, goods tracked using standard UPC codes), price lists for services, customer history of prior services delivered, and customer lists with relevant details about the services that they use.

In a general sense, and in addition to a number of other combination of services and functions, the system can provide the merchant with the following queuing functionalities, which are discussed in greater detail below: fully automated, real time scheduling, monitoring logistics, pricing and payment, automation of collection and dissemination of needed and required information, collecting and organizing information with "tags," forms standardization, and the like.

Fully automated, real time scheduling can include, without limitation, receiving the request, analyzing the opportunity, scheduling the service, confirming the appointment in a direct, automated connection between the merchant's calendar and the customer's calendar, monitoring the customer's calendar to ensure that the service delivery remains on their calendar and has not been replaced with another appointment that is not related to the service (which can replace the current practice of customer reminder calls, SMS text messaging or automated phone calls), sending appointment reminders in various formats, and sending requirements notifications and reminders (e.g., "no eating or drinking after 6:00 p.m. in the evening before") when the appointment relates to a blood test or surgery where the results can be impacted if the fasting requirement is not followed. Optionally, the system can be adapted to monitor the conditions of a person's calendar or geographical location to remind them of the "no eating or drinking" requirement when, for example, they have a dinner appointment on their calendar or their mobile device indicates that they have just entered a fast food restaurant location.

Monitoring logistics can include, without limitation, advising a customer of a merchant's status relating to the appointment time (e.g., are the merchants on time, running late or ahead of schedule), monitoring the proximity of the customer prior to the time of the service appointment, triaging the service schedule of the merchant and re-prioritizing customers based on the customer's proximity as reported by location-based tracking (if authorized by the customer in their preferences), and advising customers when work is completed.

Pricing and payment can include, without limitation, advising the customer of the cost of the service, offering optional pre-payment discounts, collecting payment, and dynamic pricing tracking that provides the merchant with information regarding how many requests were initiated for a particular time. This information will allow the merchant to price time slots with more demand at higher prices and to offer alternate time slots at lower prices to fill the work flow for the merchant's operating resources.

Automation of collection and dissemination of needed and required information can include, without limitation, collecting all needed history information from the customer without human intervention, and providing customer with all standard disclosure information, e.g., terms of service and compliance with local laws.

Collecting and organizing information with "tags" can include, without limitation, information needed for a consumer's or a merchant's tax returns and tax advisor, information needed for a merchant's risk manager or insurance broker, and information needed for payment processing.

Forms standardization can include, without limitation, defining what information and forms are industry standard and providing electronic, i.e., paperless, forms for all SMB merchants, which helps the merchants comply with laws and standardizes the forms that consumers see from merchant to merchant, and providing an electronic filing system for all information collection with an archive that is available to the merchant at any time regarding past services delivered.

The Consumer Persona

The Consumer Persona 119 can be structured as an archive and collection of all relevant information (e.g., attributes) concerning a consumer. Consumers can choose to input everything about themselves or they can choose to input less. The more that they input, the more helpful that the system can be to them. For example, in preparing to go to a personal physician for an annual medical examination, and knowing that all of her medical information is current in the Consumer Persona 119 through updates from other medical professionals, pharmacists, and other medical service providers, a particular patient can be assured that all of her required information will have been previously electronically delivered to her physician and she will not have to complete the dreaded "clipboard" of documents. As a result, the consumer's annual examination process is much more efficient and she is assured that all current information is in the files of her personal physician before she arrives. Merchants or professionals also benefit when patient information is current, as it allows them to focus on their patients' care.

The Merchant Profile

The Merchant Profile Persona 117 is structured as an archive and collection of all relevant information (e.g., attributes) concerning a merchant. Merchants can use this feature of the system to register relevant information in the marketplace. For example, a merchant can desire to input as much information about their business as they can because they know that it will allow the system's task acquisition, matching, and sourcing functionalities in the Marketplace Server 100 to reach as many customers and potential customers as possible. Consumers have automated access to information regarding a merchant and can use it to source or know that the system is automatically sourcing service opportunities on their behalf and in their best interests. For merchants or professionals, the feature provides market presence and helps in customer satisfaction and customer acquisition.

The Marketplace Server

At the core of the interrelated processing that forms the system is the Marketplace Server 100, which is connected with Appointment Data 118 and Memory 103. The Marketplace Server 100 has the primary function of operating an online marketplace for locally-delivered commerce services. Although there are a multitude of functions that comprise this responsibility, some of the primary duties include: originating and executing marketplace services transactions, matching buyer-side trade offers with seller-side bids, executing schedule transactions for both consumers and merchants, originating and executing confirmations and notifications for transactions, and managing the proactive initiatives concerning the calendars of both the consumer and the merchant.

A direct extension of the Marketplace Server 100 is the Appointment Data 118 and Memory 103. In addition to managing the marketplace, these devices collectively maintain primary information. On behalf of both the merchant and the customer, they maintain the primary calendars, current and live transaction flow, and history and transaction documents.

The learned data in the Marketplace Server 100 represent the collection of knowledge from marketplace transactions. The type of knowledge is broad and the combinations are unlimited. For example, the average amount of time that a consumer who engages a car repair merchant for a problem that is described generally as "2004 Cadillac Escalade won't start" can be matched with the actual data from repairs that have previously been made. The most common solutions/results can be determined and the actual times experienced used to estimate the completion time for this newly scheduled appointment. By doing so, the system is applying logic based on actual reported results from the system's community to assist a merchant and consumer to better manage time. This same logic can be applied, post service delivery, to the costs charged to the consumer to help the consumer understand how his costs compared to others in the system's community who experienced the same problem. Conversely, it can be applied to the merchant who delivered the service to help him better understand how the time incurred by his productive resources to address and resolve the problem compared to other merchants similarly connected to the system's community. This helps the merchants manage business operations competitively without sharing their own information and without learning the information of their competitors, as the information can be shared as an average of the community without revealing identities, or in another anonymous fashion.

The User Interface

Both the Seller 101 and the Buyer Matching Engines 102 are the representatives of their constituencies of the merchant and the consumer, respectively. As such, the system is structured to provide critical and primary connections between the interactions of the merchant and consumer, through their smart device or computer. On behalf of the consumer, the Buyer Matching Engine 102 is the primary filtration and matching device and, as noted above, due to the type and amount of consumer preference, settings, and other attribute information that is stored in the connected Memory 105 and Consumer Persona 119, the Buyer Matching Engine 102 is a buyer agent that initiates and manages marketplace services on behalf of the buyer. The reverse is true for the Seller Matching Engine 101 on behalf of the seller as this device maintains preference, settings, and other attribute information stored in Memory 104 and Merchant Profile 117 on behalf of the merchant sellers and is positioned in the system to be the seller's agent in the initiation and management of all marketplace services transactions and in all scheduling transactions.

Figure 2:
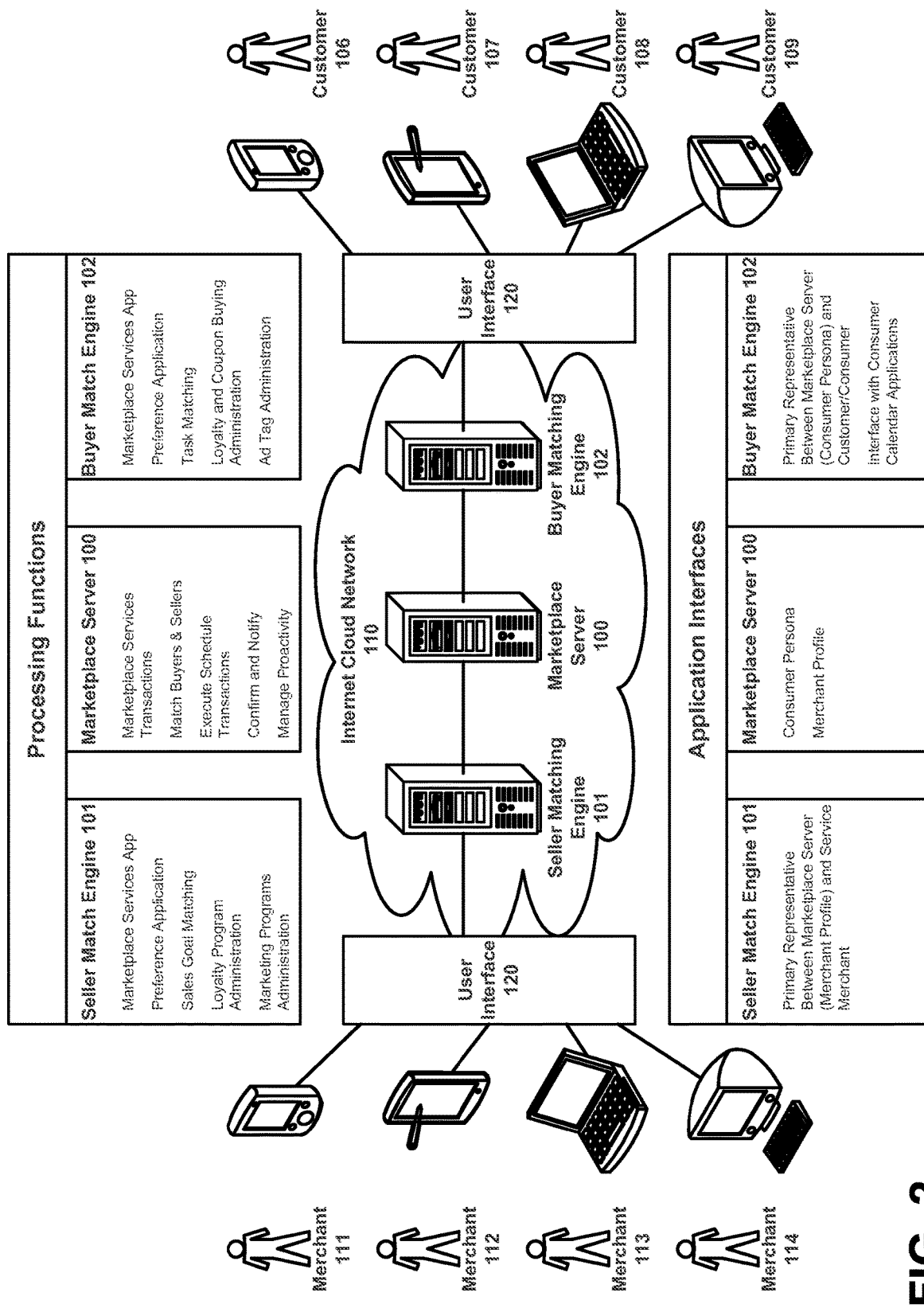
FIG. 2 is a diagram illustrating example functions and interfaces of a marketplace matching system.

Facilitating these connections is the User Interface 120, shown in FIG. 2. Regardless of the type of device the Customer 105-109 or the Merchant 111-114 is using, the User Interface 120 of the system represents the window through which all connections pass. More specifically, the User Interface 120 can be a dedicated interface screen that is unique and custom designed for the system and for the devices through which the information is connected. Primary interfaces can be through the customer's calendar application, such as iCal, Outlook, Gmail and Yahoo! Calendar. The User Interface 120 can use the system's standard user interface but connect with the noted third-party calendars. In some implementations, the User Interface 120 includes graphical and/or text-based elements. The User Interface 120 can also include a natural language interface, through which a user types or speaks commands to the system, and through which natural language may be displayed and/or spoken in response.

The system is structured around a marketplace with integrated commerce services. A marketplace (and all services and marketplace standards) is important because, even though one-on-one scheduling is possible, when it is combined in a marketplace environment, it creates multiple service providers and consumers and allows combinations of transactions that are not possible in one-on-one environments. The integrated methods and design structure of the system simplify the manner in which buyers reach sellers and in which transactions are executed. The system also overcomes previous shortcomings because it factors in the dimension of time and the logic of calendaring through algorithm formulas and using the population of ongoing data. As explained earlier in this document, the application of logic and time with marketplace experiences through the system's ongoing data creates an environment where the collective experiences of all consumers and merchants in the marketplace can be used to instill efficiencies in the time usage of all other users.

Standard Marketplace Transaction Processes and Methods

The primary objective of a merchant who sells in a marketplace is to expand the number of customers and increase revenues through customer growth, customer satisfaction, and repeat business. Among the primary benefits of the User Interface 120 is the design of a single log-in to reach the network, i.e., the marketplace. For consumers/ users, this design enables each and every one to reach all of the merchants on the network and, of course, the reverse applies for merchants reaching customers.

Inasmuch as the network and marketplace design are focused on the sale of consumer services exclusively, the visual design of the User Interface 120 is purposed for the sale of consumer services and the steps and visual screens are consistent and intuitive for this type of sale. The design of the system, whereby the merchants are part of a market that is contained within a cloud network, enables the focusing of searching and sourcing for consumer services. When a consumer is seeking a service for scheduling, the search filters through the consumer's Buyer Matching Engine 102, which links through the Consumer Persona 119 and therefore applies the consumer's preference and setting attributes to the search. As a result, the system delivers search results that are extremely focused on what the consumer is seeking and filtered by what the consumer specifically prefers.

As an example, a particular consumer's preference attributes might include "always select current service providers" or "always search based on the lowest price for the service." In the first search, the results would be limited to relationships that the consumer has and it can be targeted whereby, for example, a particular merchant for a particular car can be the result. In the second example, the search results can include existing relationships but only at the lowest price. This searching method of the system will result in the complete filtration of advertising placed by ad words, e.g., as used by Google, and the elimination of results that have no relationship to what the consumer is seeking. There are endless permutations of how the system's filtration-based search delivers results that provide preference sorting and ranking, similarity linking and even such filtration as matching similarly grouped items.

The system is designed to standardize service type descriptions for similar consumer services. This is accomplished as merchants set up their service catalogue in the Merchant Profile 117. This is also accomplished through comparison as the system's marketplace executes transactions in services. With all of this information and data, the system consistently compares service descriptions for standard categorization and links similar services for comparison purposes as consumers search and source for service opportunities. The standardization that is used and issued by the system can be, for example, a barcode that is included on the merchant's services list in their Merchant Profile 117.

The system can be adapted to use the facility information and service type attributes in the Merchant Profile 117 to classify merchants by standard codes. This functionality delivers an unbiased comparison and classification of merchants based on their service offerings and facility capabilities. The standard classification codes are published to enable consumers to compare merchants by standard service and capability categories rather than biased marketing information released by the merchants themselves. The system can also include the cataloging of a standard forms library for disclosure by merchants with all customer transactions. For example, whenever a consumer uses spa services for personal care or doctor services for health care, the completion of what is typically represented as standard forms is requested. There is currently little, if any, consistency in the population of forms for even the same service by different service providers. Using the Forms Distribution functionality that is incorporated into the Marketplace Server 100, information that is resident in the Consumer Persona 119 can be sourced by the Marketplace Server 100 and populated on the requisite forms that are dictated by the merchant and catalogued in Memory 103. In some or all cases, the customer and the merchant provide approval for the release of the information (either through a preference setting attribute in their Consumer Persona 119 or their Merchant Profile 117, respectively). Advantageously, the standard forms population and distribution is completed electronically. e.g., "digitally," with no paper distribution and no printing required. All forms population and distribution can be archived in Memory 103, 104, and/or 105. This functionality results in the standardization of consumer service terms, disclosures and conditions.

The system also can be configured to assign unique barcode identities to each merchant member and each consumer member. The unique barcode is stored in each merchant's Merchant Profile 117 and each consumer's Consumer Persona 119. The barcode is used for identity verification and for check-in at a merchant's facility. For example, when an individual consumer arrives at a merchant's facility, the consumer accesses the user interface 17 from their smart phone device or their tablet computer. The barcode displays on the device's screen 18 and is presented to a barcode scanner that is located at the merchant's site. Upon identification, the system registers the arrival on the Marketplace Server 100 and, among other things, verifies the appointment and the status of the transaction. The barcode identity is also used for payment processing as explained below. The barcode identity is assigned by the system when a merchant or an individual consumer joins the system's network and registers for the marketplace.

Through the system's Direct Network Connection 115 and the automated negotiation between the Buyer Matching Engine 102 and the Seller Matching Engine 101 on the Marketplace Server 100, service appointments are made and the confirmation is transmitted to all of the parties involved. On both sides of the transaction, i.e., merchant and consumer, confirmation can be recorded in the Appointment Data 118, the Merchant Memory 104 and the Consumer Memory 105. Based on the preferences and settings in the Consumer Persona 119, the appointment is entered into either the consumer's personal calendar that the system stores in Appointment Data 118 or, through the User Interface 110, the appointment is directly interfaced with the individual consumer's personal calendar, such as iCal, Outlook, Google Calendar or Yahoo! Calendar.

The system also can be structured to enable merchants to update consumers on the status of a service electronically using the consumer's settings and preferences in their Consumer Persona 119, as filtered through the Buyer Matching Engine 102. Standard "pull-down" options are available to the merchant to update service status very quickly so that the consumer is consistently aware of the status of their work. This same functionality allows the merchant to notify consumers when, as could happen with automobile repair, the applicable state law requires that the consumer be notified in advance to authorize additional work that is discovered in the course of the original repair and that will exceed the original cost estimate. Moreover, using the information that is electronically collected through the Internet Cloud Network 110, the system allows all merchants who use the system and who are registered on the network marketplace to access the state-by-state, municipality-by-municipality, database of notification requirements that are contained in the Appointment Data 118 memory that supplies the Marketplace Server 100. As a result of this functionality, the system automatically notifies all customers of additional costs and tracks approval as required by the applicable laws in the location where the service is being performed.

The system also can allow Customers 106 through 109 to set their Consumer Persona 119 settings to track their current location, e.g., accessible with mobile devices through a mobile network which uses information on the geographical position of the mobile device, to report it to merchants where they have pending service without requiring a cell phone call. This functionality addresses law changes in which more and more states are outlawing cell phone usage when operating an automobile. However, more importantly, it allows the merchant to triage their customer line-up so that one customer's tardiness does not create a service delivery backlog that affects all customer's that follow.

Using the service catalogue and price list that the system maintains for each merchant in their Merchant Profile 117 and Memory 104, the system enables customers to pay for their service through the system's network without requiring their locations to collect cash or to process credit cards. In addition, the system provides customers with guidance regarding appropriate ranges for gratuities in certain service sectors where such practices are common. The gratuity settings can be set-up in the Customer Persona 119 by each customer to enable tipping by industry standard wherever payment is made with the system's in-network payment or they can be set to request permission through the customer's mobile device whenever service is received and payment is being made. Because the in-network payment is processed by the system through the marketplace network, all merchants eliminate the risk of losses from employee theft or from accepting checks that are not backed with sufficient funds in the customer's bank account.

The system's Marketplace Server 100 provides all merchants and customers with, in addition to universal access noted earlier, real-time access 24 hours a day, which allows all merchants to access their customers at any time for any customer to schedule an appointment without the necessity for the merchant to be open for business. When appointments are scheduled after hours, the appointment confirmation is provided to allow both parties to the transaction assurance that their appointment is scheduled and immediately appears on both calendars located in the Appointment Data 118.

The system is structured with the software application located on the system operator's Internet server (the Marketplace Server 100) and all current merchant settings and data located on the Seller Matching Engine 101, the Merchant Profile 117 and the Memory 104, as well as all current customer settings located on the Buyer Matching Engine 102, the Consumer Persona 119 and the Memory 105, all located on the system operator's Internet hardware. As a result, neither the merchants nor the consumers are required to maintain computer hardware at their site. Also, access to the system is available at any time without the necessity for the merchant or the consumer to have their computer or their mobile device turned on and connected to the Internet.

The system can enable any merchant or consumer to access it without having to be connected to the Internet with a cable or without being inside their own computer network. Indeed, anywhere where there is a Wi-Fi router operating can provide access to the system. Also, the system's User Interface 120 is structured to allow full access for full functionality from the software from anywhere where they can connect.

The system utilizes a profile structure that, as noted earlier, is orchestrated through a Seller Matching Engine 101 and a Buyer Matching Engine 102. This structure allows all users of the network that powers the marketplace to set their preferences and options in their respective matching engine and use these settings for all of their consumer services transactions without having to enter the same information for each transaction that they complete. Also, the intelligence provided by the matching engines allows merchants to seek new customers and allows customers to seek merchants. For example, if a particular customer is traveling from San Francisco to New York City and is interested in a spa service during their stay in New York City, he can find spa service opportunities by merely listing a task item to find a service during their trip. The system accesses their Consumer Persona 119 settings through their Buyer Matching Engine 102 to seek the service through the Marketplace Server 100, which, in turn, seeks the merchant through their Merchant Profile 117 through the Seller Matching Engine 101. If, in this example, the consumer wants the service for a particular price or during a particular available time period (which the Buyer Matching Engine 102 would access and track on behalf of the consumer and therefore be able to use various time periods as noted in this consumer's Consumer Persona 119), the Marketplace Server 100 would work to match the opportunities and schedule the service on behalf of both parties without the need for human intervention. With the system's design, all of this is completed from the mere preparation of a task list by the consumer which can even be done as easily as with voice access to a mobile computing device. Also, in this particular example, if the consumer's preference is to enjoy Starbucks coffee as noted in the Consumer Persona 119, the Marketplace Server 100 can offer suggestions to the customer of locations near the delivery of the spa service for the consumer to conveniently stop for the beverage. In yet another example of the benefit of the system's profile structure through profile filtration, the Marketplace Server 100 can use the intelligence gained from other consumers with the same profile as this particular consumer, e.g., age, health conditions or personal care preferences, to suggest other spa services that people with similar profiles purchase in connection with the original spa request, such as suggesting a pedicure following a massage.

The system can create "groups," or sets of users associated with one or more assets. Some or all members of a group can be provided with notifications, schedule updates, tasks, and the like upon the occurrence of an event associated with an asset. Groups may be created manually by users, automatically by the system, or with partial automation (e.g., the system suggests possible group configurations and users can confirm, add and/or remove the suggested group members and assets). Groups can include members that have some association with each other and/or with the particular assets. For example, a set of related assets might include personal property owned by a family, such as a car, a television, and a computer. The group members associated with the assets might include the family members, such as father, mother, son, and daughter, but also an auto mechanic, television repairman, and computer technician.

The daughter, for example, can use her iPad tablet to schedule a time slot to watch a game show on the television, and other members of the family can be observe an asset schedule or automatically be notified that the television will be in use during that time. If, prior to the game show, the television breaks while the son is watching a movie, he can use his smart phone to set an attribute associated with the asset (e.g., repair required=yes). Group members who have a connection to the asset can then be notified of the issue. The daughter can be alerted that the TV is no longer functioning, and the appointment can be canceled and rescheduled automatically when the television is repaired. The television repairman can be notified that repair is necessary, the repair can be automatically added to the repairman's generated task list, and an appointment to service the television can be scheduled (with or without human intervention), using the techniques described herein.

With the combined intelligence of all consumer members of the system's marketplace and network, the Marketplace Server 100, for example, can utilize the service history of a particular merchant, such as an automotive repair merchant, to suggest that they focus on a particular manufacturer or model of car because there are many models of that manufacturer's car located near the service location of the merchant. This is significant to a merchant because, in this particular example, a particular merchant can streamline their business and engage only the resources to service this particular need rather than attempting to specialize in everything for all manufacturer's and models. For the consumer, this is particularly helpful because automotive repair through the manufacturer's dealership is known to be more expensive and locally-owned service facilities are known to be more cost effective. Yet, the consumer knows the least about the local service facilities and avoids the option. Knowing that a particular automotive merchant specializes in their particular car and is more economically priced allows the consumer to save money and still receive expert service.

The system can include the capability to collect feedback from consumers based on their service experience, as noted below. Using the example in the above section, the customer is able to use the system's structure of service price lists in the Merchant Profile 117 to compare service rates for the service that they are seeking to find the most economically priced option among the alternatives in their service area. They could alternately source the merchant using feedback ratings if service quality is more important to them than the best price.

The system can be designed with a network and marketplace structure to protect the confidentiality of all of the members—both merchants and consumers. For example, through universal confidentiality settings, customer information and history, as contained in the Consumer Persona 119 and the Memory 105, cannot be shared with merchants, for example, for marketing purposes or for the sale of advertising. Also, through universal confidentiality settings, merchant information, as contained in the Merchant Profile 117 and the Memory 104, cannot be shared with competitors of the merchant or with other merchants in general.

The system also can be designed to be administered through Internet cloud computing in a software-as-a-service (SaaS) environment as noted above. As a result, merchants and consumers do not maintain separate Internet servers or hardware. The system is able to administer the best and most up-do-date virus and spam protection on behalf of all members and to protect the marketplace and the network. The costs to administer this type of protection would be prohibitive for an individual merchant to maintain on their own hardware.

As noted previously, through the standardization of merchant disclosures and consumer documents, all disclosures required by the merchant or the consumer can be administered in a universal manner through the system's Marketplace Server 100, which constantly monitors disclosure requirements and employs standard disclosure forms using Merchant Profile 117 or Consumer Persona 119 information. In all cases, the disclosures are archived for the protection of all parties.

The design of the software that comprises a portion of the system enables confidential comparison analysis. For example, without knowing the identity of the competitors being sourced (disclosure limited to the number of competitors and the market location), a merchant can determine how a particular service offering is priced on their price list relative to a particular market. If an automotive repair merchant wants to know how his price for wheel alignments compares to the market, it is available to him using market price intelligence in the Marketplace Server 100. Similar comparisons are available to merchants for quality feedback and for any other standard factor metric that is available for their particular service sector. For the consumer, using the market intelligence available in the Marketplace Server 100, and the standardization of service types and standardization of merchant classifications, the cost paid for a particular service can be compared to what others in the network have paid (without disclosing the customer names or the merchant identities). This can be compared in the marketplace in which the service was delivered or with other markets in other locations. Also, merchants can use the same capability to compare various metrics regarding their business operations, such as the efficiency of their service resources, the utilization rates of their service personnel or their on-time percentage for service delivery. This functionality of the system provides the merchants with benchmarking data, based on the market intelligence information available from the Marketplace Server 100 and the Appointment Data 118. In all cases where benchmarking is provided, the confidentiality of the other merchants and consumers in the survey is protected.

The system can also allow consumers who are members of the network and the marketplace to compare their service purchases with others in their location. This allows them to compare their lifestyle with others. For example, if other members in the marketplace are afflicted with the same medical condition but experience lower healthcare costs than the member who is comparing, they can find out what benefits the other members. If other members experience orthopedic surgery and participate in rehabilitation for twelve weeks with no reoccurrence of the problem but the member who is comparing determines that their rehabilitation's duration was only six weeks, they can schedule the additional time needed with intelligence. For merchants, based on the customer market intelligence that exists, they can determine the best location to place their service facility. For example, an audiologist can determine that a particular location has a higher percentage of people with hearing aids and know that opening an office in that location would offer a higher probability of expanding their patient base. It would have the added consumer benefit of adding additional competition.

Using the market intelligence available through the Marketplace Server 100 and the Appointment Data 118, a consumer can benchmark her service purchases against others based on any form of demographics or particulars that exist. For example, a consumer can find that she schedules oil changes for her cars less frequently than others, or she visits her dentist for hygiene less frequently than others. Knowledge of both habit benchmarks provides an indication of issues that can cause problems for the consumer, e.g., car failure or higher dental costs for restoration work.

The Programming Elements

The network services element of the system provides specific benefits to consumers and merchants. There are also elements of the system that provide benefits to the users that have a more global impact or inherent design. Many of these benefits relate to the knowledge gained from user experiences and user activities. Also, these benefits relate directly to the logic of calendaring and matching in a marketplace environment and all are affected by the dimension of time.

As an example, a merchant that operates an automotive repair business can schedule service for his customer's vehicles but can encounter many normal circumstances that render his ability to predict the service duration difficult, if not impossible. Normal circumstances include, but are not limited to, difficulty in determining the cause of the problem, difficulty accessing the areas of the vehicle that need the repair, unfamiliarity with the particular vehicle, inexperience of the assigned repair resource, and the identification of additional issues that must be addressed. All are typical situations. Each contributes to the time dimension and each either engages or creates calendaring logic that is helpful. In this particular example, the merchant or, more specifically, the system, can collect this information as experience to be used on other customer's repairs. Merchants can record experience data in an organized manner, such as a work log or service ledger but, more likely, it is just retained in the memory of the repair resource and/or the business owner. This particular type of information is not a competitive business (trade) secret or some form of proprietary information that is owned by that particular merchant. Even if the merchant considered it something that is a competitive secret, the merchant would have to build his business around performing this exact type of work repetitively in order to capture the benefits from the knowledge. But that is typically illogical since the service is their product and not the procedure. This information can help the automotive service industry as a whole without compromising a particular individual business, including the business that contributes the information.

Another example involves a medical practice that is operated by a group of physicians. Every day the physicians schedule their time to address the needs of their patients. Their profession is known to require long waiting room time and, as noted earlier, they experience a very high "no show" rate in spite of efforts to address the root cause. Ideally, the occurrence of patients not showing up for appointments should be eliminated. In many situations, medical service providers have to spend additional time with patients to understand the complete symptoms of the issues they are encountering so that they can accurately diagnose the problem, or, perhaps diagnose additional problems. In the course of her day, each of the doctors in this medical practice encounters just about every circumstance that causes her schedule to be disarrayed. The result can be unhappy patients and schedule inaccuracies, which are issues that affect patient relationships. If this particular practice is sophisticated, the physicians can collect the knowledge of their scheduling experiences and develop scheduling logic algorithms to apply to their calendar planning to improve their performance.

Some of the simplest matching activities performed by the system are mostly based on the process of finding the best match between merchant and consumer at a mutually acceptable time based on the ranking of the simplest variables as defined by the consumer, e.g., price, quality and location being prime examples. Initially, consumers and merchants will have entered only base data into the system, such as name and address. As their usage advances, consumers begin to enter preferences, e.g., favorite service providers and types of services, and merchants begin to enter more detail, e.g., type of services offered and a price list.

Some appointments are more complex in both time and delivery. For example, an automotive repair can have a basic definition of the problem, e.g., "the car will not start," but the causes of the problem are many and varied. The procedures required for delivery and the related time are more complex in terms of logic and predictability. Also, such appointments as an initial chiropractor exam where the problem is noted as simple as "sore back" do not provide enough information to assess the estimated amount of time.

Additional logic complexities can include location and third-party requirements. For example, if the appointment is for an initial visit with a new doctor, the amount of information required by the patient's insurance company will typically be significant and much more elaborate than what will be required for visits to existing doctor relationships where the information will be limited to updates only. Also, service appointments such as appliance repair could require the sourcing of specific parts which are not known when the merchant initiates the service appointment. As an even more complex scheduling example, if the service involves house painting as part of home maintenance, and even if the merchant knows the supplies and tools needed, they do not know all situations they will encounter is performing the work and thus the dimension of time is very unpredictable.

To effectively accomplish the objectives of the constituents and to apply the methodology of the system, algorithms can be used that rely on the largest population of generic data. For example, when a service appointment is based on something as general as "the 2004 Cadillac Escalade does not start", the algorithms will factor in large amounts of learned data related to similar descriptions of work, i.e., "does not start," and will factor in more data, such as, repair data of 2004 Cadillac Escalades, repair data for 2004 Cadillacs, and repair data related to 2004 Cadillac Escalades with the same mileage as the particular car scheduled for repair. The volume of learned data/ongoing data that the system will use in the algorithm will be based on the service and as many details as are available.

All of the elements of the system, including the consumer and merchant data, the hardware and software components, the network structure, the methods and the procedures, are all structured around technologies that create a marketplace and provide a trading exchange for network services that merchants and consumers use. Also, the system utilizes the algorithms behind the logic of calendaring and the dimension of time in a number of ways that support the system's matching methods and the marketplace. The marketplace is linked to the Internet through advance programming interfaces that intensify the impact and effect of the system and the results achieved by all consumers and merchants who use it.

The Marketplace and Marketplace Standards

A core structural element of the system, and something that is supported by other components, methods, and processes created by the system, is the marketplace. Each part of the system is structured for the operation of a marketplace for merchants or professionals to offer their services, for consumers to source and engage the best possible merchants or professionals based on their individual criteria, and for consumer service transactions to be processed and intensified by a rich network services infrastructure. As such, the marketplace is an electronic online marketplace and, based on the design of the system, is able to operate in an Internet cloud structure which allows SMB's to participate in the most technologically advanced structure without imposing significant costs and support burdens on their small operations. Also, large franchisors and manufacturers with a broad network of either independently-owned or locally-managed consumer service operations are able to similarly participate in the consumer service marketplace provided by the system without cost and support roadblocks.

The Interface Layer/Advance Programming Interfaces (API)

The system includes many methods to accomplish the complex tasks involved in matching for services commerce as are described throughout this document. These methods engage many network services that are available for all constituents of the system's marketplace. In one implementation, the system includes an interface layer, which contains all of the necessary advance programming interfaces (APIs) to communicate with third-part mobile and desktop applications. Many of these applications provide information and data that the system's algorithms utilize to trigger events, matches, and transactions. The tasks and objectives that are accomplished with this API layer can include, without limitation: communicating, maintaining, linking, processing, comparing, tracking, and accomplishing.

Communicating can refer to providing information to mobile and desktop communication applications to achieve the notification and communication objectives of the system. Maintaining can refer to collecting and providing information used by the system and the algorithms to monitor needs, assign tasks, source resources and many other activities and actions related to maintaining assets and consumer services. Linking can refer to collecting and providing information regarding third-party notifications. Processing can refer to providing third-party services that are preferred by the consumers and merchants, such as payment, and providing third-party functionality that is exclusively connected with the system, e.g., for such things as signature and document archive. Comparing can refer to providing and collecting feedback information and service and customer ratings. Tracking can refer to providing two-way location based information and service delivery status. Accomplishing can refer to managing task lists through proactive generation and management of results.

The API layer can be structured to accommodate the particular needs of the constituents of the marketplace created by the system. The system provides many methods and processes that help the consumer and merchants or professionals achieve their consumer service objectives. In the technology landscape in which the system is designed to operate, there are many technologies that are used as a component of parts of the consumption and service business processes. To capitalize on the information that is available through, or that can be provided to support, these technologies, the API interface layer is integrated and designed to accommodate the available data flow.

There are many examples of how the API layer can be engaged. In one particular example, a consumer who owns a General Motors automobile and has subscribed to General Motor's "OnStar" service will have mileage and operational status information collected regularly. Through the API layer, the system can be provided with this information so that actions can be proactively taken. Indeed, the OnStar service does not function as a marketplace with the matching technology of the system and cannot proactively schedule the remedial actions that can be needed. However, if General Motors requires a recall service for a particular model of vehicle that is owned by one of the system's consumers, this notice, when sourced though OnStar, can be interfaced with the system and the remedial actions will be initiated on behalf of the consumer and with a link to the merchant, e.g., a General Motors dealer.

System Queuing Functionalities

The system creates a marketplace for locally-delivered consumer services by allowing access to endless buyers and sellers to complete the basic transaction of finding sources for consumer services and scheduling the time in a directly connected, real-time, design. However, the system may not directly purchase the time or otherwise inventory the operating resources or services available for sale of the merchants who participate in the network and execute transactions on the marketplace exchange. Rather, as a marketplace exchange (or Internet platform), the system offers cloud based, network services that facilitate the establishment of consumer and merchant relationships and support existing relationships. The design of the system can enable any of the following network services to those merchants and customers who execute transactions through the Marketplace Server 100.

Auto-Match

Using the preferences in the Consumer Persona 119 and the Merchant Profile 117, the Marketplace Server 100 can be adapted, e.g., by using the Buyer Matching Engine 102 and the Seller Matching Engine 101, to compare preferences between a consumer's profile and a merchant's service offerings. If all of the preferences for each party match, an appointment can be automatically scheduled through the Marketplace Server 100 at mutually convenient times. For example, if a particular consumer is seeking a haircut appointment during a business trip to New York City during a time window between 4:00 p.m. and 6:00 p.m. on a particular day; at a location that is within two blocks of his hotel, where the barber or stylist is rated 4 or higher on a 5-point scale; and where the price does not exceed $50, the appointment can be automatically scheduled with a merchant or professional with whom all of these criteria match completely or substantially (e.g., greater than a defined threshold). Advantageously, the consumer's needs are proactively managed and the information from various merchants is reviewed by the system without the involvement of the consumer. Moreover, if a complete match of details is achieved, the consumer achieves his scheduling objective with extremely limited involvement (by only setting the objectives and the preferences). At the merchant or professional end, a customer engagement is automatically scheduled and their business is expanded by an opportunity which they would not otherwise know about.

Option-Match

Similar to Auto-Match, using the preferences in the Consumer Persona 119 and the Merchant Profile 117, the Marketplace Server 100 can be adapted to use the Buyer Matching Engine 102 and the Seller Matching Engine 101 to compare preferences between a consumer's profile and a merchant's service offerings. Recognizing that not all of the preferences can match, the system can notify the consumer of a possible opportunity for the appointment with the matched and unmatched preferences highlighted. The consumer can then make a decision and advise the system how to proceed, with the Marketplace Server 100 responding accordingly. For example, using the haircut example above, assume that all of the details match, except the appointment time is at 7:00 p.m. In this instance, the consumer can accept or decline the non-conforming time slot.

Advantageously, as with Auto-Match, the consumer's needs are proactively managed and the system reviews information from various merchants without the involvement of the consumer. Close or substantial matches are highlighted of which the consumer is notified and the consumer can follow-up or not. For merchants or professionals, prospective customers can seek them out based on the Merchant Profile 117 without any action by the merchant or professional. Furthermore, their business is marketed through the network service in the marketplace.

Predictive Matching

Figure 3:
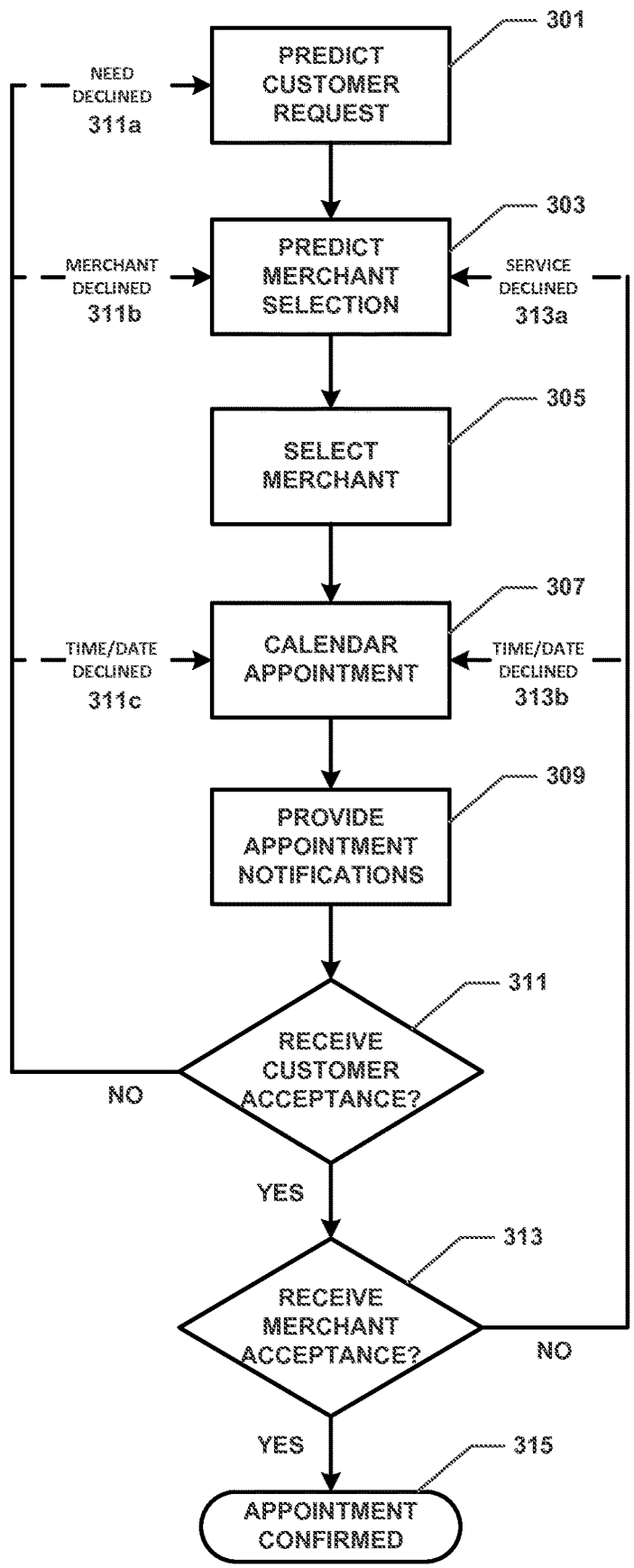
FIG. 3 is a flowchart illustrating an example appointment prediction technique.

In some implementations, the matching functionality (e.g., automatic match, option match, and/or manual match) incorporates predictive elements using learned data, as described above. Referring to FIG. 3, the Buyer Matching Engine 102 can predict (using, e.g., machine learning, pattern matching, trained classifiers, and/or other techniques such as those described herein) that a customer is likely to request a service (e.g., car repair, car maintenance, doctor visit, exercise class, training, haircut, spa appointment, etc.) based on historical data relating to the attributes of different customers that have previously requested that service (Step 301). To provide a reasonably accurate prediction, a classifier of the system will have been trained to predict whether a given customer would request the service using the historical data. These customer attributes can include identification attributes (e.g., name, gender, driver's license number, social security number, no-show performance, and home address), preference attributes (e.g., level of feedback expected from merchants, type of service, whether to automatically schedule appointments for services, whether to allow another user to purchase an appointment, physical exercise preference, whether to follow scheduled maintenance, a preference of merchant for a given service, and merchant location preference), asset attributes (e.g., primary care doctor, spouse/partner, home address, and vehicle identification number), and/or task attributes (e.g., car repair, car maintenance, doctor visit, exercise class, training, haircut, and spa appointment). The relevant attributes of the customer are then input to the classifier, and the prediction is obtained as output.

For instance, referring back to the haircut example above, the system can reference attributes in the customer's Consumer Persona 119 and Appointment Data 118 (e.g., gender, age, when the customer's last haircut was), evaluate the customer's attributes in conjunction with learned data based on attributes of other customers stored in the system (e.g., customers of same gender, of similar age, historical frequency of haircut), and determine that the customer is likely to request a haircut appointment in the near future.

The Seller Matching Engine 101 can predict (using, e.g., machine learning, pattern matching, trained classifiers, and/or other techniques such as those described herein) which merchants meet a threshold probability of being selected by the customer to provide the service (e.g., more than 50% likely, more than 70% likely, more than 90% likely, etc.) (Step 303). Similarly to the customer request prediction described above, the merchant selection prediction can be based on historical data relating to the attributes of different merchants that have previously provided the particular service. To provide a reasonably accurate prediction, a classifier of the system will have been trained to predict whether a given merchant would be selected to provide the service using the historical data. Merchant attributes can include identification attributes (e.g., business name, service sector, business address, gender, business license, on time performance, operating hours, type of personal care provider, type of automotive service provider, type of building maintenance provider, type of training provider, type of transportation services provider, and type of healthcare provider), preference attributes (e.g., resource utilization, accept weekend appointments, automatic appointment triage, accept emergency requests, accept insurance, type of insurance accepted), resource attributes (e.g., employee name, employee specialty, and current location), and/or task attributes (e.g., car repair, car maintenance, doctor visit, exercise class, haircut, and spa appointment). The relevant attributes of a merchant are then input to the classifier, and the prediction with respect to that particular merchant is obtained as output.

For the haircut example, attributes in the Merchant Profile 117 can be examined (e.g., merchant location, price list, services offered) and compared to learned data based on attributes of other merchants stored in the system (e.g., services offered, customer base). Given what is known about the customer, the learned data on merchants and/or other customers allows the system to predict whether the customer is likely to select a particular merchant for scheduling his haircut appointment.

Following the merchant prediction described above, a merchant is selected (with or without manual user input) based on one or more criteria (Step 305). The criteria can include, but are not limited to, the distance between the current location of the customer device and the merchant, the merchant's customer approval rating, a customer preference, customer feedback regarding the merchant, and a specialty of the merchant. The Marketplace Server 100 then schedules an appointment for the service on the customer's calendar and the merchant's calendar in Appointment Data 118 (Step 307), and sends notifications (e.g., audio, visual, haptic notifications) and/or other information regarding the appointment to the customer's device and the merchant's device (e.g., smart phone, smart watch, smart glasses, portable computer, tablet computer, and the like) to notify the customer and merchant of the appointment. (Step 309).

After providing notification information to the customer's device, the system waits to receive an indication that the appointment has been accepted (e.g., the customer can press an "Accept" button shown in the User Interface 120 on the customer's device, which notifies the system of the acceptance) (Step 311). The appointment can also be automatically accepted on behalf of the customer if, for example, it meets the customer's desired time frame, location, merchant rating, and/or other preference attributes. Accordingly, the customer can automatically or manually accept the appointment as suggested by the Marketplace Server 100. Alternatively, the customer can fully decline the appointment (e.g., haircut not needed at this time) (Option 311a); decline to use the suggested merchant (a different merchant can then be suggested) (Option 311b); or decline the suggested appointment time or date (a different appointment time/date can then be suggested to the parties) (Option 311c). As with acceptance of the appointment, the appointment can be automatically declined on the customer's behalf, for any of the above reasons or another reason, based on the customer's preference attributes. The selected merchant (and/or a different merchant) can be notified with updates to the proposed appointment based on the customer's actions.

Before, after, or simultaneously with awaiting customer acceptance of the appointment, the system waits to receive an indication that the appointment has been accepted by the merchant (Step 313). The merchant can accept the appointment as suggested by the Marketplace Server 100. Alternatively, the merchant can fully decline to provide the service to the customer (in which case a different merchant can be suggested to the customer) (Option 313a); or decline the suggested appointment time or date (a different appointment time/date can then be suggested to the parties) (Option 313b). The customer can be notified with updates to the proposed appointment based on the merchant's actions.

Once the customer and merchant acceptances have been received by the system, the appointment is considered confirmed (Step 315).

In one implementation, the Marketplace Server 100 predicts, based on learned data, that forms are likely to be required for the service. Similar to the above, the prediction can be based on historical data relating to the attributes of different merchants that have previously provided the service and the attributes of different customers that have previously requested the service. For example, assume that a merchant that provides hair cutting service requires new customers to fill out a survey. Over time, the Marketplace Server 100 can learn the existence of this requirement if, for example, each time a customer has an appointment there for the first time, the merchant uploads a survey form with the customer's responses to the system (and this data is subsequently used to train a classifier). Accordingly, when a new customer is scheduled for a haircutting appointment with the merchant (and this information is input to the classifier), the Marketplace Server 100 can predict that the customer will need to fill out the survey and provide access to the appropriate form to the customer in advance of the appointment, thus easing the merchant's intake process and saving the customer's valuable time.

Appointment Triage

In another implementation, the system continuously or periodically monitors the waiting area status and the arrival status of upcoming customers, and can be configured to offer triage suggestions to the merchant (or automatically triages, at the option of the merchant). For example, a doctor's office sets the system on automatic, which allows the system to triage patient flow based on which patients have arrived, when others are expected to arrive (e.g., as estimated by Track and Locate, described below), and who has canceled. The system then modifies the patient flow to maximize the on-time performance. For consumers, waiting room time is minimized and satisfaction is increased. For merchants or professionals, the practice is managed efficiently and customers or patients achieve a higher level of satisfaction.

Figure 4:
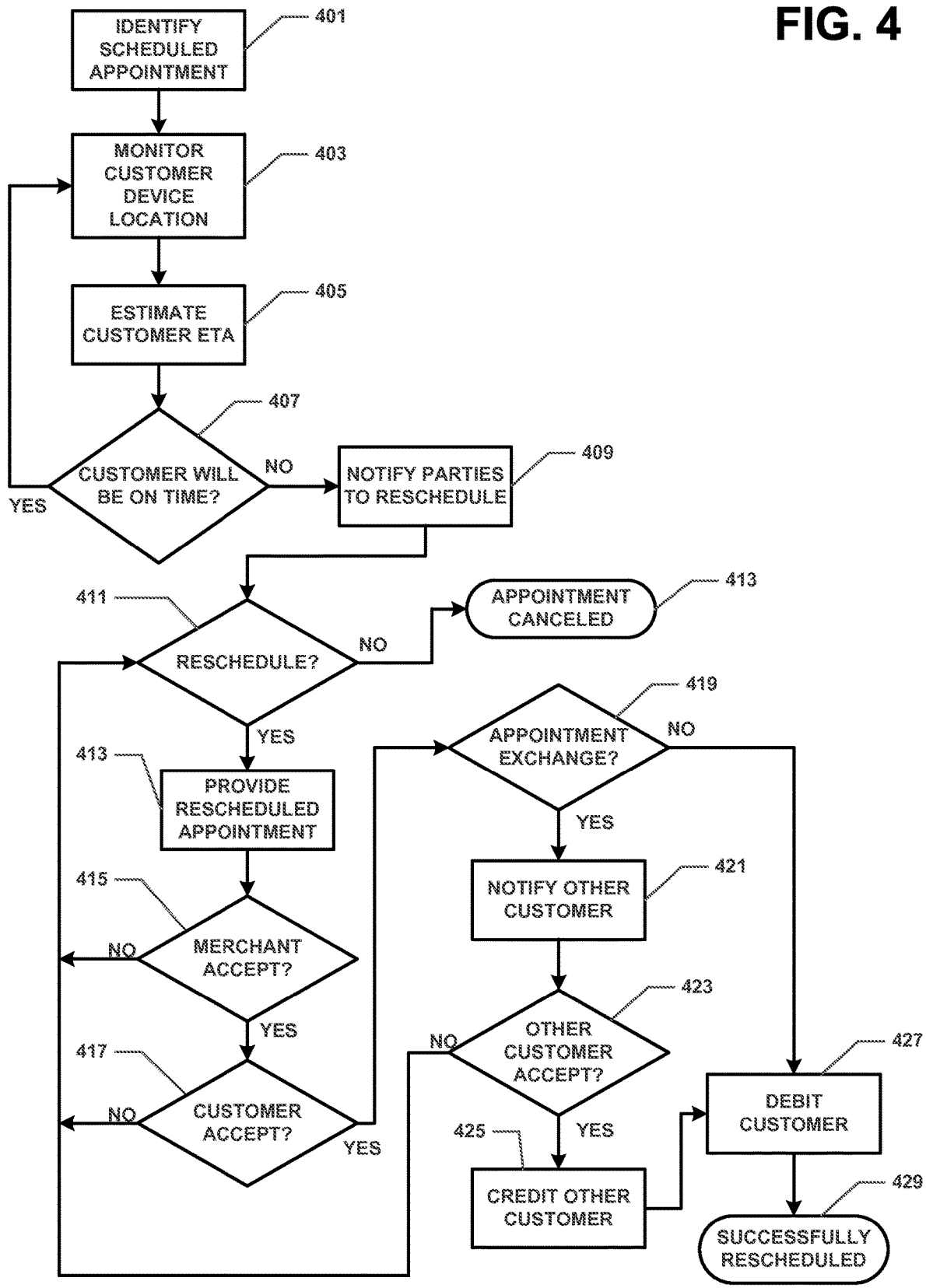
FIG. 4 is a flowchart illustrating an example appointment triage method implementation

FIG. 4 illustrates one exemplary method for appointment triaging using the present system. At Step 401, the Marketplace Server 100 references Appointment Data 118 to identify an appointment for a service that is scheduled on the calendars of a customer and merchant. For example, a customer might have an 3:00 pm appointment for a tune-up at a quick lube shop in Boston. The system communicates with the customer's device (e.g., a smart phone, a smart watch, smart glasses, a portable computer, a tablet computer, etc.) in order to monitor its location for a period of time before the appointment (e.g., 5 minutes before, 15 minutes before, 30 minutes before, 1 hour before, 3 hours before, and so on) (Step 403). Based on the current time (as applicable to the time zone of the customer and/or merchant), the current location of the customer device, and the location of the merchant, the Marketplace Server 100 estimates when the customer will arrive at the merchant's location (Step 405). This determination can be based on distance, driving conditions (e.g., traffic), weather, estimated speed, and other parameters relevant to estimating an arrival time. If the system determines that the customer will be late based on the estimated arrival time (Step 407), an action can be taken with respect to the customer's appointment. Whether a customer is "late" can depend on preference attributes of the merchant; for example, the merchant can accept scheduled customers up to 5 minutes past the scheduled appointment time, 10 minutes past, and so on, or there can be no tolerance for late arrivals at all.

Once it is determined that the customer will be late, the Marketplace Server 100 can change the appointment on the calendars of the customer and merchant (with or without intervention on behalf of the merchant and/or customer) to accommodate the customer's estimated time of arrival at the location of the merchant. Customer and/or merchant preference attributes, as well as the availability of either party, can determine whether an appointment can be automatically rescheduled. For example, if the tune-up customer's device is detected to be approximately 45 minutes away from Boston at 2:45 pm, the customer and merchant have calendar availability, and both parties have a preference setting that allows automatic rescheduling, then the Marketplace Server 100 can automatically reschedule the appointment for 3:30 pm.

In some implementations, prior to rescheduling the appointment, the Marketplace Server 100 provides notification of the need for an appointment change to the customer's device and the merchant's device (Step 409). As mentioned above, depending on the preference settings of the parties, the determination of whether rescheduling is possible or even permitted (Step 411) can be performed automatically by the Marketplace Server 100, or can require decisions by the merchant and/or customer (e.g., the customer and/or merchant can be given the choice to reschedule or cancel the appointment). If it is determined that the appointment cannot or will not be rescheduled, the appointment is canceled (Step 413) and removed from the calendars of the merchant and customer. On the other hand, if the appointment can be rescheduled, the Marketplace Server 100 provides the merchant and customer with a rescheduled appointment time (Step 413). The system then awaits for the merchant and customer to accept the proposed change (either automatically or manually) via their respective devices (Steps 415 and 417). If either or both do not accept the rescheduled appointment, the system can reattempt to determine whether a reschedule is possible and, if so, propose a different time/date.

When (and if) the merchant and customer accept a proposed rescheduled appointment, the appointment is considered successfully rescheduled (Step 429). In some instances, the system can "make room" for a proposed rescheduled appointment by attempting to exchange the appointment time slot with the appointment time slot of another customer having a different appointment time. In such a case, an additional consent is required for the appointment to be successfully rescheduled; namely, that of the other customer. Accordingly, if the Marketplace Server 100 determines that there is a suitable appointment for exchange (Step 419), the late customer and the other customer having that appointment are notified, via their respective customer devices, of the possibility of exchanging appointments (Step 421), and the system awaits that other customer's acceptance (Step 423). In some cases, consent for an exchange is also required from the late customer.

Continuing the above example, if another customer is currently scheduled for the 3:30 pm tune-up time slot, but that customer's device is determined to be only 10 minutes away from the quick lube shop at 2:45 pm, then the Marketplace Server 100 can determine that that other customer's appointment slot is suitable for exchange with the late customer (assuming both are 30-minute time slots). If all necessary parties accept the proposed exchange, the late customer will rescheduled to 3:30 pm, and the other customer will be able to get in earlier, at 3:00 pm.

If the other customer accepts the appointment exchange, the other customer can be rewarded; e.g., the other customer can be credited with a discount usable for the merchant's service, redeemable points for other services, a partial or full refund on the merchant's service, or other suitable reward (Step 425). Likewise, the late-arriving customer can be penalized by, e.g., charging the late customer a penalty fee, adding a surcharge onto the cost of the service, debiting an account held with the system, or other suitable penalty (Step 427). The late customer can be penalized for a late arrival, cancelation, and/or rescheduled appointment, regardless of whether an appointment exchange with another customer is necessary.

It is to be appreciated that, although the above feature is described with respect to rescheduling late arrivals, the system is equally capable of considering early arrivals, and can reschedule appointments in accordance with the above-described techniques.

Time Exchange

Time Exchange operates on the Marketplace Server 100 using the Appointment Data 118 for certified confirmed, pending appointments. For example, the system's functionality and design allow an individual with a need for an appointment at a particular time with a particular merchant or professional to purchase the time from the individual who is certified as the owner of the confirmed time. The system functions as a trading exchange to facilitate the connection between the offeror and the certified owner of the appointment time.

Figure 5:
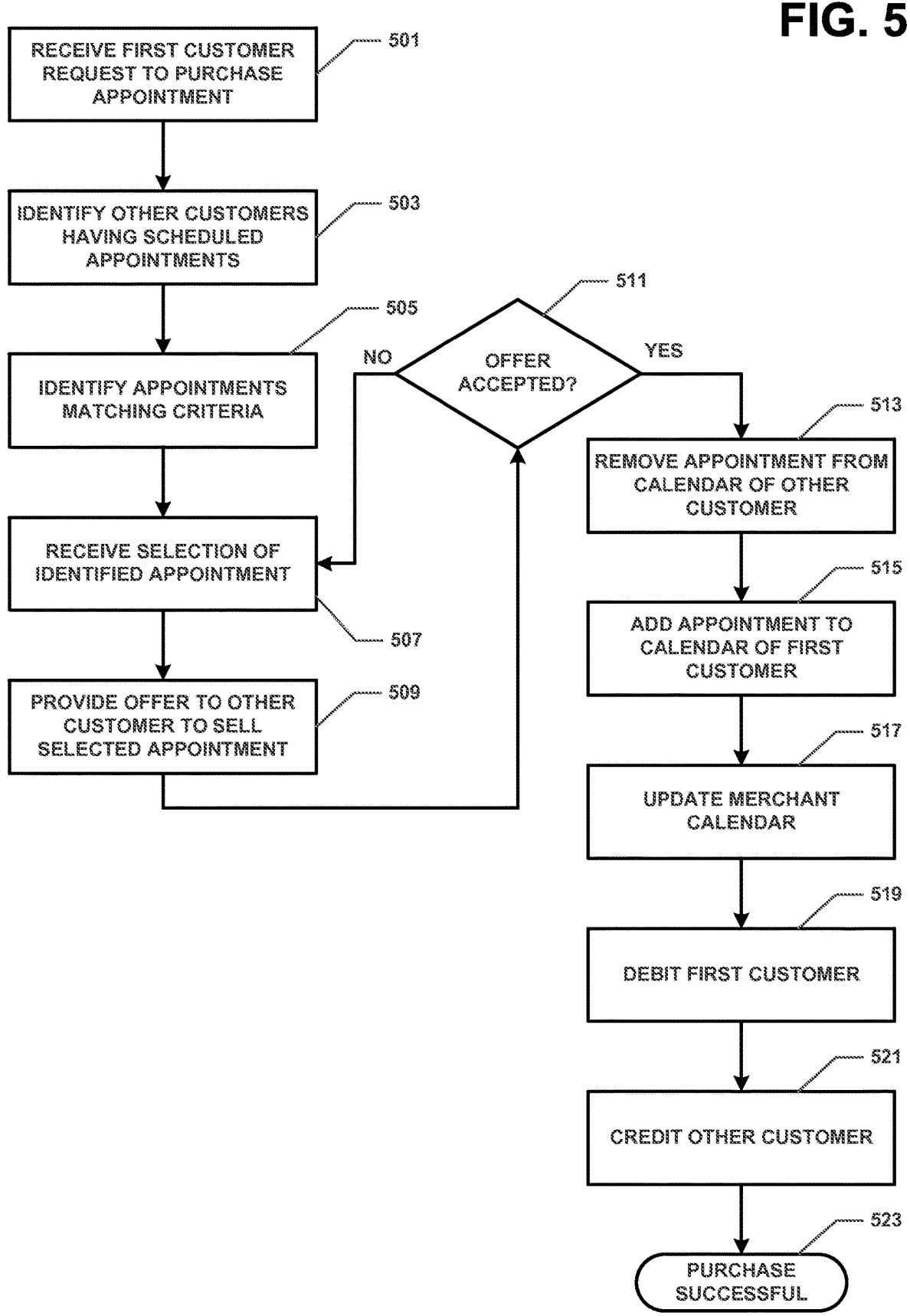
FIG. 5 is a flowchart illustrating an example appointment exchange technique.

FIG. 5 depicts an exemplary method for performing appointment exchange using the present system. At Step 501, the system receives a request to purchase a service appointment from a user of the system's device (e.g., a smart phone, a smart watch, smart glasses, a portable computer, a tablet computer, etc.). Based on the request, the Marketplace Server 100 identifies one or more customers that have confirmed appointments for the desired service (i.e., the appointments are scheduled on the respective merchants' and customers' calendars) (Step 503). The Marketplace Server 100 then analyzes the list of identified customers having confirmed appointments based on various criteria in order to identify which appointments might be suitable for purchase by the requesting customer (Step 505). The criteria used can include, but are not limited to, the distance between the requesting customer and the merchant, a customer approval rating of the merchant, the preferred time or time range for the appointment, the request customer's preferences, customer feedback regarding the merchant, a specialty of the merchant, and whether the merchant would have access to information from the customer's prior appointments (if any) for the desired service or a related service.

In some implementations, the criteria for determining suitable appointments for exchange can include predictions that the requesting user would likely select one or more particular merchants to provide the desired service. As previously described herein, such predictions can be made based on historical data gathered by the system over time and used to train a classifier. Relevant attributes of the customer and different merchants can then be input to the classifier in order to obtain the predictions as output.

If suitable appointments are identified, the appointments can be displayed to the user (e.g., via a user interface on the user's device), and the user can select a desired appointment for purchase. The appointment selection is then received at the system from the user's device (Step 507). Minimal information about the identified appointments can be provided to the user (e.g., merchant, time, date) to protect the privacy of the customers that are scheduled for those appointments. Thus, without knowing the name of the certified owner of an identified appointment, the system acts as a conduit to allow the requesting user to make an offer to the certified owner (via that owner's device) requesting that the owner sell the selected appointment to the user (Step 509).

The certified owner can accept or reject the offer, or make a counter-offer (Step 511). The transaction can continue until either a mutual agreement has been made or both parties have rejected the other party's last offer. If the parties come to an agreement on the sale of the selected appointment, the Marketplace Server 100 removes the appointment from the calendar of the certified owner (Step 513) and adds the appointment to the calendar of the requesting user (Step 515). The calendar of the merchant associated with the purchased appointment is also updated to reflect that the appointment is now with the requesting user (Step 517). Further, the requesting user is debited for the amount he agreed to pay to the certified owner (Step 519), and the certified owner is credited for the agreed amount (Step 521). In some implementations, a transaction fee can be also charged. The purchase is then considered complete (Step 523). Additionally, the former owner of the appointment can have their appointment rescheduled with another merchant, for another date and time, etc. (with or without manual intervention), based on the attributes of the former owner and merchants that provide the service. The appointment of the former owner can be rescheduled using any of the techniques described herein.

When the transactions involve an appointment with a professional, such as a doctor, where insurance requirements have to be met or where other arrangements have to be satisfied, the system can use the Merchant Profile 117 and the Consumer Persona 119 to verify the information, such as an existing doctor/patient relationship between the requesting user and the doctor. When the offer process results in an agreement, the certified appointment time is transferred from the certified owner to the offeror and the appointment time is certified with the offeror. The negotiated payment is transferred through the network created by the system using the payment functionality. The previous certified owner can also be offered another appointment time through the Marketplace Server 100 with the same or a different merchant providing the service.

A prime example of the use of this network service would be for a consumer with a critical need for a particular appointment time from a particular merchant or professional where the time slot is not available. Sellers receive value for something they control at a time that is not critical to them and are able to reschedule another time with the merchant or professional. Buyers obtain a certified appointment in a priority time slot that is critical to them. They are able to satisfy both customers without getting involved and retain the service revenue from both rather than losing one to another service provider who has the time available.

Bilateral Feedback

The system further discloses a method for facilitating a commercial transaction between a user and a merchant. As described in connection with the system, in some implementations, the method can be practiced by a processing device(s) that can be adapted to execute computer-executable instructions that are stored in a memory(ies). For the purpose of this disclosure, facilitating a commercial transaction by establishing bilateral communication between a user and a specific merchant, e.g., a merchant, will be described in the context of the user having received unsatisfactory or non-conforming services from the merchant.

Those of ordinary skill in the art, however, can appreciate that the methods and systems described herein can be applied to a myriad of other situations during which it would be advantageous to establish bi-lateral communication between the two parties to the commercial transaction.

When negative feedback is received, the system's Bilateral Feedback functionality provides notification to the merchant for a specified period of time. If the merchant chooses to address the feedback they can do so and make an offer to the customer for resolution. For example, assume a particular customer has had a negative experience with a merchant and accordingly issues negative feedback. Before publication on the marketplace, the merchant receives it and can contact the customer with an offer to resolve the problem. After resolving the customer's issue, the customer can modify the feedback to reflect his satisfaction with the resolution. Using this feature, the consumer benefits by having non-conforming services addressed, and merchants or professionals benefit by having an opportunity to correct adverse situations before negative feedback is released to others in the marketplace.

Figure 6:
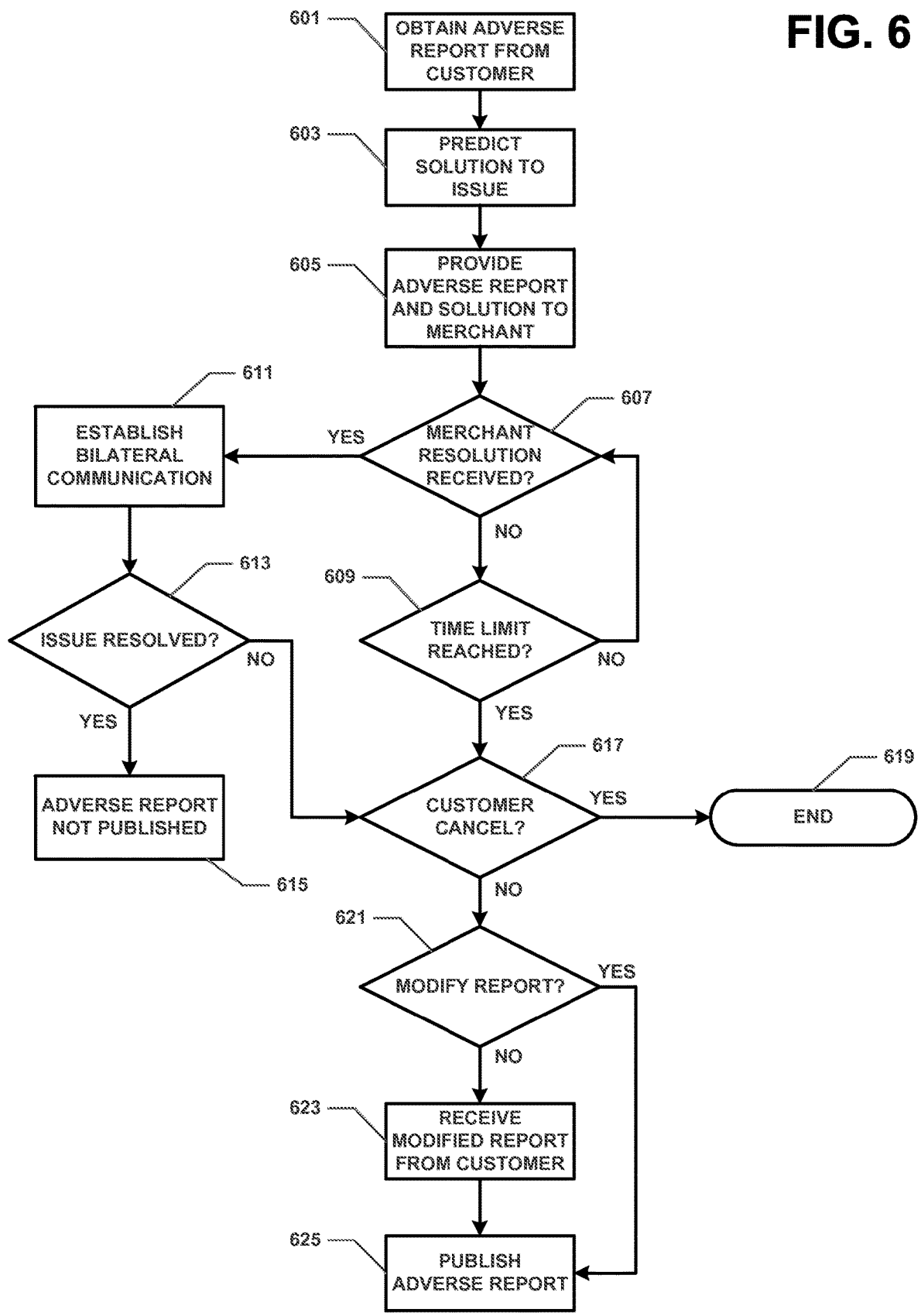
FIG. 6 is a flowchart illustrating an example bilateral communication technique.

Referring to FIG. 6, a dissatisfied customer can initially prepare and transmit via a communication network a report, e.g., for services received during a previously scheduled appointment, that can be adverse to the merchant rendering those services. The format of the report can vary wildly, e.g., the report can include a written, free-style portion as well as pre-designated ratings, e.g. numerical ratings such as 1 to 5 or verbal ratings such as "dissatisfied", "very dissatisfied", and so forth. Such report formats and reporting systems are well-known to the art and will not be described in detail. Upon obtaining the customer's report (Step 601) and identifying the report as potentially adverse to a specific merchant, the Marketplace Server 100 can predict that a particular solution meets a threshold probability of resolving the customer's issue (Step 603). More specifically, the system can train a classifier to predict whether a given solution will resolve an issue using historical data relating to the service, the attributes of different customers that were satisfied by the solution, and/or the attributes of the merchant. Then, the attributes of the dissatisfied customer are used as input to the classifier, and the predicted solution(s) is obtained as output. A predicted solution can be, for example, a discount, full or partial refund, repair or replacement of a good, re-performance of the service, a gift, or other suitable recompense.

The system identifies the merchant and presents the potentially adverse report and the predicted solution(s) to the merchant, via the merchant's device, for resolution (Step 605). The merchant can choose to take no action or, on the other hand, can prefer to resolve the issue with the customer so that the adverse report does not affect any online scoring or online rating that the merchant can have built up over time. The merchant's opportunity for responding or not can be limited to a pre-determined amount of time (Steps 607 and 609). Hence, if the merchant positively chooses to take no action or if the predetermined amount of time for responding lapses without the merchant choosing one or the other, the marketplace server can be adapted to alert the customer to the negative or non-response and can, further, determine whether or not the customer desires to withdraw or otherwise cancel the adverse report (Step 617). After receiving the customer's choice to cancel or not, the Marketplace Server 100 can be adapted to delete the adverse report and prevent publicizing thereof should the customer opt to cancel the adverse report (Step 619).

If, on the other hand, the customer has indicated a desire to proceed, the Marketplace Server 100 can then provide the customer with the opportunity to modify the adverse report (Step 621). For example, the customer can desire to include in the adverse report that the merchant failed to negotiate a settlement of the event giving rise to the adverse report. In the event that the customer desires to modify the adverse report, the customer can make additions or deletions to the written, free-style comment area and/or to the pre-designated ratings portion of the report. Once the customer has finished making additional or revised comments, the modified adverse report is transmitted to the Marketplace Server 100. Upon receiving the modified adverse report (Step 623), the Marketplace Server 100 posts the modified adverse report to the marketplace (Step 625) via the communication network. Alternatively, if the customer does not modify the adverse report, the Marketplace Server 100 can, instead, post the original adverse report to the marketplace (Step 625) via the communication network. Either way, once a merchant has ignored or decided not to negotiate with a customer over a submitted potentially adverse report, the adverse report can be publicized either in its original form or in a modified form (Step 625).

Assuming, instead, that the merchant opts to respond to the potentially adverse report, the merchant can do so, for example, using a written, free-style portion as well as a pre-programmed negotiation offer. After receiving the merchant's response, the Marketplace Server 100 can establish bilateral communication between the customer and the merchant (Step 611) during which the customer and merchant can go back and forth in an effort to resolve the issue that is the source of the adverse report. Advantageously, during bilateral communication, the adverse report remains unpublicized, pending the results of the bilateral communications. If the parties to the bilateral communication are able to resolve the issue that is the source of the adverse report to the satisfaction of both parties (Step 613), after receiving this decision, the Marketplace Server 100 can delete the adverse report and/or can store the adverse report in a database of non-publicized adverse reports (Step 615). In either case, the adverse report is never made public.

In contrast, after establishing bilateral communication (Step 611), were the Marketplace Server 100 to receive a signal indicating that the parties could not resolve the issue that is the source of the adverse report, the Marketplace Server 100 can be adapted to determine whether or not, in light of the negotiations, the user desires to withdraw or otherwise cancel the adverse report (Step 617). After receiving the customer's choice to cancel or not, the Marketplace Server 100 can be adapted to delete the adverse report and prevent publicizing thereof (Step 619) should the customer opt to cancel the adverse report.

If, on the other hand, the customer has indicated a desire to proceed, the Marketplace Server 100 can then provide the customer with the opportunity to modify the adverse report (Step 621). For example, the customer can desire to include in the adverse report the tone and temper of the negotiation to the adverse report. In the event that the customer desires to modify the adverse report, the customer can make additions or deletions to the written, free-style comment area and/or to the pre-designated ratings portion of the report. Once the customer has finished making additional or revised comments, the modified adverse report is transmitted to the Marketplace Server 100. Upon receiving the modified adverse report (Step 623), the Marketplace Server 100 can post the modified adverse report to the marketplace (Step 625) via the communication network. Alternatively, if the customer does not modify the adverse report, the Marketplace Server 100 can, instead, post the original adverse report to the marketplace (Step 625) via the communication network. Either way, once a merchant has ignored or decided not to negotiate with a customer over a submitted potentially adverse report, the adverse report can be publicized either in its original form or in a modified form (Step 625).

In another implementation, after establishing bilateral communications between the user and the merchant, the method can include the Marketplace Server 100 executing instructions for receiving and storing as data the negotiation feedback, which can manifest as written, free-style comments by both parties and/or as pre-designated ratings. The Marketplace Server 100 can process negotiation feedback data and assign feedback ratings to the negotiation feedback data. Advantageously, the marketplace server can publicize the assigned feedback ratings. For example, if the merchant is a merchant that delivers services to the customer, enabling the customer to provide negotiation feedback can include generating a plurality of specific questions about the specific services provided by the merchant and providing the customer with at least one of a plurality of specific questions that is unique to services provided by the merchant.

In yet another implementation, the method can further include monitoring a number of adverse reports against each discrete merchant and assigning a rating to each discrete merchant as a function of, inter alia, adverse reports that lead to bilateral communication or to publication. For example, the rating assigned to each discrete merchant can be based on proposed resolutions received from the merchant via the bilateral communication.

Appointment Confirmation Confidence

Using a combination of the described network service technologies combined with the tracking of each merchant and professional's on-time performance, Appointment Confirmation Confidence information can be collected and provided to consumers and merchants who use the system in combination with the marketplace and the network. Merchant on-time performance is a measure of appointment schedule adherence of the merchant, and can be based on, for example, whether the merchant receives customers on or around their scheduled times, the frequency with which the merchant exceeds estimated service completion times, the likelihood that the merchant will cancel the appointment, and the like. The information can be maintained in the Consumer Persona 119 for consumers and/or in the Merchant Profile 117 for merchants.

As one example, a consumer decides whether to change merchants for a monthly in-home pet grooming appointment. The consumer initially believes that the merchant having the highest customer feedback ratings is also the best service provider. As an additional check, the consumer can review the merchant's on-time performance, during which the consumer can learn that the merchant is on average ten minutes late in starting scheduled services. The consumer can choose the merchant in spite of the historical late performance, but the consumer knows what they're buying. Indeed, in this example, the consumer knows in advance that the merchant with the high feedback ratings is consistently late, and likely will be late, so their expectations are adjusted in advance.

Figure 7:
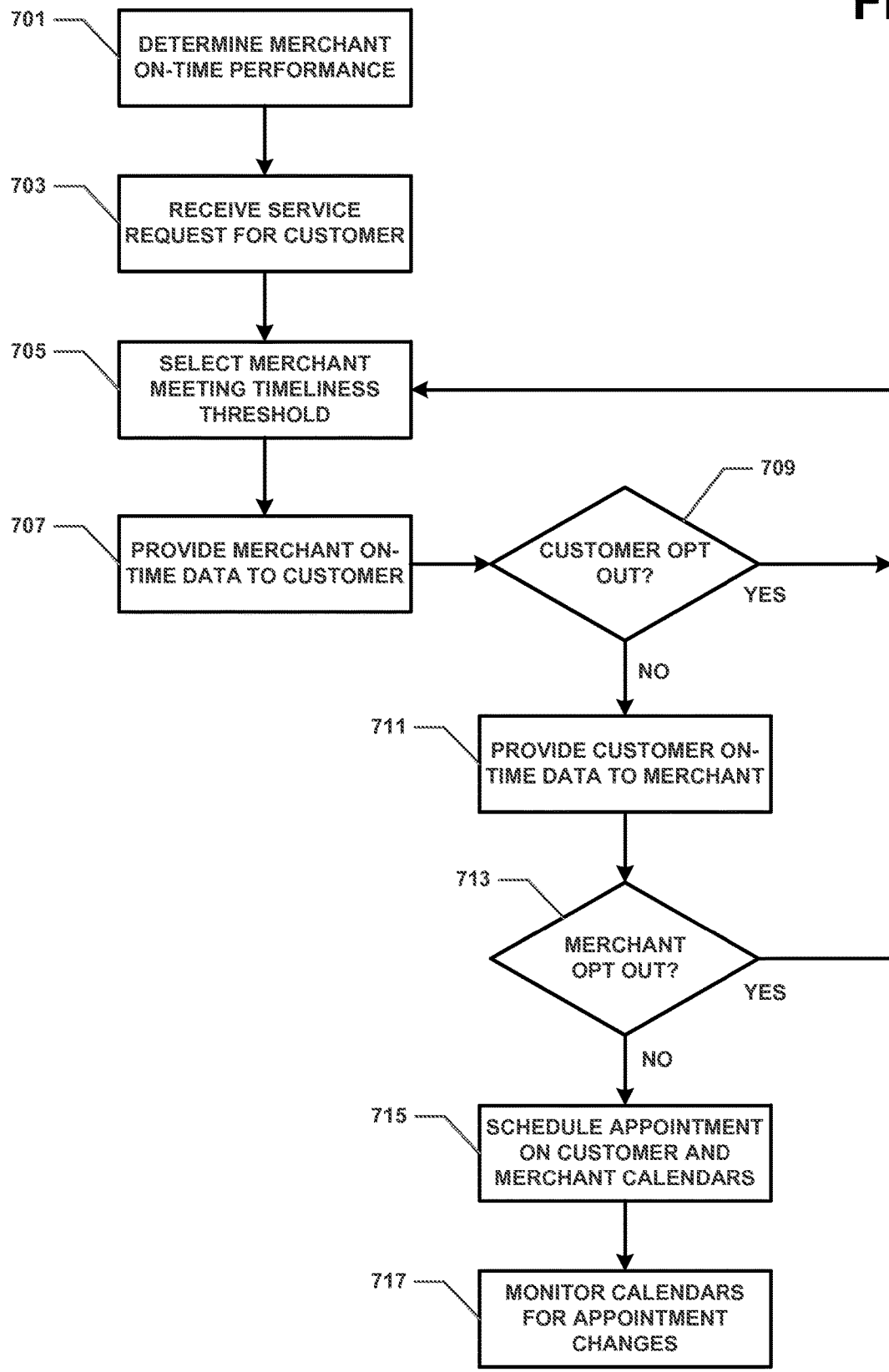
FIG. 7 is a flowchart illustrating an example appointment certification technique.

Referring now to FIG. 7, one implementation of a method for making certified appointments will be discussed. At Step 701, the Marketplace Server 100 determines the on-time performance of the merchants on the system. When a request for a service is received from a customer device (or the device of a third party) (Step 703), the system selects a merchant that meets a threshold level of timeliness in providing the service (Step 705). For example, a customer seeking a manicure can indicate, using the User Interface 120 on her device, that she wants to patronize a merchant that begins its appointments on time (whether for manicures or all appointments generally), at least 95% of the time. In accordance with the customer's preferences, the system will select at least one merchant meeting the timeliness threshold, if any (Step 705), and either present the possible choice(s) to the customer along with the historical on-time performance data of the merchant(s) (Step 707), and/or attempt to schedule the appointment automatically. In some implementations, the merchant is selected by predicting that a particular merchant meets a threshold probability of being selected by the customer to provide the service. The prediction can be based on historical data relating to the attributes of different merchants that have previously provided the service. As described elsewhere herein, the prediction can be made using a suitable machine learning technique. The merchant (or merchants) presented to the customer can be those having the highest probability (or probabilities) of selection by the customer.

Upon providing the on-time performance data of the merchant(s) to the customer (Step 707), the customer can be given an opportunity to opt out of scheduling an appointment with that merchant or merchants (Step 709). If the customer elects to opt out, the system can attempt to find additional merchants providing the desired service that meet the same or a different on-time performance threshold. In one implementation, if the customer chooses not to opt out, and instead selects a particular merchant with which to schedule the appointment, the customer's on-time performance data can be provided to the merchant (Step 711). For example, the merchant can be provided with information indicating that the customer is late to appointments 8% of the time, has canceled 3 appointments with less than required notice, and has failed to show up to an appointment without notice once. Based on the customer's on-time performance data, the merchant can then decide whether to opt out of serving the customer (Step 713). If the merchant chooses to opt out (either manually or automatically based on, e.g., a merchant preference attribute requiring customers to meet a threshold on-time performance), the system can select other merchants meeting the same or a different threshold of timeliness for presentation to the customer. If, on the other hand, the merchant elects to service the customer, the appointment is scheduled for the service on the calendars of the merchant and customer (Step 715).

Following the scheduling of the service (Step 715), the system can monitor the calendars of the merchant and/or customer for changes to the appointment (e.g., changes caused by appointment exchanges, cancelation, and the like). In one implementation, the geographical location of the customer device is monitored and the customer's estimated time of arrival to the merchant's location is calculated to determine if the customer will be late for the appointment. If the customer is expected to be late, the a notification of late arrival can be sent to the customer's device and/or the merchant's device. The merchant can proactively change the appointment in response to the expected late arrival, and the Market Server 100 can receive the change, notify the customer device of the change, and receive acceptance of the change from the customer.

Benchmarking

As earlier described, the Marketplace Server 100 facilitates comparative analysis, for both consumer and merchants, of the costs paid by consumers for services and the services provided by merchants. For example, without being provided identifying information about competitors, merchant can use the present system to determine how a particular service offering is priced on their price list relative to any particular market. This functionality allows a consumer to compare what she paid for a standard service to what others paid in the same marketplace or what others can pay in other marketplaces. For the consumer, using the market intelligence available via the Marketplace Server 100, the cost paid for a particular service can be compared to what others in the network have paid, without disclosing identifying information associating with the merchants or other customers.

The functionality is also designed to allow a merchant to compare its service personnel's performance efficiency with others in its marketplace on in other marketplaces. Comparisons can be made generically, meaning that other party's identities or detailed information are not released. For example, following a tire rotation and oil change service, a consumer wants to compare the rate they paid to the average paid for the specific service in the marketplace where the service was delivered. The system's functionality allows the consumer to do this and to also compare what they paid to averages in other marketplaces. Advantageously, the review helps consumers gauge their merchant decisions to save money while, on the other hand, merchants can compare their productivity statistics with the average in their marketplace or the average in other marketplaces.

In other implementations, using the market intelligence available through the Marketplace Server 100 and the Appointment Data 118, a consumer can benchmark her service purchases against others based on various form of demographics or particulars that exist. For example, a consumer can find that she schedules oil changes for her cars less frequently than others, or she visits her dentist for hygiene less frequently than others. Knowledge of both habit benchmarks provides early indicator for potential issues that can cause problems for the consumer, e.g., car failure or higher dental costs for restoration work.

Figure 8:
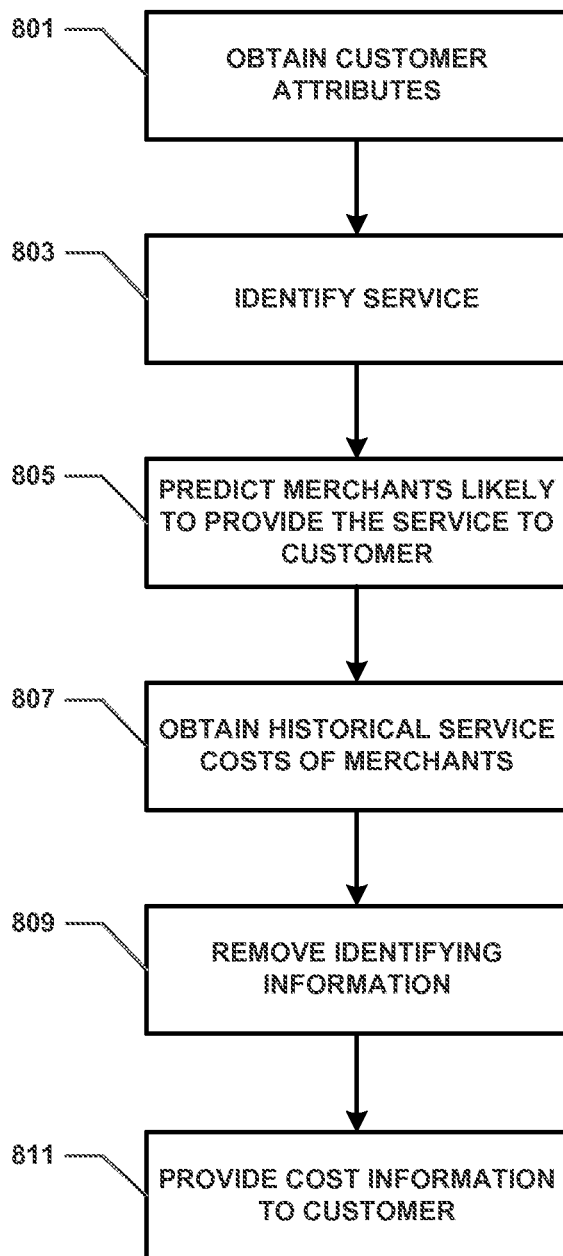
FIG. 8 is a flowchart illustrating an example merchant benchmarking technique.

FIG. 8 depicts one exemplary method for consumer benchmarking in accordance with an implementation of the system. Initially, the Marketplace Server 100 obtains various attributes for a particular customer (e.g., identification attributes, preference attributes, asset attributes, and/or task attributes, as described herein) (Step 801). The customer attributes can be obtained from the Consumer Persona 119 via the Buyer Matching Engine 102. Further, a desired service is identified by the customer or automatically by the system (Step 803). Using its knowledge on available merchants that provide the service, the Marketplace Server 100 determines which merchants are likely to be selected by the customer. More specifically, the Marketplace Server 100 predicts, based on historical data relating to the attributes of the merchants, whether each merchant meets a threshold probability of being selected by the customer to provide the service (Step 805). The merchants selected for evaluation can be, for example, those merchants that are geographically proximate to the customer, those that have provided the service to the customer in the past, and/or those that have previously provided the service to other customers having attributes similar to the particular customer.

As described elsewhere herein, the Marketplace Server 100 can make the predictions using a suitable machine learning algorithms. For example, the system can train a classifier to predict whether a given merchant would be selected to provide the desired service using relevant historical merchant and customer attribute data, such as the attributes of different merchants that have previously provided the service. The attributes of the merchant and/or customer at issue are then input to the classifier to obtain the prediction as output.

For the merchants that are predicted as likely to provide the service to the customer, the system obtains cost information, including amounts paid by customers who have received the service from the merchant (Step 807). This cost information, as well as other information about merchant services, can be collected over time, as the services are performed or thereafter. For example, the system can collect service information, amounts paid for particular services, service times, and other relevant attributes from customer records, service records, medical records, reports, billing documentation, invoices, and other data available to the system. The system can remove identifying information from the cost and other information (Step 809); for example, prior to providing the information to a customer, the system can remove the names, addresses, telephone numbers, email addresses, and so on, of the merchant providing the services and the consumers receiving the services. Further, rather than providing the customer with a list of amounts paid, the Marketplace Server 100 can combine the cost information into a user-friendly form, such as an average amount paid by customers receiving the service in the customer's surrounding area. Once the information is processed into a convenient form, it is provided to the customer's device for viewing and/or further analysis (Step 811). In some implementations, the information can also be provided to one or more of the merchants, either automatically or upon the request of a particular merchant.

Dynamic Pricing

The system can be designed to track consumer demand for appointment times, even when the appointment time has been confirmed and is certified as controlled by another consumer. Whenever a merchant accepts an appointment, the additional demand by others for the same time may not be known or tracked by the merchant. Knowing that information provides the merchant with market demand data that allow them to price their appointment times at different levels, e.g., higher prices for higher demand and lower prices for lower demand. The system tracks all requested times and allows the merchant to view the demand information to help them assess prices for their services. This functionality can also help them assess whether adding additional resources will be effective in capturing additional revenues.

This functionality of the system can be used exclusively by the merchant to determine the fees that they should charge for their services; sometimes higher and sometimes lower. Advantageously for consumers, if they can only schedule appointments in high demand times it will result in higher costs for them however, if they can work around schedule times with lower demand, it can result in lower costs. If higher demand times are definitely important to a particular consumer, the higher prices will result in more availability. For merchants, overall revenue from service fees can be increased without adding additional costs, unless they are expanding their operations to meet the tracked demand, in which case, their net profits can be increased.

Barter Exchange

Barter Exchange allows merchants to exchange services without exchanging cash. Using the marketplace ongoing data, the Barter Exchange functionality provides merchants with independent valuation of the exchange prices so that all exchanges can be as financially equitable as possible. Barter Exchange allows merchants to exchange services without exchanging cash. Thus, merchants who operate different type of service businesses (such as a barber and a dentist) can exchange value in coupons and use the coupons to reward their customers. For example, if a dentist exchanges three 20-minute new patient exams with a barber for six 45-minute haircuts and stylings (or, perhaps, six coupons with a value of $50 for that barber), the Barter Exchange initiates the transaction, values the coupons with market data, allows the coupons to be electronically transferred and tracks their use. The barber digitally gives them to customers when he learns that they are seeking a new dentist and the dentist digitally gives the hair styling coupons to patients either as a reward or when they learn that the patient is seeking a new hair stylist. The Barter Exchange can also automatically offer the coupons to a patient or customer when they are new to a particular area and have made an appointment with one of the service professionals.

Advantageously, for merchants and professionals, they have an easy process to assist each other's business. They have a tracking system to validate the value of the exchange and to track the exchange for their income tax reporting. They provide their patients or customers with cost savings value and give them the service of suggesting merchants or professionals that they know are highly desired. The coupons can also be used for the acceptance of new patients or customers via referral when the merchant or professional is not otherwise accepting new business. The issuance and use of the coupons is digitally tracked for validation and management. Consumers, on the other hand, receive a referral from a known person. They save money and their coupon is digitally given and tracked so their use is easy to execute and track.

Marketplace Coupons

Another aspect of the system can provide discount coupons and an automated tracking system, to reward consumers who use the merchants who are in the system's network and marketplace. The use of in-network merchants is tracked in the Appointment Data 118, through the Marketplace Server 100. To track and properly reward actual service paid and delivered, the system uses activity levels that are based on certified appointments that have been administered through the system's network and marketplace, including payment. As an incentive to reward the use of merchants inside of the system's marketplace, this aspect of the system allows the marketplace to reward consumers with discount certificates or coupons for services and products when levels are reached. For example, if a particular consumer has used ten new in-network merchants during a particular period of time, e.g., during a six-month period of time, they could be rewarded with a certificate for a $100 service from another merchant in the network and the marketplace.

Advantageously, buyers/consumers receive discount certificates that can be used to purchase other in-network services. While, the network that they join by using the system marketplace provides incentives for the seller's customers, and customer prospects, to use the merchants in the network. Different coupon and reward programs can be used for different types of services, such as rewarding someone for returning to the same merchant for the same service over a particular period of time.

Coupon Redemptions

The "Redemption Gap" is currently a significant issue for eCommerce companies who are engaged in the "daily deal" business. This gap is the difference between all coupons issued and coupons redeemed. For revenue purposes and to prevent the loss of the benefits of coupons before they expire, the system can be adapted to electronically record all coupons purchased by or issued to consumers. In addition, it can allow consumers to enter coupons purchased in out of network sites like GroupOn or LivingSocial so they can be recorded (although, as an out-of-network purchase, it cannot automatically track redemptions). In all cases, coupons are either automatically entered or scanned into the system through the Consumer Persona 119 so that the Buyer Matching Engine 102 can automatically apply the consumer's preferences for the redemption of the coupons and remind the consumer when expiration is approaching. For example, if a consumer is issued a coupon for frequenting an in-network merchant, it is issued through the Appointment Data 118 and the Marketplace Server 100 and entered into the Consumer Persona 119 and the Memory 105. The system monitors the coupon for expiration date, use for a service that a consumer has requested, transfer to a friend for gifting purposes or to encourage in-network business growth and for ultimate redemption. In addition, if a consumer purchases a coupon through GroupOn, Angie's List, Living Social or one of the other leading "daily deal" eCommerce sites, the coupon can be scanned into the consumers data and tracked.

Advantageously, for consumers, all coupons are tracked and the redemption gap is eliminated, even if someone gifts a coupon to another, through the system's notification system, so that they can redeem it before the expiration date. For the merchant or professional, coupons are issued to grow their business and incentivize their customers to return. With this network service, the merchants who issue coupons have complete assurance that the coupons will be used for their intended purpose.

Coupon Exchange

Coupon Exchange is a marketplace where individual consumers who have purchased coupons can sell or trade them for value. Also, consumers who use particular merchants or professionals can enter alerts that electronically track when coupon opportunities for those merchants are offered for sale so that they can take advantage of the opportunity. For example, if an individual has purchased a LivingSocial or GroupOn coupon, or another form of coupon that can be transferred, they can offer it for sale or for trade. This network service can be described as an "eBay for coupons." Thus, if a consumer owns a coupon for a nail service that was purchased outside of the network, and he knows that he will not be able to use it for value before the expiration date, he can enter the information in Coupon Exchange and accept bids to sell it. Thus, for the seller, rather than losing complete value by allowing a coupon to expire without use, the coupon owner, as "seller" can receive value in the same manner that a stock investor sells stock "puts" and "calls". In short, the price for the coupon becomes an "arms-length" negotiation that is set in a free market that factors in the time until expiration and the overall value of the coupon. When agreements are reached, the transaction is electronically executed and the transfer is recorded. Buyers, in turn, obtain access to a marketplace that has not previously existed. Moreover, they can receive additional value for a coupon by purchasing it at a discounted price from what the original owner paid if they are willing to remain flexible on their calendar. Finally, the merchant or professional's coupons are expensive to issue and the use of them helps the merchant achieve the result of, for example, obtaining a new customer. If the coupon is allowed to expire, the issuing merchant fails to achieve his objective.

Coupon Issuer and Presenter

The Coupon Presenter functionality is a mobile computing device that electronically maintains all coupons owned by a consumer, including those transferred through Coupon Exchange and Barter Exchange. The application allows users to electronically present the coupon through their mobile computing device for scanning by the merchant or professional's scanner. When scanned, the usage is verified and the consumer's coupon inventory is updated. Also, coupons are "aged" in the consumer's coupon inventory so consumers can be advised of approaching expiration dates. The application has a merchant or service professional facing application that provides them with tracking of unused coupons so that the system can send reminders or know how to manage large quantities of approaching expirations.

Coupon Issuer is an application that allows merchants to offer coupons electronically through the system's Internet network infrastructure or through interface devices in the merchant's facility or at a retail kiosk. They are used in conjunction with an individual consumers' physical presence at the site. The Coupon Issuer uses Wi-Fi or Bluetooth technology to digitally transfer the coupon to the consumer. For example, any time an individual consumer purchases or receives a coupon, he enters it into his system and it is recorded in their Consumer Persona 119. Whenever the consumer uses the services of a particular merchant for whom she owns a coupon, the coupon is automatically accessed when the consumer makes the appointment and it is automatically used as part of the payment process when the consumer uses the system's payment methods.

Beneficially, for the coupon issuer, coupons are tracked and their use for the intended result is managed. Furthermore, coupon usage is electronically managed without the issuance of paper documents and coupon usage is verified and the individual presenting the coupon is electronically verified as the owner using the other capabilities of the system. Advantageously for coupon owners, their coupons are presented to them electronically and managed by the system's automated capabilities. Coupon expiration is better managed because the existence of the coupon is automatically used when service appointments are made and during the payment process. For merchant or professionals, the coupons are expensive to issue and the use of them helps the merchant achieve the result of, for example, obtaining a new customer. If the coupon is allowed to expire, the issuing merchant fails to achieve their objective.

Rewards Program (Consumer Focused)

The system can be adapted to issue electronic reward certificates when purchased by in-network merchants for their subsequent gifting to their customers. The reward certificates can be for an unlimited number of things, including products, food items, and other services. The reward programs administers all certificates electronically, such that whenever a merchant gives one to a customer, they do so by scanning the customer's unique barcode identity into the mobile device that they use to manage their business, e.g., via an iPhone, an iPad or a barcode scanner connected to a computer, and by selecting the reward that they are giving. The Marketplace Server 100 executes the transaction. Hence, when the customer uses the reward, he only has to show the coupon on his mobile device to the redeeming merchant. There is no paper issuance of coupons at all. For example, a haircut salon is interested in helping a coffee shop that is located next door. With this feature, the salon can purchase electronic gift certificates for cups of coffee and, when they feel it is appropriate, they give them to their customers. Customers receive a reward for whatever reason that the merchant believes is appropriate. Merchants or professionals build goodwill with their customers.

Reward Administration (Merchant Focused)

The system, through the Marketplace Server 100, the Consumer Persona 119, and the Merchant Profile 117, can also be structured to electronically record and track the status of all reward and coupon issuances so that the merchant can measure how they are used and determine the effectiveness of each type of reward or coupon program. For example, a particular merchant can offer electronic coupons through the marketplace that is operated by the system. They can also give electronic reward certificates to their customers for use to purchase lunches at a restaurant that is located down the road from the merchant. The system provides on-line reporting that shows how each coupon or reward in each program was used and how effective they were. Thus, at any moment, a merchant can see how many coupons were purchased in the marketplace, how many of them were purchased by existing customers (and who they were), and how many of them were purchased by new customers. Advantageously, merchants or professionals can see how many coupons have been used and how many are coming to expiration. They can also set their Merchant Profile 117 preferences to remind coupon purchasers of expiration dates.

For consumers, use of rewards and coupons is tracked so that they do not lose them while for merchants or professionals, the complete effectiveness of every reward and coupon program is tracked and analyzed and the merchant benefits are calculated to be provided to the merchant.

Complementary Service Engine

The Complementary Service Engine uses the preferences in an individual consumer's Consumer Persona 119, in conjunction with the Buyer Matching Engine 102, to present opportunities for the purchase or use of services that a particular consumer has shown a history or preference to use together. For example, a consumer can have a recurring haircut appointment every fourth Saturday with a particular barber at a particular barber shop and can infrequently schedule an oil change for his car and a massage in the same vicinity. Advantageously, the Complementary Service Engine can be adapted to note the pattern and suggest to the consumer that a massage be scheduled after every haircut and, further, to coordinate the mileage reports from the consumer's OnStar system to schedule an oil change, concurrent with the haircut appointment, at a particular oil change retail shop located a block away from the barber shop. If approved by the consumer or, alternatively, set up as a preference in their Consumer Persona 119, the system automatically schedules the appointments. For the consumer, the system proactively monitors and automatically manages patterns of service appointments in the user's life. Merchants and professionals, on the other hand, receive an automated recurring scheduling service.

Location-Based Opportunity

Location-Based Opportunity is a software engine that can be adapted to work via the Consumer Persona 119 and the Buyer Matching Engine 102 to match objectives with tasks that can be completed when a consumer's geographical location is proximate to where the objective can be accomplished. For example, a consumer's spouse can have a task list that includes various errand items. The consumer can also be linked to the task list. As the consumer is driving home from work, she can be alerted that a task list from that link includes "pick-up dry cleaning from Acme Cleaners on Main Street." The consumer can be queried as to whether or not she would like to accomplish that task and, advantageously, can be advised that accomplishing the task would not affect a next appointment. If the consumer decides to accept the task, the system can provide her with directions to the location of the dry cleaner. Furthermore, once the task is completed, the spouse can be notified and his task list can be updated. Advantageously, for the consumers, their collective lives can be enriched by the action of others, e.g., a spouse. However, the linked task list can include neighbors, friends, work colleagues, and so forth. Merchant's objectives are accomplished as this particular example helps them complete the delivery of a service that they have rendered. As a result, they are compensated earlier than might have otherwise occurred.

iForms Exchange

The system can also be configured to collect and prepare an archive of standard industry forms templates in the Marketplace Server 100 through the work and management of the system's operator. The standard forms are in an electronic library and contain data fields that can be populated at any time using the information in either the Merchant Profile 117 or the Consumer Persona 119. Thus, when a consumer has scheduled, certified, and confirmed appointment was a merchant or professional, the Marketplace Server 100 works with the Merchant Profile 117 to determine exactly what forms are required and then connects with the Consumer Persona 119 to retrieve data to populate the fields in all required forms (subject only to the consumer's settings in their persona) and to electronically issue the completed forms to the merchant or professional. Upon issuance, all forms are distributed within the merchant or professional's preferences however, the information cannot be distributed or issued outside of the merchant or professionals operations unless authorized the consumer. For example, if a consumer has scheduled an appointment with his doctor for an annual examination, he can be required to update various forms, which can include medical insurance forms, prescriptions, current medical conditions, any injuries, and the like. The system can be configured to prompt the consumer for permission to prepare the forms (unless the consumer has given pre-approval in their Consumer Persona 119 preferences) and to electronically populate the forms with the information that is required by the medical professional.

If the medical professional's required forms have changed and additional information is required, the consumer is notified and prompted to obtain the information. When the needed information is obtained, the consumer can enter it into his Consumer Persona 119, where it is stored for other releases needed by other merchants or medical professionals. Note, however, that since the medical professional uses the system's standard forms library, when updates to a standard form are made, all consumers are notified that it is needed. When the information is obtainable from a third-party source on behalf of the consumer, the system can be adapted to obtain the consumer's approval, to contact the third party and to electronically enter the information in the Consumer Persona 119 (and to notify the consumer for their review). When the consumer arrives at the doctor's office for their certified confirmed time, they are immediately taken to the examination room and not asked to complete manual forms or to wait.

Advantageously, one of the noisome processes involved in purchasing consumer services, i.e., forms completion, is completed for the consumer automatically and with minimal intervention. At the merchant's end, forms and data that they need are defined and, as a result, are completed before the services are provided. Furthermore, the merchants or professionals receive the needed information in advance. Consequently, if the appointment relates, for example, to a medical exam, the insurance information is taken care of electronically and the medical professional is assured of payment even before the examination or other service is performed.

Automatic Reminder and Alerts

The Marketplace Server 100 can also be adapted to use the Merchant Profile 117 preferences regarding necessary procedures before a service can be delivered to notify the consumer through the Buyer Matching Engine 102, to ensure that necessary protocol procedures are followed. Also, the Marketplace Server 100 can use various information in the Merchant Profile 117 and the Consumer Persona 119 to automatically alert required actions, e.g., as a reminder message. For example, if a patient is scheduled for surgery on a particular day, the Automatic Reminder and Alert function can be adapted to provide the patient with automatic notifications of conditions such as the requirement that they not eat from 6:00 p.m. on the night before surgery. The Automatic Reminder and Alert function can also interface with the patient's calendar to determine if any events are scheduled that might cause non-compliance, e.g., a dinner meeting that is scheduled for 7:00 p.m. The Automatic Reminder and Alert function can also connect the merchant or professional's calendar with the consumer or patient's calendar, e.g., to provide reminder notifications that ensure that the appointment time will be followed and that issues that can cause appointments to be missed or delayed are identified. For the consumer/patient, necessary protocols are automatically notified in the preference format that the patient or consumer prefers to help them maintain their performance ratings high and to keep their calendars on focus. At the merchant/professional end, necessary and required reminders are provided automatically, which provides assurance that safety protocols are followed. Moreover, the Automatic Reminder and Alert function helps the merchant or professional maintain business results by ensuring that customers and patients arrive for their appointments.

Marketplace Payment

The Marketplace Server 100, in conjunction with the Consumer Persona 119 and the Merchant Profile 117, can also be designed to collaborate on payment processing that is directed as a payment from the consumer to the merchant. The Marketplace Server 100 executes the clearing of the payment. The payment transaction is initiated either at the time of the service, or earlier, in the case of a prepayment or deposit. When payments are made at the time of service, the system uses the barcode identity and location-based scanning to verify that the consumer is the person who reserved the appointment and is the one making the payment. It can also verify that the consumer is actually at the site. This functionality, for example, can be used for a consumer's payment, whether it is for a prepayment or a payment at the time of service delivery.

For example, if a consumer schedules a massage appointment three weeks in advance, the merchant can offer a prepayment discount if the consumer pays in advance. Or, as another example, the consumer can choose to pay for the service after the service has been delivered. In the latter case, the consumer scans their unique barcode into the merchant's scanner to identify herself. The consumer can be queried, e.g., via a mobile device, if she wants to pay for the service, which can include inclusion of a gratuity. If the answer is "yes" regarding the gratuity, the consumer is prompted to see if she would like to see guidelines for gratuities for the type of service they have received, e.g., using the system's standard service type codes. If she answers "yes," she can be shown guidelines and prompted for the amount she would like to include. When satisfied, the consumer enters "ok to pay" and the merchant's payment request is received by the Marketplace Server 100 for distribution to the merchant. Consumers experience safe payment through a known system and guidelines for gratuities so that their reputation is maintained and they are not paying too much for what they receive. Merchants or professionals receive faster payment, which can include pre-payment for discounts if desired, and a safe system that matches all certified confirmed appointments where delivery has occurred with the receipt of payment. The function can also provide security from employee theft in instances in which merchants operate remote operations and protect the merchants from losses from unknowingly accepting checks with non-sufficient funding in the account.

Task Acquisition

The system can further include a task list functionality in the Consumer Persona 119 for consumers to enter their desired tasks relating to consumer services. At the time of the entry, the consumer is prompted for classifying details so that the task can be property addressed. If the task relates to consumer services where the consumer has set-up sourcing preferences in his Consumer Persona 119, he may not be prompted and the system initiates the action of addressing their service request automatically. For example, a particular consumer can be at his office and realize that he needs a haircut but has not scheduled it prior to an upcoming business trip. He reaches for his iPhone and presses the button to engage Apple's "Siri". He advises Siri to make a haircut appointment through the system prior to the date of his upcoming business trip. Siri acknowledges and immediately accesses the system's User Interface and enters the task in the consumer's task list. Upon entry, the system, e.g., via the Buyer Matching Engine 102, can access the Consumer Persona 119 to determine that this consumer uses the same barber for all of his haircuts. The Matching Engine 102 can then be configured to contact the Marketplace Server 100 to schedule the haircut appointment. Using the Appointment Data 118, the Marketplace Server 100 can negotiate between the barber's calendar and the consumer's calendar to find a time. Furthermore, the system can identify that the consumer has a board meeting within two blocks of the barbershop in the week before his business trip. Based on the travel time algorithms and the board meeting start time, the haircut can be scheduled automatically an hour before the board meeting and the appointment is confirmed and certified and entered on both the barber's and the consumer's calendar.

Advantageously, the appointment was scheduled in the timeframe needed and within an efficient time on the consumer's calendar with limited involvement from the consumer. At the merchant end, the appointment was scheduled on the barber's calendar with an existing customer without any involvement from the barber.

Work Task Tracking

The system can also be adapted to use the Buyer Matching Engine 102 to prepare lists associated with a service that is scheduled. The lists are based on the relevant information in the Consumer Persona 119, e.g., identifying the type of car, the current mileage, and so forth, as well as service notations that are transmitted by third-party systems, e.g., OnStar, relating to issues noted in a car. The lists can be transmitted through the Marketplace Server 100 to the Seller Matching Engine 101 and listed in the Appointment Data 118 for the upcoming certified and confirmed appointment. When the service is initiated, the system can either populate the list on the merchant's work-in-process system or can electronically transmit a work list, e.g., using a PDF document. When the work is completed, the same list is transmitted to the consumer for her review of what has been completed. For example, a customer, in preparing for a car service appointment a week out, can access the Work Task list periodically as she notes the work that needs to be done on her car. The information is updated on all appropriate files so that it can be transmitted. When the consumer picks up the car, she can review the list with the merchant and in connection with her review of the bill (pre-payment) to ensure that everything was addressed. For the consumer, the system provides an organized manner in which to prepare a work list and in which to review completion and billing. Merchants or professionals can be advised in advance of what is required and can take action to ensure that any needed parts are available to minimize the amount of time that the car spends in their repair shop. Also, the merchants can eliminate the time to re-enter work information while the customer is in their shop, providing more resources to address the work.

Capacity Sale (Merchant Focused)

The system can also be adapted to enable merchants to access the Appointment Data 118 to determine their upcoming, confirmed appointment schedule. When openings are noted or blocks of available unscheduled time appear on the schedule, the system can enable that merchant to offer discounts to existing customers, new customers, returning customers or collaborative customers of related merchants. The discount options can be based on customers committing to the slot and (optionally) paying in advance for the appointment, or making a deposit. Advantageously, consumers can set their preferences in their Consumer Persona 119 to seek such deals using the work that exists on their task list. For example, a particular merchant may note that four weeks out, 90% of their service resources are not scheduled. Rather than wait to see what work can come up, the merchant can decide to offer a sale to existing customers for 40% of his available time (taking his schedule up to 50% three weeks out). He can also opt out of the prepayment option since he is offering the capacity sale to existing customers. As a result, the consumer receives the discount for committing to take an open time slot for work that they either currently need or that they need in the future, while the merchant is able to project his open time slots and to fill them with schedule worked.

Active Marketing

The market intelligence that is contained in the Appointment Data 118, and the generic information that can be "mined" in the Merchant Profile 117 and the Consumer Persona 119 can be provided to merchants to help them prepare for opportunities to address customer needs in their markets or in the markets that they are exploring. For example, a ServiceMaster franchise owner can be considering expanding operations to a city that is 50 miles from their current location because they have had multiple requests for work in that area but have believed that it is too far to travel in a business day. Although they have had requests showing interest and possible demand, the merchant can first explore the market as completely as possible. Using the system, they can access the proposed area's market information to seek: the average age of the homeowners in the area; the number of homes in which the owners have owned them for five years or more; and the volume of home maintenance and repair business that has transacted through the system's marketplace. Such information will help them understand the potential of success should they decide to move forward with their plan.

Consumers in the area can benefit from a ServiceMaster franchise that is local. Moreover, if this is in addition to other similar franchises in the area, they benefit from the competition for their business. If this is the first of this type of business in this area they benefit from the lower costs for the franchisee to travel to them. Merchants or professionals can be able to grow their business with reliable market information and can have a higher probability of success.

Opportunity Capture (Sale)

Using a combination of the task acquisition functionality and the Consumer Persona 119, operating in conjunction with the Buyer Matching Engine 102 and the Marketplace Server 100, the system can allow a consumer to continuously search for service opportunities using selection criteria relevant to what the consumer is seeking. For example, a consumer typically brags to his friends that he pays no more than $20 for oil changes in a market where the average price is $40. Using an opportunity capture search that works through the Buyer Matching Engine 102 to continuously review market transactions and sale opportunities that match that price, the consumer can continue to pay no more than $20. Although they do not come up frequently (as they are typically "loss leaders" for service garages), every few months or so they do appear and this customer is notified. When he receives these notifications, he confirms an appointment. For opportunity capture (sale), the acceptance of an offer may not be automated since a number of options can be presented. With such a functionality, the consumer's pricing needs can be met while merchants or professionals can be rewarded with additional revenue and expand their business.

Service Bid

Using a combination of the task acquisition functionality and the Consumer Persona 119, operating in conjunction with the Buyer Matching Engine 102 and the Marketplace Server 100, the system can allow either a consumer or a merchant to select criteria which, if met, would result in the confirmation of a service appointment. For example, a consumer seeking a carpet cleaning service for their 1,500 square foot, fully-carpeted home can have searched the market and concluded that $0.50/square foot for the carpet is a fair price. However, the consumer can still enter the search criteria at $0.40/square foot under the condition that the merchant can give them as short as an hour advance notice for them to be ready, i.e., complete merchant flexibility. The following morning, a newly-established merchant may notice the opportunity and contact the consumer, offering 24-hour notice at $0.40/square foot. With this result, the consumer's pricing needs were met and they had the service scheduled (with even more advance notice time than they agreed to accept). The merchant or professional closed a sale and gained a new customer.

Ad Tag Sourcing

Typical consumers do not like to receive advertising spam. Accordingly, the system can be configured to completely blocks out spam through the marketplace, e.g., via the Marketplace Server 100, and the Seller and Buyer Matching Engines 101 and 102. However, there are times when a consumer can be interested in a particular advertisement, such as when they are searching for a particular service, e.g., one on the consumer's task list. In such an instance, consumers can be enabled to enter a key word(s) that they believe would be in an advertisement for something they are seeking. The more words added to the ad tag, such as an ad tag phrase, the more selective that the reverse search will be. Thus, when the system's Marketplace Server 100 receives an advertisement that meet's the consumer's ad tag or ad tag phrase, the consumer is alerted to the advertisement and provided the option to receive it. If the consumer chooses to receive the advertisement, the ad revenue that is paid by the search engine to the system's operator is shared equally between the operator and the consumer. The system can include a "reverse ad tag" library where all reverse ad tags that are selected by consumers are collected and stored.

For example, a particular consumer can seek a cell phone repair for a particular model cell phone. The consumer can use the ad tags "Motorola", "Cell Phone", "Motorola Repair", and "Quick Motorola Cell Phone Repair" and input it into her Consumer Persona 119. Within a 24 hour period of time, she can receive, e.g., a text message notification from the system, advising that two ads met her criteria. The consumer can accept one of the ads. Advantageously, the consumer found a source for her cell phone repair without being inundated with spam advertising that he would have had to sift through. The merchant, on the other hand, reached the most focused target for advertising that is possible and engaged a new customer.

Track and Locate

The Track and Locate functionality is configured to include specific controls for location and time data as control features in the system. The functionality is accessible with mobile devices through the mobile network and which uses information on the geographical position of the mobile device. This functionality is used, with the preference setting approval of the consumer in the Consumer Persona 119, to advise merchants of the whereabouts of the consumer so the merchant can be aware of the expected arrival time. Also, the tracking of the on-time status of a merchant and the reporting to the consumer who has an upcoming appointment. For example, a consumer has a 9:00 a.m. appointment at an auto repair merchant to have their car exhaust checked. The process can take the merchant about 15 minutes to complete. The merchant's 9:15 a.m. appointment is early and arrives at 8:50 a.m. The merchant can uses the system's Track and Locate functionality and determine that the 9:00 a.m. consumer will not arrive until 9:05 a.m. As a result, to maintain the merchant's work flow on time, they take the 9:15 a.m. appointment into the service bay for the exhaust check. They complete it by 9:05 a.m., when the 9:00 a.m. appointment arrives.

In another example, the same technology is used in a doctor's office. Whenever a patient is taken into the examination room, their mobile device notifies the system and the doctor's on-time status is monitored. If the doctor begins to run behind schedule due to unforeseen circumstances, subsequent patients are notified and they are able to modify their schedule accordingly. Advantageously, for consumers, they do not have to call the merchant if they are late and, if they are early, they can be able to complete their service early due to the late arrival of other consumers. Merchants or professionals, on the other hand, are constantly being advised of status or consumers and their work flow can be maintained according to schedule, which does not impact the subsequent customers.

Service Delivery Verification

Using the Service Delivery functionality, the system is able to verify that a service has been delivered before payment is made. When required, the consumer authorizes the system to report the information to a third party using a Consumer Persona 119 preference setting. Preferably, reports are electronically transmitted to the third party as frequently as the third party desires. For example, a consumer has recently had knee surgery and is engaged in physical therapy that is paid by his healthcare insurance. He has been authorized to receive twelve sessions. At the completion of every session, his insurance company receives verification that he was at the therapist's office at the time of the session. When the insurance company receives billings from the physical therapist, the company can use these independent verifications to authorize payment. The consumers know that the services that are being paid for are actually received while the consumer can be paid earlier by the insurance company because they have verification that the service was delivered.

Technology Interface

There are many technologies that have been developed that are natural extensions to the system's products. The system includes interface templates to allow for quick integration in the Internet cloud so customers can align more information. For example, a particular product called CarCare tracks car maintenance activities such as gas refills. As part of the tracking, the consumer can enter the car's mileage. The system's interface can accept these data from the CarCare application in the Internet cloud and can use it to evaluate whether and when maintenance actions are warranted. Advantageously, existing technologies that are employed are easily integrated into the system's monitoring activities. For merchants and professionals, needed maintenance is addressed sooner due to the awareness of the needs.

Identity Verification

The system can also be adapted to include functionality whereby, when a consumer enters a merchant's facility, the consumer opens the system User Interface 120 on their mobile device scans their unique barcode label into the merchant's scanner. By doing this, the merchant is aware of the consumer's arrival and the arrival has been matched with the certified and confirmed appointment. The merchant is also assured that the consumer who has arrived is the actual consumer who scheduled and paid for the service.

For example, a consumer arrives for a first appointment with a new doctor. The patient scans her unique barcode identity, signaling the doctor that the patient has arrived. Using the barcode, the doctor can access the User Interface 120 to see a photograph of the patient and an additional level of verification. This protects the identity of the consumer and ensures that the scheduled services can only be used by them. This also provides protection from unauthorized payments. On the merchant or professional end, the system can verify third-party payments and can also help the merchant eliminate the need for a receptionist or check-in person.

Consumer Rating or "Best Customer" Classification

The Marketplace Server 100 can also be configured to track and maintain records of the performance of consumers for such things as no-show, on time arrival, rescheduling frequency, merchant loyalty, and the like; and to provide the records to merchants for the purpose of evaluating their risks in accepting an appointment from a new consumer. A Consumer Rating Classification can be used generically for merchants to compare the ratings of their recurring consumers to their competitors without the system revealing the customer or competitor identities. For example, a merchant is currently experiencing a customer 15% no-show rate. The merchant can request information on how that no-show rate compares to competitors who operate within a 20-mile radius. Preferably, the system provides this information without revealing any identities. The merchants can review the data, noting that competitors only experience a 10% no-show rate. As a result, the merchant can change its business standards in their Merchant Profile 117 to only accept new customers with no-show ratings of less than 2%. Accordingly, from this point forward, automatically-accepted customers must have that rating or better while the merchant will be asked to approve new customers with worse ratings. For consumers, those with better ratings will be preferred by new merchant opportunities. At the merchant's end, the merchant or professional will be able to address business performance as compared to their competitors with very specific actions that they can understand and that will be automated and become part of their normal operating procedures.

Merchant Rating or "5-Star" Classification

The Marketplace Server 100 also can be configured to track and maintain the performance of merchants and professionals for such things as on time performance, customer feedback ratings, particular adverse phrases in their feedback, consumer loyalty, and so forth; and to provide these data to consumers for purposes of evaluating whether a consumer would want to use that particular merchant. For example, a consumer evaluating new dry cleaning merchants can request and review the merchant ratings. Although the consumer finds a 4-star rated merchant within a mile of his home, he notes that a 5-star merchant is located 5 miles from his home. Examining the details of the performance rating, the consumer can also learn that the 5-star merchant's customer loyalty is rated higher. Based on this data, the consumer can decide that, based on the fact that the 5-star merchant retains its customers, it is worthwhile to make the additional drive. For consumers, this is beneficial because they can engage the merchants and professionals that they know to be higher rated from multiples of feedback from the system's marketplace. Merchants or professionals, especially those with higher feedback ratings, will be in higher demand. Those with lower ratings can evaluate the details of their feedback ratings to know how to address the issues that are causing their depressed ratings.

Universal Data Archive

The system can further be structured to automatically back-up data and to maintain the back-ups in multiple sites so that recovery can be achieved nearly instantaneously if needed. For example, some small business have never spent the time or valuable funds to set-up a data back-up system for their customer files and their history. This can be a costly issue in the event of data loss. Using the system, such information is automatically protected and the small business owner is provided a level of back-up and recovery that she could not have afforded independently. Both the consumer and the merchant benefit from the information being protected.

Relationship Management

The system can also be configured to assemble all of the relevant information, e.g., feedback, on-time tracking, customer retention, new customer coupon use, and various other criteria (as well as criteria defined by the merchant), to and provide electronic status report of how a merchant or professional's services are being viewed by their customers and how the information compares to the marketplace. For example, a doctor is considering adding another physician to her practice but is unsure of how it can affect the current practice. She can select the relationship management functionality of the system and review various factors, noting that for every appointment time that the new physician has, there are multiple requests for the time. Consumers benefit because projected needs are monitored and actions are taken to address them. Merchants or professionals are able to Recurring Appointment Scheduling The Marketplace Server 100 can also be structured and arranged with a functionality to administer various types of recurring appointments on behalf of consumers. The appointments can be made based on a particular day of a month, e.g., on the first day of every month, or on a particular day in a particular week, e.g., the second Monday of the month. The recurring appointment is administered as a certified and confirmed appointment on the calendars of both the consumer and the merchant. For example, a consumer wants a haircut every three weeks on Monday mornings. They have been frequenting the same barber for more than ten years and have no plans to change. Using the recurring appointment scheduling functionality, the consumer can request a recurring appointment every third Monday morning at 8:00 a.m. If the time is available it is booked for whatever period in advance that the consumer wants and that the barber is willing to commit to. Advantageously, for the consumer, their personal care needs are met and they do not have to spend time with their barber coordinating future meeting times. The merchant or professional satisfies a current customer and has reliable future service commitments Market Feedback Analysis (Merchant Focused)

The system can also be designed whereby feedback that is submitted to a merchant is constantly compared to the average of feedback that is received by similar merchants in the marketplaces that they serve. Trends can be noted and flagged for the merchant. Also, the feedback practices of those submitting feedback can be analyzed to determine if a particular feedback is an anomaly or in line with what the consumer's practice typically is. Also, at the option of the merchant, feedback that meets certain criteria, such as strongly negative, can be flagged to their attention for immediate follow-up. With this functionality, a merchant or professional is able to see how their feedback relates to the feedback that other merchants in their marketplace receive. For example, a merchant with multiple locations can employ a number of management techniques to ensure that all locations strive to satisfy customers. Unfortunately, the owner cannot be at all locations and hope that their managers are doing all that they can. However, using the system's market feedback analysis functionality, the merchant can monitor at any time how the feedback at their remote locations compares to the marketplace. If adverse trends are noted, immediate action can be taken. A the consumer's end, the merchant can access tools and functionality to ensure that the locations that serve the consumers are performing up to market standards. At the merchant's end, performance issues can be addressed immediately and negative customers can be addressed.

Coding Structure—Attribute Codes

In one implementation, the system includes a standard coding methodology to manage, organize and catalogue consumer and merchant attributes. Identified herein as "Attribute Codes," they are structured to operate at three primary levels to enable all marketplace constituents (i.e., consumers and merchants) to manage and control their identification and preferences and to allow the Buyer Matching Engine 102, the Seller Matching Engine 101, and the Marketplace Server 100 to optimally match their needs, preferences and task goals.

For example, a consumer can own an automobile that requires maintenance and repair. By identifying this as an "automobile," the matching engine is not able to specifically prescribe solutions to satisfy the consumer's needs. However, by identifying the "automobile" as, for example, a 2008 Ford Taurus with 40,000 miles, the vehicle identification number and the location, the system's Matching Engines 101, 102 and Market Place Server 100 are able to assign one or more standard Attribute Codes to this vehicle, which facilitates the specific matching of the needs of the consumer with the capabilities of the merchants.

Standard coding through the system's Attribute Coding process also allows for the collection of a library or index of Attribute Code sequences that are combined to satisfy a particular task or need. For example, in the above hypothetical situation with the 2008 Ford Taurus, there are number of decisions and choices that are required to optimize the match between the asset needing repair and the merchant best suited to address the need. For example, various information and attributes can include the vehicle identification number, the mileage, the identified problems, owner coupons, past service records, whether the merchant can fix the identified problems, equipment required to fix the vehicle, and so on. Each of these information items has a identifying Attribute Code to conform it to the population of similar information. By matching this information to a uniform Attribute Code, the consumer's needs are specifically matched and the merchant's capabilities are specifically aligned with the needed remedial actions and the expertise of the resources.

Attribute Code Matching

In a simple example of Attribute Code matching, and referring back to the 2008 Ford Taurus, the car identity noted by the vehicle identification number is matched with the unique code for this model of automobile and sub-codes are derived for the year of the vehicle, the manufacturer, the date of manufacture (and therefore the age), the warranty records, the source of previous service records and so on. Each of these items can be a separate Attribute Code but, by the particulars provided, these separate Attribute Codes are joined to provide a Attribute Code for the vehicle. This action can be completed by the Marketplace Engine 100 and, once assigned, is catalogued for this asset.

To continue, using the vehicle's Attribute Code, the manufacturer's recall and service notification records are sourced and work list items, which have been assigned separate Attribute Codes, are automatically generated for the upcoming service. In addition, the entry of information about the issues with the car are matched with similar issues and resolutions for this particular make and model of car and recommended work list Attribute Codes are listed to show the service provider what is the likely work process needed. By assigning these work Attribute Codes, the merchant is provided with an average time that other merchants have required to repair this particular problem and the merchant's facilities are assigned based on these average (experienced-based) Attribute Code work tasks. This example shows only a few Attribute Code matches; however, the matching possibilities are virtually endless for both consumers and merchants.

Attribute Code Structure

In one implementation, at the top level, Attribute Codes are organized according to consumer and merchant. As such, at the top level of the code structure are "Consumer Persona Codes" and "Merchant Profile Codes," together referred to as "Entity Codes." Below the Entity Codes, each entity (consumer and merchant) strive to complete tasks and objectives and each have three "Purpose Codes": (1) Identification; (2) Preferences; and (3) Tasks. Within the Purpose Codes, both the consumer and merchant have "Objective Codes." For consumers, this includes: (1) Consumer Fixed; (2) Consumer Variable; and (3) Asset Variable. For merchants, this includes: (1) Merchant Fixed; (2) Merchant Variable; and (3) Resource Variable.

Consumers generally manage two things: themselves, and the assets they own. A consumer's identity consists of the information that is unique to them and that generally doesn't change, such as their name, their date of birth, their gender, their tax identification number, and assigned identification information such as their unique retina identity, their fingerprint or their assigned digital bar code identification. Their identity also consists of generally variable information such as their spouse and family member identities, the assets they own at any particular time, the details of those assets, the homes that they own, the appliances and equipment inside of those homes, and many other things.

On the other hand, merchants similarly manage two things: their business identities and capabilities, and their resources and facilities used to deliver the services they sell. The merchant's identity similarly consists of the information that is unique to them and generally doesn't change, such as their business name, the date they started operating, their location, their credit records, their tax identification number and various other things. Their identity also similarly consists of variable information such as the employees that deliver services and their capabilities, their other business locations, their facilities, their equipment and various other things.

Within each type of code, both for consumers and merchants, there are primary and sub-codes. Primary codes function as the identifying property and sub-codes function to select options or to provide specific details.

At the lowest, most specific level, standard Attribute Codes are based on nodes: the Prime Node and the Sub Node. The Prime Node represents the prime permanent identity. For an individual this is their personal identity specifics. For merchants this is the business identity specifics. For the Consumer Persona, examples of Prime Nodes include name, gender, driver's license number, social security number, designation of assets, and so on. Merchant Prime Nodes include business name, business license number, business owner, designation of services offered, and so on.

The Sub Node represents the specifics associated with each of the Prime Nodes. For an individual, Sub Nodes represent the attributes integrated into their life to manage their health and personal lives and the details related to the assets that they own and maintain. For merchants this includes their services, their price list, their service personnel, their service equipment and facilities and all the details related to each.

Consumer Persona Entity Codes

Purpose Codes address and define the specifics of a consumer (their identity: fixed and variable) and what assets they own and manage (homes, equipment and vehicles). Purpose Codes are organized into the three main activities that a consumer exercises with themselves and with their assets: identifying them, setting preferences regarding how they manage them and setting tasks (both recurring and incidental) for how they are engaged, used and maintained. Objective Codes address the specifics of what consumers want to accomplish as organized by: 1) consumer fixed identity, 2) consumer variable identity, and 3) asset identity (which, by definition is variable since assets are generally not owned forever).

Consumer fixed identification Object Codes relate to the type of information about an individual that doesn't change, such as date of birth and name. Consumer variable identification Object Codes define home and office locations, family members, preferred consumption selections (such as the consumer's "no-show" statistics or desired maximum distance for appointments), medical conditions and other links such as shared shopping lists between family members.

Asset variable Identification Object Codes describe assets owned, e.g., houses, appliances, equipment, automobiles, boats, motorcycles. They also are used to define variable information related to the consumer themselves. Asset variable identification Objective Codes are used to identify and define the variables relating to a consumer that can change. For example, most consumers have medical insurance and can identify the insurance carrier but that carrier can change from time to time. When changes occur, these consumer variable codes are updated by the consumer or, if the consumers sets their preferences to allow an insurance broker update them, they are updated by the insurance broker. Another example of a consumer variable code relates to the designation of a consumer's primary care doctor. Even though designated at a particular time, primary care doctors can change and consequently the consumer variable information can be changed.

Consumer fixed preference Objective Codes define a consumer's standards for services sought, such as feedback standards or desired preferences for recurring merchants. They can also describe a consumer's preference regarding verifying service delivery, such as by mobile device bar code scanner. Consumer variable preference Objective Codes define preferences relating to participating in time exchange, barter exchange or ad tag messaging. They are also used to define a consumer's preferences relating to personal health and exercise preferences. Asset variable preference Objective Codes define, for example, for an automobile owned, the maintenance preferences, such as: 1) always schedule manufacturer recommended maintenance, 2) always schedule maintenance with a particular merchant, or 3) don't follow the manufacturer's service maintenance recommendation.

Consumer fixed task Objective Codes allow consumers to select recurring objectives for scheduling time. For example, a particular consumer can select to schedule their recurring doctor appointments based on the recommendations of the American Medical Association (AMA). Using these codes, the consumer selects that option and the system accesses AMA links to provide the scheduling and rescheduling frequency based on the consumer's age, medical conditions and all particulars. Because of the system's direct link with information sources, as this information changes (such as when the consumer ages or when their medical monitoring shows adverse trends), changes are made automatically.

Consumer recurring task Objective Codes provide the consumer with the technology to proactively achieve recurring objectives. For example, if a consumer wants to have a weekly lunch with their son or daughter, the system monitors, schedules, and prescribes the lunch times in accordance with the weekly objective. If the son or daughter wishes to have this meeting only twice a month, they can change the directive and the system coordinates the change through the combined recurring task Objective Codes between the consumer and their son or daughter.

Asset variable task Objective Codes provide the ability to proactively address incidental or non-recurring tasks. For example, if a consumer needs a haircut, that task is addressed after the consumer accesses the system and enters the task objective.

Merchant Profile Entity Codes

For merchants, Purpose Codes are used to address and define the specifics of the merchant and what resources they employ in the delivery of the consumer services they sell (e.g., personnel, facilities and equipment). The merchant Purpose Codes are organized into the three main activities that a merchant exercises through their business to satisfy customers: identifying them, setting preferences regarding how they employ and engage them, and setting tasks (both recurring and incidental) for how they are engaged on behalf of the business.

Merchant Objective Codes address the specifics of what merchants want to accomplish as organized by: 1) merchant fixed identity, 2) merchant variable identity, and 3) resource identity. Merchant fixed identification Objective Codes maintain the information that doesn't change for a merchant (or only changes in unusual circumstances, such as business renaming). For example, these Objective Codes define the business name, the service sector, the date started, the tax identification number, the business license number, the franchisor, the owner, and so forth. Merchant variable identification Objective Codes function to define a merchant's service offerings, price list location(s), GPS coordinates, hours of business, feedback ratings, and the like. The present system uses this information when matching to achieve objectives between consumers and merchants.

Merchant resources variable identification Objective Codes are used to describe and define the resources that the merchant has engaged in the delivery of their services. These codes define the identity of the resource, their billing rates, their location, and the like. In the same manner, these codes describe and define the merchant's equipment that is used for the delivery of their services and includes the same information, as appropriate, as the personnel. Finally, this information is used to describe and define the merchant's facilities that are used to deliver their services. For example, for a health spa, this would define the massage rooms.

Merchant fixed preference Objective Codes are used for merchants to set fixed or normally unchanged preferences. Examples include: 1) the acceptance of out of town patients, 2) the acceptance of mobile device generated bar code check-in, 3) maximum "no-show" performance from customers, and many more. These codes are used for matching objectives between consumers and merchants. Merchant variable preference Objective Codes are used in the system to integrate choices into the merchant's profile. For example, merchants use these Objective Codes to monitor patients progress, such as a doctor who wants to be notified if a hypertensive patient's blood pressure is trending upward, or a personal trainer who wants to monitor a client's independent workout results.

Resource variable preference Objective Codes are used to define the specialties of service personnel and to define the capabilities of equipment used for service (e.g., whether a particular spa technician is capable of performing deep tissue massage.

Merchant fixed task Objective Codes are used to define the standard tasks that are performed for the services merchants deliver. Examples include: allowing automatic triaging of arrivals for admission into the active service areas, tracking appointment demand for variable pricing, tracking workflow delivery status, and so on.

Merchant recurring task Objective Codes allow merchants to set recurring tasks, such as offering appointments to out of town consumers who have alerted the system that they are seeking a service in a city that they are visiting, comparing a merchant's performance metrics with other merchants in the network, offering priority triaging to emergency patients or customers, and so forth.

Merchant resource variable Objective Codes are used to set operating standards in the use of the resources utilized by merchants to deliver the services they sell. For example, if a particular health spa is required or desires to schedule maximum work times engaged in massage services at five hours, these codes are used to set them and the merchant's scheduling is then structured around this Objective Code definition.

Attribute Code Creation

Consumers create basic codes from their own information and with data entry. For individuals, the amount of data concerning themselves, their family, their assets, homes and equipment and their objectives and tasks is relatively basic. For example, most typical users will have one home and are likely to have two cars. Their healthcare insurance programs are relatively simple and their known maintenance needs are fairly standard. For them, the entry of their basic information will be relatively simple and the maintenance and asset profiles that are available in the system will automatically and systematically create more extended maintenance and recurring task codes for them.

Merchants, however, can have customer records that are extensive. Merchant can have price lists, service lists, resources, facilities and equipment. For customer records and history files, the system can include electronic/digital interface software code that will interface between the merchant's legacy or existing systems to automatically transfer the customer information into the Merchant Profile 117. Price lists and service offerings can require additional data entry. The system includes standard or suggested preferences and tasks to simplify the data entry process for merchants. For example, recurring tasks, such as suggesting a service appointment to an existing customer, can be included as a standard feature, as will thousands of other customary business practices and terms. The system includes programming logic that creates a library and index of customary business practices (for preferences and tasks), and will allow merchants in similar service sectors to use these indexed business practices collectively (and confidentially) as part of the network and marketplace.

Attribute Code Learned Logic/Predictive Abilities

As mentioned above, the system processes Attribute Codes and code changes and code interrelationships. For example, when a 44 year old male living in Washington D.C. who owns a 2006 BMW 740 I has a transmission repair at 80,000 miles on the odometer at the BMW dealership located in a city where he does not work or live, at least five Attribute Codes have been involved through a combination of Entity Codes, Purpose Codes, Objective Codes and Prime and Sub Nodes. This combination creates a relationship of all of those elements of the Attribute Codes. The relationship is indexed in that person's Attribute Codes in their Consumer Persona 119, and in the Merchant's Profile 117, for the next service. However, the system also learns the relationship and indexes it in the Marketplace Server 100 (the Matching Engine). Without using the consumer's or the merchant's fixed Objective Code information that is confidential, this indexed Attribute Code combination is available for the population of the system's network and marketplace.

The system can also note that the repair was not a typical repair by referencing the vehicle manufacturer's service recommendations and compare this repair to other 2006 BMW 740 I's in the network to determine the occurrence of the issue. If frequent or experiencing a higher occurrence than other similar age cars or other years that have been manufactured by BMW, the system can report the occurrence rate to the manufacturer and note the repair rate on the Attribute Code asset variable Objective Codes of other network consumer members, where the information is available to those consumers when they schedule their car for service so that it can be addressed by the merchant.

This predictive logic process can be applied to all personal, homes, vehicles and assets of individuals, but it can similarly be used by merchants. For example, if a significant number of females 50 years old and older who are members of the network purchase a pedicure either immediately following a massage or, on the same day as the massage but at a different merchant, the system indexes this information (again, without disclosing the Consumer fixed identification Purpose and Objective Codes) and catalogs the combination of the Attribute Codes. This indexed relationship is used to suggest to network merchants who have 50 year old and older female consumers scheduling massage appointments to offer a pedicure. If the spa does not have a pedicure facility, this indexed information can be used to suggest business expansion services to the merchant based on the behaviors of the network members or, more specifically, the customers of the spa.

Example Attribute Code Structure

As an example of the functionality of Attribute Codes, a hypothetical service request of a consumer is linked and mapped through various codes to seek what they want. In this example, a male individual on a business trip is seeking a haircut appointment that is within a certain distance of his hotel. He accesses the present system to request the appointment, and the resulting sequence of code matching can include the Attribute codes shown in Table 1. The Attribute Codes can be of the fixed or variable type, as described above:

TABLE 1

| Consumer Attribute Codes | | | Merchant Attribute Codes | | |
|---|---|---|---|---|---|
| Prefix | Type | Name | Prefix | Type | Name |
| 10 | Consumer Identification Attribute | Consumer name | 20 | Merchant Identification Attribute | Location (address/GPS coordinates) |
| 10 | Consumer Identification Attribute | Gender | 200 | Merchant Preference Attribute | Accept out of town customers/patients (yes/no) |
| 300 | Consumer Identification Attribute | Current location | 400 | Merchant Preference Attribute | Auto accept new customers/patients (yes/no) |
| 300 | Consumer Preference Attribute | Schedule services when traveling (yes/no) | 400 | Merchant Preference Attribute | Cumulative feedback rating |
| 500 | Consumer Asset Attribute | Home address | 600 | Merchant Resource Attribute | Employee specialty |
| 700 | Consumer Task Attribute | Haircut | 800 | Merchant Task Attribute | Haircut |

As a consumer's request is matched through the Marketplace Server 100 to result in a confirmed appointment, the details, specifics and particulars of that action are aligned in the consumer's calendar and the merchant's service schedule. The results can be cataloged in the Marketplace Server 100 for future similar requests, and standard codes can be automatically generated by the Marketplace Server 100 and assigned to this particular consumer or to another consumer with a similar request.

The terms and expressions employed herein are used as terms and expressions of description and not of limitation, and there is no intention, in the use of such terms and expressions, of excluding any equivalents of the features shown and described or portions thereof. In addition, having described certain implementations of the invention, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
   predicting that a customer is likely to request a service based on historical data comprising attributes of different customers that have previously requested the service, wherein the attributes of the different customers comprise a plurality of following: an identification attribute, a preference attribute, an asset attribute, and a task attribute; and wherein:
   a particular identification attribute is one of: name, gender, driver's license number, social security number, no-show performance, and home address;
   a particular preference attribute is one of: level of feedback expected from service providers, type of service, whether to automatically schedule appointments for services, whether to allow another customer to purchase an appointment, physical exercise preference, whether to follow scheduled maintenance, a preference of a service provider for a given service, and service provider location preference;
   a particular asset attribute is one of: primary care doctor, spouse/partner, home address, and vehicle identification number; and
   a particular task attribute is one of: car repair, car maintenance, doctor visit, exercise class, training, haircut, and spa appointment;

determining that an appointment of the customer for the service is likely to require one or more electronic forms;

automatically populating the one or more electronic forms with information associated with the customer based on a permission specified in a profile associated with the customer;

assigning a machine-readable unique code to the customer and storing a representation of the unique code in the profile;

tracking a location of the customer via a location tracking sensor of a mobile device of the customer;

determining that the customer has arrived at a location of a service provider of the service based on information received via the location tracking sensor of the mobile device;

in response to determining that the customer has arrived at the location of the service provider, causing the unique code to be presented on a display screen of the mobile device; and determining that the unique code has been scanned by a scanning device at the location of the service provider and, based thereon, electronically issuing one or more of the electronic forms to the service provider.

2. The method of claim 1, wherein the determining that the appointment of the customer for the service is likely to require one or more electronic forms is based on historical data comprising attributes of different service providers that have previously provided the service and attributes of different customers that have previously requested the service.

3. The method of claim 1, further comprising predicting that the service provider is likely to be selected by the customer to provide the service based on historical data comprising attributes of different service providers that have previously provided the service.

4. The method of claim 3, wherein the attributes of the different service providers comprise a plurality of the following: an identification attribute, a preference attribute, a resource attribute, and a task attribute; and wherein:
  a particular identification attribute is one of: business name, service sector, business address, gender, business license, on-time performance, operating hours, type of personal care provider, type of automotive service provider, type of building maintenance provider, type of training provider, type of transportation services provider, and type of healthcare provider;
  wherein a particular preference attribute is one of: resource utilization, accept weekend appointments, automatic appointment triage, accept emergency requests, accept insurance, and type of insurance accepted;
  wherein a particular resource attribute is one of: employee name, employee specialty, and current location; and
  wherein a particular task attribute is one of: car repair, car maintenance, doctor visit, exercise class, haircut, and spa appointment.

5. The method of claim 1, further comprising scheduling the appointment for the service on a calendar of the customer and on a calendar of the service provider.

6. The method of claim 5, wherein scheduling the appointment comprises:
  sending information to the mobile device to cause the mobile device to notify the customer of the appointment; and
  after sending the information to the mobile device, receiving from the mobile device an indication of acceptance of the appointment.

7. The method of claim 5, wherein scheduling the appointment comprises:
  sending information to a service provider device to cause the service provider device to notify the service provider of the appointment; and
  after sending the information to the service provider device, receiving from the service provider device an indication of acceptance of the appointment.

8. The method of claim 1, further comprising:
  determining a time of the service and a geographical location of the service;
  identifying one or more previous appointments of the customer for a second, different service, the previous appointments having a pattern of being scheduled at times proximate to the time of the service, the previous appointments having a pattern of taking place at a geographical location same as or proximate to the geographical location of the service; and
  automatically scheduling on a calendar of the customer an appointment for the second, different service at a time proximate to the service.

9. A system comprising one or more computers programmed to perform operations comprising:
  predicting that a customer is likely to request a service based on historical data comprising attributes of different customers that have previously requested the service, wherein the attributes of the different customers comprise a plurality of the following: an identification attribute, a preference attribute, an asset attribute, and a task attribute; and wherein:
    a particular identification attribute is one of: name, gender, driver's license number, social security number, no-show performance, and home address;
    a particular preference attribute is one of: level of feedback expected from service providers, type of service, whether to automatically schedule appointments for services, whether to allow another customer to purchase an appointment, physical exercise preference, whether to follow scheduled maintenance, a preference of a service provider for a given service, and service provider location preference;
    a particular asset attribute is one of: primary care doctor, spouse/partner, home address, and vehicle identification number; and
    a particular task attribute is one of: car repair, car maintenance, doctor visit, exercise class, training, haircut, and spa appointment;
  determining that an appointment of a customer for a service is likely to require one or more electronic forms;
  automatically populating the one or more electronic forms with information associated with the customer based on a permission specified in a profile associated with the customer;
  assigning a machine-readable unique code to the customer and storing a representation of the unique code in the profile;
  tracking a location of the customer via a location tracking sensor of a mobile device of the customer;
  determining that the customer has arrived at a location of a service provider of the service based on information received via the location tracking sensor of the mobile device;
  in response to determining that the customer has arrived at the location of the service provider, causing the unique code to be presented on a display screen of the mobile device; and determining that the unique code has been scanned by a scanning device at the location of the service provider and, based thereon, electronically issuing one or more of the electronic forms to the service provider.

10. The system of claim 9, wherein the determining that the appointment of the customer for the service is likely to require one or more electronic forms is based on historical data comprising attributes of different service providers that have previously provided the service and attributes of different customers that have previously requested the service.

11. The system of claim 9, wherein the operations further comprise predicting that the service provider is likely to be selected by the customer to provide the service based on historical data comprising attributes of different service providers that have previously provided the service.

12. The system of claim 11, wherein the attributes of the different service providers comprise a plurality of the following: an identification attribute, a preference attribute, a resource attribute, and a task attribute; and wherein:
- a particular identification attribute is one of: business name, service sector, business address, gender, business license, on-time performance, operating hours, type of personal care provider, type of automotive service provider, type of building maintenance provider, type of training provider, type of transportation services provider, and type of healthcare provider;
- wherein a particular preference attribute is one of: resource utilization, accept weekend appointments, automatic appointment triage, accept emergency requests, accept insurance, and type of insurance accepted;
- wherein a particular resource attribute is one of: employee name, employee specialty, and current location; and
- wherein a particular task attribute is one of: car repair, car maintenance, doctor visit, exercise class, haircut, and spa appointment.

13. The system of claim 9, wherein the operations further comprise scheduling the appointment for the service on a calendar of the customer and on a calendar of the service provider.

14. The system of claim 13, wherein scheduling the appointment comprises:
- sending information to the mobile device to cause the mobile device to notify the customer of the appointment; and
- after sending the information to the mobile device, receiving from the mobile device an indication of acceptance of the appointment.

15. The system of claim 13, wherein scheduling the appointment comprises:
- sending information to a service provider device to cause the service provider device to notify the service provider of the appointment; and
- after sending the information to the service provider device, receiving from the service provider device an indication of acceptance of the appointment.

16. The system of claim 9, wherein the operations further comprise:
- determining a time of the service and a geographical location of the service;
- identifying one or more previous appointments of the customer for a second, different service, the previous appointments having a pattern of being scheduled at times proximate to the time of the service, the previous appointments having a pattern of taking place at a geographical location same as or proximate to the geographical location of the service; and
- automatically scheduling on a calendar of the customer an appointment for the second, different service at a time proximate to the service.

* * * * *